United States Patent
Rossato et al.

(10) Patent No.: US 10,750,178 B2
(45) Date of Patent: *Aug. 18, 2020

(54) PROCESSING OF MOTION INFORMATION IN MULTIDIMENSIONAL SIGNALS THROUGH MOTION ZONES AND AUXILIARY INFORMATION THROUGH AUXILIARY ZONES

(71) Applicant: V-NOVA INTERNATIONAL LIMITED, London (GB)

(72) Inventors: Luca Rossato, Milan (IT); Guido Meardi, Milan (IT)

(73) Assignee: V-Nova International Limited, Paddington, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,392

(22) Filed: Jul. 6, 2017

(65) Prior Publication Data
US 2017/0310968 A1 Oct. 26, 2017

Related U.S. Application Data

(63) Continuation of application No. 13/893,672, filed on May 14, 2013, now Pat. No. 9,706,206.
(Continued)

(30) Foreign Application Priority Data

May 13, 2013 (WO) ................. PCT/EP2013/059885

(51) Int. Cl.
*H04N 19/50* (2014.01)
*H04N 19/61* (2014.01)
(Continued)

(52) U.S. Cl.
CPC .......... *H04N 19/126* (2014.11); *G06T 7/248* (2017.01); *H04N 19/136* (2014.11); *H04N 19/23* (2014.11);
(Continued)

(58) Field of Classification Search
CPC ........ H04N 19/63; H04N 19/51; H04N 19/50; H04N 19/139; H04N 19/54; H04N 19/52;
(Continued)

(56) References Cited

U.S. PATENT DOCUMENTS 6,275,532 B1 * 8/2001 Hibi .................. G06T 9/008
375/240.17
6,289,052 B1 * 9/2001 Faryar .................. H04N 5/145
348/699
(Continued)

FOREIGN PATENT DOCUMENTS

FR 2944937 A1 10/2010
WO 2011064673 A1 6/2011

OTHER PUBLICATIONS

Using multiple global motion models for improved block-based video coding; Steinback; 1999 (Year: 1999).*
(Continued)

*Primary Examiner* — Luis Perez-Fuentes
(74) *Attorney, Agent, or Firm* — Workman Nydegger

(57) ABSTRACT

Computer processor hardware receives zone information specifying multiple elements of a rendition of a signal belonging to a zone. The computer processor hardware also receives motion information associated with the zone. The motion information can be encoded to indicate to which corresponding element in a reference signal each of the multiple elements in the zone pertains. For each respective element in the zone as specified by the zone information, the computer processor hardware utilizes the motion informa-
(Continued)

tion to derive a corresponding location value in the reference signal; the corresponding location value indicates a location in the reference signal to which the respective element pertains.

22 Claims, 24 Drawing Sheets

Related U.S. Application Data

(60) Provisional application No. 61/646,797, filed on May 14, 2012, provisional application No. 61/647,426, filed on May 15, 2012.

(51) Int. Cl.
| | |
|---|---|
| H04N 19/126 | (2014.01) |
| G06T 7/246 | (2017.01) |
| H04N 19/63 | (2014.01) |
| H04N 19/62 | (2014.01) |
| H04N 19/23 | (2014.01) |
| H04N 19/33 | (2014.01) |
| H04N 19/87 | (2014.01) |
| H04N 19/94 | (2014.01) |
| H04N 19/59 | (2014.01) |
| H04N 19/136 | (2014.01) |
| H04N 19/635 | (2014.01) |

(52) U.S. Cl.
CPC ............. *H04N 19/33* (2014.11); *H04N 19/50* (2014.11); *H04N 19/59* (2014.11); *H04N 19/62* (2014.11); *H04N 19/63* (2014.11); *H04N 19/87* (2014.11); *H04N 19/94* (2014.11); *H04N 19/635* (2014.11)

(58) Field of Classification Search
CPC ........... H04N 19/109; G06T 9/00; G06T 9/46; G06T 9/008
See application file for complete search history.

(56) References Cited

U.S. PATENT DOCUMENTS

| | | | | |
|---|---|---|---|---|
| 6,614,429 | B1* | 9/2003 | Zhang | G06K 9/209 345/420 |
| 6,625,320 | B1* | 9/2003 | Nilsson | H04N 19/40 382/238 |
| 7,356,082 | B1* | 4/2008 | Kuhn | G06F 17/30811 348/699 |
| 7,924,923 | B2 | 4/2011 | Lee | |
| 8,090,025 | B2* | 1/2012 | Sakazume | H04N 19/176 348/384.1 |
| 8,254,455 | B2 | 8/2012 | Wu | |
| 8,279,942 | B2 | 10/2012 | Ito | |
| 8,488,677 | B2 | 7/2013 | Jeon | |
| 8,503,542 | B2* | 8/2013 | Pao | H04N 19/139 375/240.16 |
| 8,599,929 | B2* | 12/2013 | Jeon | H04N 19/51 375/240.25 |
| 8,774,538 | B2* | 7/2014 | Nassor | G06K 9/36 382/233 |
| 9,147,260 | B2* | 9/2015 | Hampapur | G06T 7/277 |
| 9,247,264 | B2 | 1/2016 | Franche | |
| 9,300,980 | B2* | 3/2016 | Rossato | H04N 19/139 |
| 9,609,342 | B2* | 3/2017 | Bivolarsky | H04N 19/105 |
| 9,674,546 | B2* | 6/2017 | Lim | H04N 19/117 |
| 9,706,206 | B2* | 7/2017 | Rossato | H04N 19/33 |
| 9,866,854 | B2* | 1/2018 | Nishi | H04N 19/46 |
| 2004/0091049 | A1* | 5/2004 | Yamaguchi | H04N 19/59 375/240.16 |
| 2005/0141616 | A1 | 6/2005 | Lim | |
| 2006/0088101 | A1* | 4/2006 | Han | H04N 19/51 375/240.16 |
| 2006/0204079 | A1* | 9/2006 | Yamaguchi | G06K 9/4604 382/154 |
| 2010/0111183 | A1* | 5/2010 | Jeon | H04N 19/597 375/240.16 |
| 2010/0232507 | A1 | 9/2010 | Cho | |
| 2010/0246680 | A1* | 9/2010 | Tian | H04N 19/50 375/240.16 |
| 2010/0329347 | A1* | 12/2010 | Kim | H04N 19/139 375/240.16 |
| 2011/0206116 | A1 | 8/2011 | Henocq et al. | |
| 2013/0215957 | A1* | 8/2013 | Bartczak | H04N 19/51 375/240.02 |
| 2013/0223531 | A1* | 8/2013 | Garbas | H04N 19/105 375/240.14 |
| 2013/0294514 | A1 | 11/2013 | Rossato | |
| 2013/0322537 | A1* | 12/2013 | Rossato | H04N 19/63 375/240.16 |
| 2014/0185686 | A1 | 7/2014 | Wu | |
| 2015/0296222 | A1 | 10/2015 | Llin | |

OTHER PUBLICATIONS

Motion vector refinement for high performance transcoding; Jeon; 1999 (Year: 1999).*
NPL—Internet Search; 2019 (Year: 2019).*
NPL Google Search; 2019 (Year: 2019).*
Model-based image coding advanced video coding techniques for very low bit-rate; Han; 1998; (Year: 1998).*
Fast algorithm of arbitrary fractional-pixel accuracy motion estimation; Wang; 2002; (Year: 2002).*
Affine multipicture motion compensated prediction; Wiegand; 2005; (Year: 2005).*
NPL Internet Search log; 2019; (Year: 2019).*
Ebrahimi, Touradj et al., "MPEG-4 Natural Video Coding—An Overview", Signal Processing: Image Communication, Jan. 2000, Total pp. 21 (pp. 365-385), vol. 15, Elsevier Science, USA.
Boyce, Jill, "Weighted Prediction in the H.264/MPEG AVC Video Coding Standard", IEEE International Symposium on Circuits and Systems, May 2004, Total pp. 4 (pp. 789-792), IEEE, New York.
Pieters, Bart et al., "Motion Compensation and Reconstruction of H.264/AVC Video Bitstreams Using the GPU", Eighth International Workshop on Image Analysis for Multimedia Interactive Services, Jun. 2007, Total pp. 4 (pp. 1-4), IEEE, New York.
Ribas-Corbera Jordi et al., "Optimizing Block Size in Motion-Compensated Video Coding", Journal of Electronic Imaging, Jan. 1998, Total pp. 11 (pp. 155-165), vol. 7 No. 1, SPIE and IS&T, USA.
Zavacky, Jozef et al., "Resampling of an Image by Block-Based Interpolation or Decimation With Compensation", Jun. 2000, Total pp. 7 (pp. 18-24), vol. 9 No. 2, Radioengineering, Slovak Republic.
Lee, Ming-Chieh et al., "A Layered Video Object Coding System Using Sprite and Affine Motion Model", IEEE Transactions on Circuits and Systems for Video Technology, Feb. 1997, Total pp. 16 (pp. 130-145), vol. 7 No. 1, IEEE, New York.
Nicolas, H. et al., "Motion and Illumination Variation Estimation Using a Hierarchy of Models: Application to Image Sequence Coding", Journal of Visual Communication and Image Representation, Dec. 1995, Total pp. 14 (pp. 303-316), Academic Press, Inc., USA.
Servais, Marc et al., "Progressive Polygon Encoding of Segmentation Maps", International Conference on Image Processing, Oct. 2004, Total pp. 4 (pp. 1121-1124), IEEE, New York.
Lou, Ming et al., "A Spatial Constrained K-Means Approach to Image Segmentation", International Conference on Information, Communications and Signal Processing, Dec. 15-18, 2003, Total pp. 5 (pp. 738-742), IEEE, New York.
International Search Report from corresponding PCT application No. PCT/EP2013/059885, dated Oct. 24, 2013, total pp. 9.
Wang, et al., Fast Algorithm Or Arbitrary Fractional-pixel accuracy motion estimation; 2002, pp. 1-8.

(56) References Cited

OTHER PUBLICATIONS

Nguyen, et al., Reduced-complexity entropy coding of transform coefficient levels using truncated Golombrice codes in video compression; 2011, pp. 753-756.

* cited by examiner

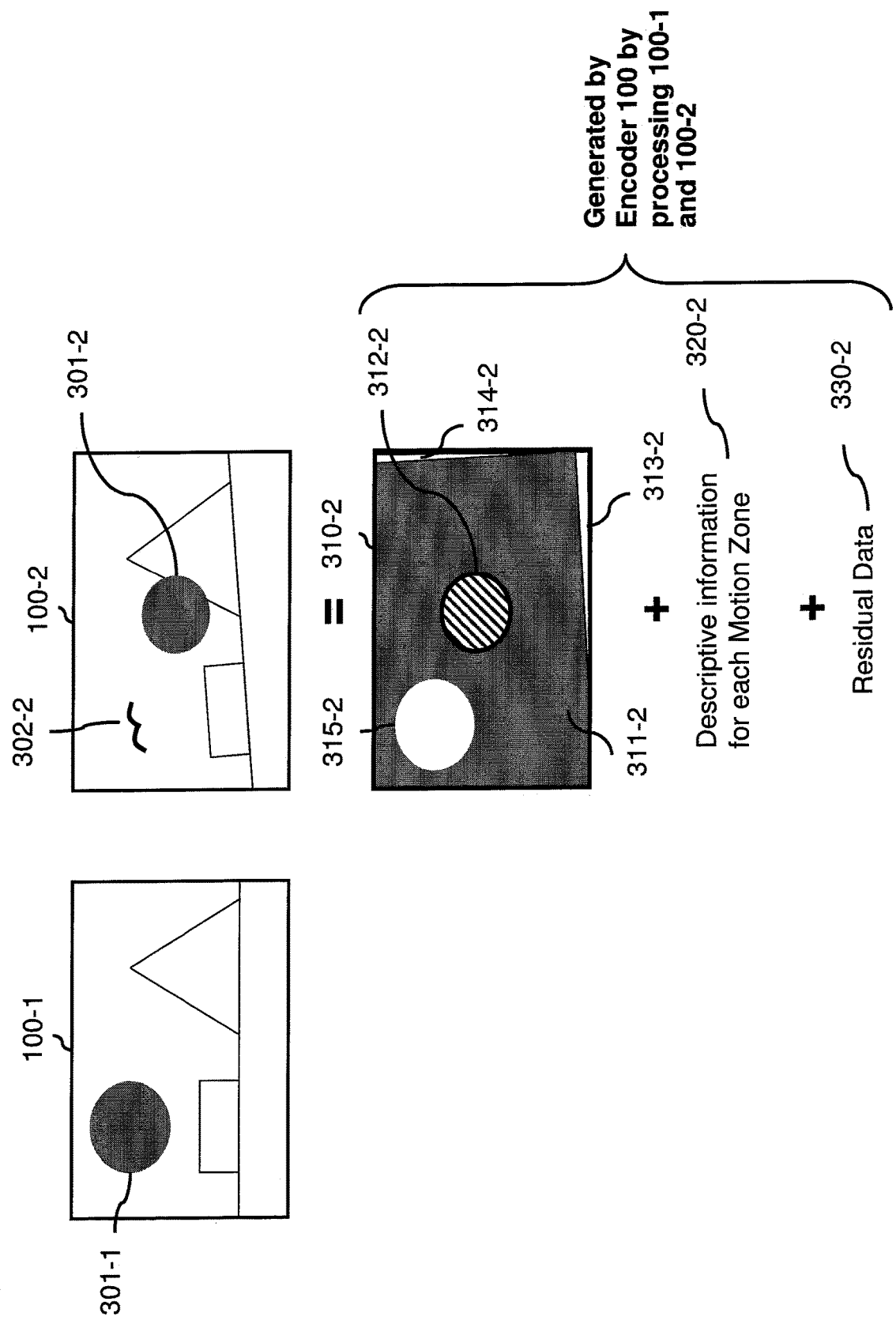

Figure 13

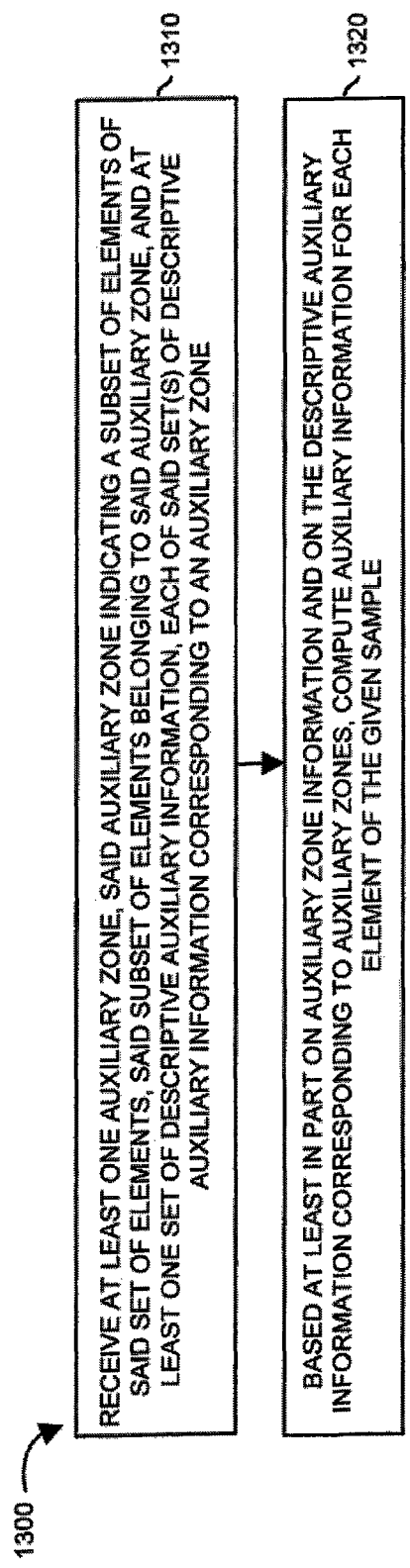

1300

1310 — RECEIVE AT LEAST ONE AUXILIARY ZONE, SAID AUXILIARY ZONE INDICATING A SUBSET OF ELEMENTS OF SAID SET OF ELEMENTS, SAID SUBSET OF ELEMENTS BELONGING TO SAID AUXILIARY ZONE, AND AT LEAST ONE SET OF DESCRIPTIVE AUXILIARY INFORMATION, EACH OF SAID SET(S) OF DESCRIPTIVE AUXILIARY INFORMATION CORRESPONDING TO AN AUXILIARY ZONE

1320 — BASED AT LEAST IN PART ON AUXILIARY ZONE INFORMATION AND ON THE DESCRIPTIVE AUXILIARY INFORMATION CORRESPONDING TO AUXILIARY ZONES, COMPUTE AUXILIARY INFORMATION FOR EACH ELEMENT OF THE GIVEN SAMPLE

PROCESSING OF MOTION INFORMATION IN MULTIDIMENSIONAL SIGNALS THROUGH MOTION ZONES AND AUXILIARY INFORMATION THROUGH AUXILIARY ZONES

RELATED APPLICATIONS

This application is a continuation of earlier filed U.S. patent application Ser. No. 13/893,672 entitled "ESTIMATION, ENCODING AND DECODING OF MOTION INFORMATION IN MULTIDIMENSIONAL SIGNALS THROUGH MOTION ZONES, AND AUXILIARY INFORMATION THROUGH AUXILIARY ZONES," filed on May 14, 2013, the entire teachings of which are incorporated herein by this reference.

U.S. patent application Ser. No. 13/893,672 is related to and claims the benefit of U.S. Provisional Patent Application Ser. No. 61/646,797 entitled "SIGNAL ENCODING, DECODING AND RECONSTRUCTION OF TIME-BASED AND/OR MULTIDIMENSIONAL SIGNALS BASED ON MULTIDIMENSIONAL TIER-BASED INHERITANCE" filed on May 14, 2012, the entire teachings of which are incorporated herein by this reference.

This application is related to and claims the benefit of U.S. Provisional Patent Application Ser. No. 61/647,426 entitled "ESTIMATION, ENCODING, DECODING AND USAGE OF MOTION INFORMATION IN MULTIDIMENSIONAL SIGNALS THROUGH MOTION ZONES, MOTION MATRIXES, WARP MAPS AND MOTION TRANSFORMS" filed on May 15, 2012, the entire teachings of which are incorporated herein by this reference.

This application is also related to U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference.

This application is related to U.S. patent application Ser. No. 13/188,201 entitled "TIERED SIGNAL DECODING AND SIGNAL RECONSTRUCTION," filed on Jul. 21, 2011, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY," filed on Jul. 21, 2011, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on Jul. 21, 2011, the entire teachings of which are incorporated herein by this reference.

This application is related to U.S. patent application Ser. No. 13/352,944 entitled "SIGNAL ANALYSIS AND GENERATION OF TRANSIENT INFORMATION," filed on Jan. 18, 2012, the entire teachings of which are incorporated herein by this reference.

This application is related to U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION," filed on Nov. 23, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY," filed on Jul. 21, 2011, the entire teachings of which are incorporated herein by this reference.

This application is related to U.S. Provisional Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY," filed on Nov. 10, 2011, the entire teachings of which are incorporated herein by this reference.

This application is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY," filed on Nov. 23, 2011, the entire teachings of which are incorporated herein by this reference.

This application is related to U.S. Provisional Patent Application Ser. No. 61/587,989 entitled "DISTINCT ENCODING/DECODING OF STABLE/PREDICTABLE INFORMATION AND TRANSIENT/STOCHASTIC INFORMATION," filed on Jan. 18, 2012, the entire teachings of which are incorporated herein by this reference.

This application is related to U.S. patent application Ser. No. 13/744,808 entitled "DISTINCT ENCODING AND DECODING OF STABLE INFORMATION AND TRANSIENT/STOCHASTIC INFORMATION" filed on Jan. 18, 2013, the entire teachings of which are incorporated herein by this reference.

BACKGROUND

Motion estimation in the known art is the process of determining motion vectors that describe the transformation from one picture to another, usually from adjacent pictures in a video sequence. Motion estimation is typically based on an assumption that image values (e.g., brightness, color, etc., expressed in a suitable color space) remain constant over time, whereas their position in the image may change.

In known methods such as MPEG (Moving Picture Expert Group) methods, motion vectors may relate to the whole image (global motion estimation) or to specific parts, such as rectangular blocks, or even per each element of the image. The map of all motion vectors ("motion map") can thus possess a different resolution from the image/frames to which it refers. When motion estimation calculates a motion vector per each element of the image (e.g., per each pixel of a frame of a video), the motion map ("accurate" or "dense" motion map) will have the same resolution as the image to which it refers.

Motion maps are helpful for a variety of applications. First, they can notably improve the compression rate of video encoding, since they allow to produce a rendition of an image based on a reference (e.g., in known methods, a previous reference image of the same sequence) already known to the decoder ("motion compensation"), avoiding the need to transmit again the information that can be reused from previous images: the decoder can generate settings for the given element in the current image based on settings of the element in the reference image to which the motion vector points. In fact, basic motion estimation and motion compensation techniques have been employed in conventional video codecs (e.g., MPEG family codecs or other frequency-transform based/block-based codecs) in order to account for movement of an object in a moving picture of multiple sequential images.

For example, using block motion compensation (BMC), the images is partitioned into blocks of elements ("pixels"). Each block B in the current image is predicted based on a block $B_0$ of equal size in a reference image. The position of the block $B_0$ in the reference image with respect to the position of B in the current image ("offset") is typically encoded as a motion vector with two coordinates. In these cases, the motion vector indicates the opposite of the estimated x and y movement of the block of pixels (in particular, it indicates the opposite of the movement since it points from B to $B_0$, while the movement is from $B_0$ to B). The motion vector is typically encoded by using two integer coordinates with sub pixel precision (i.e., can specify movements also of fractions of a pixel, typically in steps of ¼ of a pixel) because the encoder wants to be able to capture also subtle movements of less than a full pixel. According to MPEG family codecs, the blocks are not transformed other than being shifted to the position of the predicted block, and additional encoded information can indicate differences between block $B_0$ and block B.

In addition to video encoding, there are also many other applications that can benefit from motion estimation, ranging from robotics (a dense motion field can help identify objects and/or estimate the z-order of an image, i.e. a z-map associated with the image and making sense of depth) to professional movie post-production/visual effects.

Estimating accurate/dense motion maps that describe the motion of each image element is very complex, so conventional motion estimation techniques try to limit both the computational load and the amount of information required to describe motion. State of the art techniques are usually based on either block matching methods or on optical flow methods.

In block matching methods (typically aimed at applications that require very fast processing and limited amount of motion information, such as video encoding), a small square region of the current image is compared with similar sized regions in the reference image, which is typically oversampled in order to allow for sub-pixel motion estimation, until an offset motion vector that minimizes some error criterion is chosen.

In optical flow methods (typically aimed at applications that require precise description of motion even at the expense of speed and amount of motion information, such as special effects and video editing), the image is preprocessed so as to extract a number of features; then the algorithm tries to identify the precise motion of the features and calculates a dense motion map (i.e., one offset motion vector per each image element) through interpolation, Known encoding techniques based on block motion compensation and on offset motion vectors using integer coordinates (i.e., coordinates with fixed precision, such as $\frac{1}{8}^{th}$ of a pixel) have several important drawbacks, suitably addressed by novel methods described herein. First, the borders of moving object are poorly described by blocks, generating artifacts that must be corrected with residual data (or that corrupt the rendition of the image obtained via motion compensation). Second, the use of offset coordinates with a given sub-pixel precision typically requires to buffer an upsampled rendition (e.g., a very high resolution version) of the reference image at the given sub-pixel resolution: as a consequence, capturing very subtle movements (e.g., $\frac{1}{128}$ of a pixel, important for instance in the case of high frame-rate video signals or in the case of complex movements such as a 1% zoom with 2-degree rotation) is not feasible due to memory limitations. Third, in the case of large objects with a consistent movement (e.g., a large background), a degree of waste of bit-rate is necessary due to the need to encode and transmit multiple correlated (and not necessarily identical) motion vectors. Lastly, these well-known methods are unable to cope very well with more complex movements (e.g., like rotation, zoom, perspective changes, etc.), which are imperfectly defined by translation movements of blocks.

Motion maps are just specific examples of what we defined as "auxiliary maps"—i.e. maps of auxiliary information that is associated to a signal—in a way that for given portions of the signal (e.g., in the case of accurate/dense auxiliary maps, for every plane element of the signal) the auxiliary map specifies suitable information and/or meta-information associated with that portion/element. The signal can be without limitation an audio signal, a 2D image, a 3D volumetric image, a 3D signal including both space and time-based dimensions, or even a signal featuring more than three dimensions. In the case of motion maps for video, this auxiliary information corresponds to the information on motion of each portion of the image and to additional meta-information related to the motion vector (e.g., confidence level, statistical precision, etc.).

Aside from motion maps, other non-limiting examples of auxiliary maps are z-maps (which provide, for every portion/element of the signal, information relative to the depth of field/distance from the observer), simplified motion fields (which provide simplified information on the motion of every portion/element of the signal, e.g. highly quantized motion information suitable to distinguish between what moves with a motion within a given range of movements vs. what is still or moves with a movement outside of the range), class maps (which provide, for every portion/element of the signal, information relative to what class it belongs to, e.g., distinguishing in medical imaging between plane elements belonging to bones, soft tissues, fluids, metals, etc.), and so forth.

One of the key characteristics of auxiliary maps is that they present fairly homogenous areas separated by sharp discontinuities, and it is often inappropriate to modify their resolution (e.g., obtaining a more accurate map starting from a lower resolution one, or vice versa) by leveraging interpolation techniques or other standard upsampling/downsampling techniques. For instance, in a video it would be inappropriate to define the motion of an element at the transition between two objects moving in different ways by means of a motion vector calculated by interpolating the two different motions, since the interpolation would likely lead to a movement that has nothing to do with either of the two movements. In a similar fashion, in a medical image it would be inappropriate to define the value of an element at the transition between a bone and a soft tissue by means of interpolating the two corresponding classes, since the class corresponding to the interpolated value would likely have no meaning in that context.

BRIEF DESCRIPTION OF EMBODIMENTS

Embodiments herein are directed to improvements in methods to estimate, encode and process auxiliary information such as, by way of non-limiting example, motion information (e.g., motion occurred between two neighbouring images of a time-based signal), hence supporting methods such as motion estimation, motion compensation, signal encoding, signal quality enhancement (e.g., denoising, super-resolution, etc.), signal interpolation (e.g., increase of frame-rate), special effects, computer graphics, medical imaging, computer vision, augmented reality applications, etc.

One embodiment herein includes a method for efficiently assigning accurate auxiliary information to each element of a signal, by assigning class information to arbitrary portions/patches of a signal ("motion zones", or more broadly "auxiliary zones")—with size ranging from a single element to the whole signal, and with arbitrarily-defined contiguous and/or non-contiguous shapes—and then assigning suitable auxiliary descriptive information (e.g., without limitation, descriptive information on motion) to each zone, which allows to reconstruct suitable auxiliary information for each element of said zone. For simplicity, non-limiting embodiments illustrated herein usually refer to the use case of motion information and motion zones (allowing to efficiently encode, transmit and decode motion information for every element of a signal), although people skilled in the art can easily understand that the same methods are also applicable for other types of auxiliary information as well (e.g., by ways of non-limiting examples, depth information/z-order information, temperature information, tissue type information, density information, radioactivity information, etc.).

In one of the non-limiting embodiments, motion zones are encoded in a tiered hierarchy that comprises two or more tiers, wherein each of the tiers has a distinct level of quality, and class information relative to motion zones is inherited from a lower level to the next higher level, according to methods described in U.S. patent application Ser. No. 13/188,188, incorporated herein by this reference. This method comprises a decoding step during which motion zones are computed through reconstruction operations by starting from the information of the tier that has the lowest level of quality. The terms "tier" and "level of quality" (or "LOQ") will be used interchangeably in the rest of the application.

For simplicity, non-limiting embodiments illustrated herein refer to a signal as a sequence of multi-dimensional samples (i.e., sets of one or more elements organized as arrays with one or more dimensions, e.g., by way of non-limiting example sets of picture elements organized as two-dimensional images) occurring at a given sample rate along the time dimension. In the description the terms "image" or "plane" (intended with the broadest meaning of "hyperplane", i.e., array of elements with any number of dimensions) will be often used to identify the digital rendition of a sample of the signal along the sequence of samples, wherein each plane has a given resolution for each of its dimensions (e.g., X and Y), and comprises a set of plane elements (or "element", or "pel", for two-dimensional images often called "pixel", for volumetric images often called "voxel", etc.) characterized by one or more "values" or "settings" (e.g., by ways of non-limiting examples, color settings in a suitable color space, settings indicating density level, settings indicating temperature levels, settings indicating audio pitch, settings indicating amplitude, etc.). Each plane element is identified by a suitable set of coordinates.

As non-limiting examples, a signal can be an image, an audio signal, a multi-channel audio signal, a video signal, a multi-view video signal (e.g., 3D video), a volumetric signal (e.g., medical imaging, scientific imaging, holographic imaging, etc.), a volumetric video signal, or even signals with more than four dimensions.

Embodiments illustrated herein will be particularly focused on signals evolving over time and featuring some degree of motion from one sample to the next, i.e., samples are time correlated. Also very high sample rates (e.g., also over 1,000 images per second, the motion of which is typically badly described by conventional motion estimation and compensation methods) are easily addressed by the described embodiments.

For simplicity, non-limiting embodiments illustrated herein often refer to signals that are displayed as sequences of 2D planes of settings (e.g., 2D images in a suitable color space), such as for instance a video signal. However, the same concepts and methods are also applicable to any other types of time-based signal (e.g., multi-view video signals, 3D video signals, sequences of 3D volumetric signals, etc.), and also to non-time-based multi-dimensional signals (e.g., sequences of audio channels of a same audio signal, two-dimensional pictures, volumetric/holographic images, plenoptic images, etc.). As a non-limiting example of a non-time-based signal, a series of two-dimensional slices of a CAT-scan or an MRI (i.e., a non-time-based three-dimensional signal) can be suitably represented as a series of two-dimensional samples along a dimension (i.e., the axis along which the slices were taken), and processed according to methods illustrated herein, as if the axis along which the slices were taken was a time dimension (by assuming either a constant sample rate or even a variable sample rate, according to innovative methods illustrated herein).

Auxiliary information processed by embodiments illustrated herein often refer to the specific use case of 2D auxiliary information (i.e., auxiliary information associated to two-dimensional planes of elements), and in particular to 2D motion information (e.g., providing information to reconstruct a 2D image based on motion compensation of one or more reference 2D images), but the same concepts also apply for any other types of auxiliary information referring to multidimensional signals. By ways of non-limiting examples, other types of auxiliary information suitably processed with novel methods illustrated herein include z-order information indicating depth, three-dimensional motion information (e.g., providing information to reconstruct a volumetric image based on motion compensation of a reference volumetric image), etc. As already mentioned, people that are skilled in the art can easily apply approaches and methods illustrated herein for motion information to other types of auxiliary information (e.g., by leveraging "auxiliary zones" instead of "motion zones", etc.).

In conventional methods, motion estimation and compensation techniques are utilized between two different samples of a same signal evolving over time. For some of the novel non-limiting embodiments described herein, space and time are not wholly independent dimensions to consider in isolation: space and time are just distinct dimensions of a broader multidimensional space called space-time. By representing a sequence of N-dimensional samples (e.g., a sequence of two-dimensional images) as a single (N+1)-dimensional signal (e.g., a three dimensional image), embodiments described herein can effectively process a signal in its space-time (through suitable space-time processing operations), effectively leveraging correlation information also across multiple samples (i.e., not just from one sample to another). In short, some non-limiting embodiments described herein (in particular the ones where a plurality of reference images are motion-compensated in order to generate a motion-compensated prediction of a given image) manipulate the signal in its entirety, generating and processing sets of reconstruction data that refer to a plurality of temporal samples.

In a non-limiting embodiment illustrated herein, a signal processor configured as a decoder receives information specifying arbitrary—contiguous and/or non-contiguous—portions of an image ("auxiliary zones"). For one or more of said auxiliary zones, the decoder receives suitable descriptive information (e.g., by ways of non-limiting examples for the case of motion zones, a motion vector, a motion map of motion vectors, a motion matrix, parameters corresponding to information on zoom/rotation/offset, etc.).

In another non-limiting embodiment illustrated herein, a signal processor configured as an encoder performs motion estimation and identifies one or more motion zones (arbitrary—contiguous or non-contiguous—portions of the signal). In a non-limiting embodiment, the encoder decides the maximum number of motion zones based on a set of parameters (e.g., by way of non-limiting example, available computational power, target encoding latency, target compression efficiency, etc.).

In other non-limiting embodiments illustrated herein, a signal processor is configured to produce an image by performing motions compensation operations on a reference image based on motion information, said motion information specifying motion zones and the motion of each motion zone. In a non-limiting embodiment, the signal processor produces an image with a different number of elements than the reference image. In another non-limiting embodiment, a same element can belong to more than one motion zone.

In a non-limiting example embodiment, a signal processor receives and decodes motion zone information with associated motion information and, for each plane element ("pel") of the signal, based on the motion zones to which the pel belongs and on the motion information associated to the zone and/or to the pel, calculates motion compensation information to support the computation of motion compensated settings for the pel.

Other non-limiting embodiments described herein includes a signal processor configured to decode motion zones and/or other types of auxiliary zones (i.e., portions of a multidimensional signal of any type and shape, also non-contiguous), by leveraging an inheritance-based tiered-hierarchy method according to the methods described in U.S. patent application Ser. No. 13/188,188 of the same authors. For each element of each given Level of Quality of the reconstructed signal, the decoder, based on information inherited from lower Levels of Quality (generating a predicted rendition at the given Level of Quality) and on additional reconstruction data (e.g., residual data to combine with some of the elements of said predicted rendition), decodes class information corresponding to which zone a given element belongs, wherein each zone indicates a portion of the signal with specific properties (e.g., by ways of non-limiting information, auxiliary zones could be used to describe motion zones, color zones, depth zones, etc.). In a non-limiting embodiment, the decoder receives descriptive information indicating properties (e.g., by ways of non-limiting examples, information on motion, information on color settings, information on depth, information on noise, etc.) for each auxiliary zone identified with class information.

More specifically, non-limiting embodiments illustrated herein include a signal processor such as a decoder configured to reconstruct an auxiliary zone map at subsequently higher levels of quality in a hierarchy. The signal processor receives a first set of reconstruction data to reconstruct the signal at a first level of quality in the hierarchy. The first set of reconstruction data includes a symbol specifying an attribute setting of a parent element (e.g., by way of non-limiting example, a suitable value indicating zone information) in the rendition of the signal at the first level of quality. The signal processor divides the parent element into multiple sub-elements to reconstruct the signal at a second, higher level of quality. When doing so, the signal processor utilizes the attribute setting of the parent element as specified by the symbol (at the first level of quality) to produce a default attribute setting for one or more respective sub-elements into which the parent element is divided, unless or until a second set of reconstruction data to reconstruct the signal at the second level of quality specifies a different attribute setting for the respective sub-element. When a parent element is assigned a symbol belonging to a specific set ("finalization symbols") the attribute setting of the parent element is inherited by all of its sub-elements and the sub-elements of its sub-elements up until the highest level of quality, without requiring any adjustments (i.e., without need to combine the results of inheritance with any residual data). Accordingly, embodiments herein include reuse of parent setting information when reconstructing an auxiliary zone map at one or more higher levels of quality. Due to the inheritance of setting information from one level of quality to the next, this technique can reduce an amount of data needed to define what elements of the auxiliary zone map belong to what zone. In this way, it is possible to increase encoding/decoding efficiency also for very complicated (and/or non-contiguous) surfaces or multidimensional shapes, without having to encode information corresponding to each of the elements in the auxiliary zone map and without having to reconstruct equations (e.g., spline equations) for any of the borders of the auxiliary zones. In a non-limiting embodiment, subsequent levels of quality are calculated according to fractional scale factors. In another non-limiting embodiment, different pairs of subsequent levels feature different scale factors.

In accordance with another non-limiting example embodiment, the multidimensional shapes encoded with inheritance-based tiered-hierarchy method are received and decoded by a signal processor, and subsequently the signal processor leverages them in the context of a rendering and visualization engine. In this way, the signal processor can receive also very complicated shapes in an efficient way, and subsequently render them properly before sending them to a display device.

Non-limiting example application cases include representation of images characterized by sharp transitions and relatively homogenous areas (e.g., by way of non-limiting examples, vector graphics, cartographic data, cartoons/anime, documents, complex 3D/volumetric surface models, volumetric models characterized by sets of relatively homogenous volumes, etc.). In some of such non-limiting examples, auxiliary zones effectively correspond to color zones.

In a non-limiting embodiment illustrated herein, when performing motion compensation operations, the signal processor is configured to smooth the transition between different zones, generating close to the "borders" (or the "separating surfaces") plane elements that are assigned for a given percentage (according to suitable parameters) to one zone and for a complementary percentage to the other zone (e.g., by way of non-limiting example, assigning to border elements two motion vectors instead of a questionable "intermediate" motion vector).

On motion zone borders, artifacts occur due to occlusion/un-occlusion occurring between neighboring moving objects/zones. In order to reduce artifacts related to uncertainty and/or to mistakes at determining to which motion zone a border element belongs, in a non-limiting embodiment a signal processor configured to perform motion compensation smoothes information on zone belonging across borders (i.e., to smooth the transitions between different zones). In a non-limiting embodiment, zone belonging information is not encoded with Boolean numbers or discrete classes, but with fractional or floating point values (e.g., belonging to each zone is encoded with a fractional number between 0 and 1); in other non-limiting embodiments, motion zone belonging information is enriched with parameters indicating smoothing information (e.g., by way of non-limiting example, alpha blending parameters). In a non-limiting embodiment, motion zone smoothing is obtained by performing a dilation filtering operation followed by a saturated erosion operation (i.e., erosion with a limited lower range). In another non-limiting embodiment, the decoder follows the border between zones and, after calculating the orientation of the tangent, performs a smoothed blending in the direction orthogonal to the tangent.

In a non-limiting embodiment, motion zones encoded according to a inheritance-based hierarchical method, coupled with suitable information on the motion of each of the motion zones, are leveraged in order to efficiently encode/decode auxiliary information to perform motion compensation of a multidimensional signal.

In another non-limiting embodiment, the decoder reconstructs motion compensated settings for elements of an image based at least in part on motion zone information, also leveraging floating point operations and/or on-the-fly resampling operations in order to access any arbitrary position of a reference image, regardless of the actual resolution (i.e., sampling grid) of the reference image. In this way, it is possible to leverage on a coordinate system where each coordinate is expressed with arbitrary precision (e.g., even by a floating point number or a high precision fixed-point number, as opposed to an integer number in the coordinate system of the reference image), so that the resolution of the reference image is treated as essentially infinite/continuous. This approach is extremely innovative since all encoding and decoding techniques have always been based so far on the assumption that the reconstructed signal and reference signals have a finite resolution, with each coordinate specified by a symbol comprised in a discrete range/set of symbols.

In other non-limiting embodiments described herein, descriptive information on motion associated to motion zones includes parameters corresponding to zoom, rotation and offset of each motion zone with respect to a reference. In prior art and conventional methods, motion estimation and compensation in video encoding and video processing has always been limited to translation movements (typically expressed by means of motion vectors with a set of parameters/coordinates indicating direction and radius of the translation movement), which tends to be a limiting and low quality approach for motion compensation. In fact, objects are affected by a much more complex set of possible movements. In order to capture this complexity, innovative embodiments described herein model motion by using transform matrixes (i.e., more than two parameters per each described motion) rather than offset motion vectors (i.e., two parameters per each described motion). Movements consisting of combinations of zoom, rotation and offset can be suitably described using so-called Affine transforms. Other non-limiting embodiments, by using higher order motion matrixes and homogeneous coordinates, also describe perspective transformations (i.e., movements including perspective change) of motion zones.

Usage of transform matrixes instead of offset motion vectors in the video compression domain is very innovative, and notably distinguishes embodiments described herein from conventional methods. For instance, coordinates of elements must be expressed with a rational number resolution (e.g., even with an "infinite resolution" or "continuous resolution" approach) rather than integer or finite precision fractional resolution. Prior art methods frequently adopt the concept of half pel or even higher finite fractional pel coordinates (e.g., ¼ of a pel, ⅛ of a pel, 1/12 of a pel, etc.). In one embodiment, the goal is to capture movements occurring at resolutions higher than the actual integer image resolution (i.e., the sample grid of an image). Traditional motion-compensation methods require to supersample the reference image (e.g., with a scale factor of 8 in order to capture movements up to $1/8^{th}$ of a pixel) with respect to the actual target image: such state-of-the-art approach requires large memory buffers and is unsuitable for movements requiring extremely fine precision (e.g., even $1/100^{th}$ of a pixel or less), since it would also require to calculate a high amount of pixels in the super-sampled reference image that would never be used. In accordance with one embodiment, the novel approach as discussed herein does not require large memory buffers, is extremely fast, and allows motion compensation operations with arbitrary precision (e.g., even $1/100^{th}$ of a pixel or less).

Some non-limiting embodiments described herein use fractional coordinates for elements (e.g., by way of non-limiting example, by using floating point coordinates) and transform matrixes in order to describe movements of motion zones, notably increasing precision in describing the actual movements. A non-limiting embodiment, in performing the necessary calculations, takes advantage of the modern hardware used in gaming and 3D rendering, so as to exploit continuous-coordinate motion compensation at very limited computational cost. Modern hardware can perform interpolations on the fly (e.g., via on-the-fly resampling) by using float coordinates for the computed element. One of the advantages associated with the usage of fractional coordinates and on-the-fly resampling is the possibility to represent very subtle movements while at the same time reducing memory usage at both the encoder and the decoder side. Motion estimation and motion compensation rely on the resampling operations performed on the fly, without any need for generating and storing large reference images at higher resolutions. Continuous coordinates are very important when motion compensation is based on motion matrixes (i.e., more sophisticated movements than a simple translation), because sophisticated movements often require extremely fine sub-pixel resolution, not achievable with the standard technique of supersampling the reference image (e.g., with zoom/divergence, even levels of zoom as small as 1%—i.e., coordinate multiplications by 0.01—are relevant).

Motion matrixes require to send to the decoder a higher number of parameters representing motion with respect to the number of parameters required for simple offset motion vectors: as a consequence, the benefits of using motion matrixes is higher when they are applied to relatively large and arbitrarily-shaped groupings of elements ("motion zones"), e.g. representing an object moving in a consistent way.

In a non-limiting embodiment illustrated herein, a signal processor configured as an encoder receives a current (target) image and a reference image, performs motion estimation and identifies in the current image one or more motion zones (arbitrary—contiguous or non-contiguous—portions of the signal) and corresponding descriptive information on the motion of each motion zone, said motion being expressed in a continuous coordinate system. In a non-limiting embodiment, the encoder decides the maximum number of motion zones based on a set of parameters (e.g., by way of non-limiting example, available computational power, target encoding latency, target compression efficiency, etc.).

In another non-limiting embodiment illustrated herein, a signal processor configured as a decoder receives motion zone information (e.g., a motion zone map) and then receives descriptive information on motion with the motion characteristic of each motion zone (e.g., by way of non-limiting embodiment, by receiving a set of parameters corresponding to a motion matrix for each motion zone). Based at least in part on said motion zone map and on descriptive information on the motion of each motion zone, for each element of the target image the decoder calculates a motion vector, the coordinates of said motion vector being expressed in a continuous coordinate system (e.g., without limitation, by means of floating point numbers). Based on said motion vectors, reference values in arbitrary locations are fetched from a reference image via on-the-fly resampling, allowing for motion compensation with higher precision than traditional approaches based on fixed grids of elements and integer-based coordinates.

In accordance with further more specific embodiments, the input signals to which auxiliary zones correspond may be encoded and decoded by means of a tier-based hierarchical encoding method, leveraging the techniques illustrated in the patent applications incorporated herein as reference.

These and other embodiment variations are discussed in more detail below.

Note that embodiments herein may be implemented in software or hardware, or may be implemented using a combination of software and hardware, and can include a configuration of one or more computerized devices, routers, network, workstations, handheld or laptop computers, tablets, mobile phones, game consoles, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, DVD-ROM or BLU-RAY), flash memory card, floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

One or more embodiments herein include a computer readable storage medium and/or system having instructions stored thereon. The instructions, when executed by computer processor hardware of one or more computer devices, causes the computer processor hardware to perform operations of: receiving at least one auxiliary zone, said auxiliary zone indicating a subset of elements of said set of elements, said subset of elements belonging to said auxiliary zone, and at least one set of descriptive auxiliary information, each of said set(s) of descriptive auxiliary information corresponding to an auxiliary zone; and based at least in part on auxiliary zone information and on the descriptive auxiliary information corresponding to auxiliary zones, computing auxiliary information for each element of the given sample.

One or more embodiments herein include a computer readable storage medium and/or system having instructions stored thereon. The instructions, when executed by computer processor hardware of one or more computer devices, causes the computer processor hardware to perform operations of: receiving zone information specifying multiple elements of the rendition of the signal belonging to a zone; receiving motion information associated with the zone, the motion information encoded to indicate to which corresponding element in a reference signal each of the multiple elements in the zone pertains; and for each respective element in the zone, utilizing the motion information to derive a corresponding location value in the reference signal, the corresponding location value indicating a location in the reference signal to which the respective element pertains.

Accordingly, one or more particular embodiment of the present disclosure is directed to a computer program product that includes a computer-readable hardware storage medium having instructions stored thereon for supporting signal processing operations.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce bitstreams of encoded data, or that process bitstreams of encoded data and produce renditions of signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3A shows two sample images that are object of motion estimation and compensation, together with the corresponding information generated at an encoder according to embodiments herein.

FIG. 13 is an example diagram illustrating a method according to embodiments herein.

DETAILED DESCRIPTION AND FURTHER SUMMARY OF EMBODIMENTS

Figure 1:
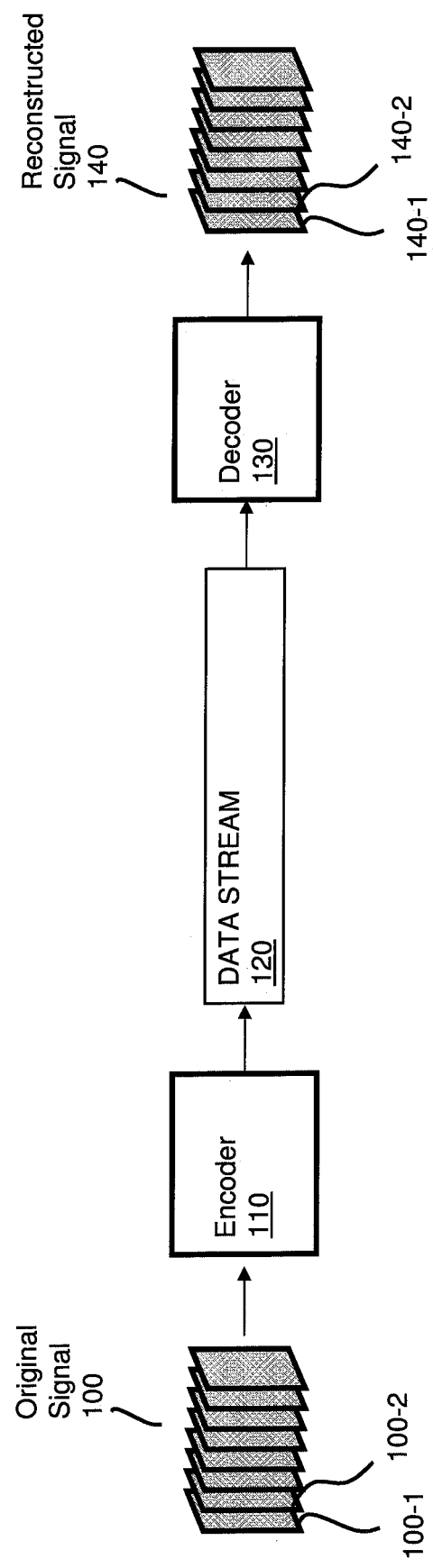
FIG. 1 shows a system for signal encoding and decoding, according to embodiments herein.

Methods for reconstructing samples of a signal illustrated herein are suitable for any type of auxiliary information of any type of multi-dimensional signals, including without limitation sound signals, multichannel sound signals, pictures, images, two-dimensional images, video signals, multi-view video signals, 3D video signals, volumetric signals, volumetric video signals, medical imaging signals, signals with more than four dimensions, etc.

For simplicity, along the description the illustrated embodiments usually adopt the use case of motion zones used in the context of motion compensation operations for the encoding and decoding of video sequences, i.e., time-based signals consisting of a sequence of 2D images (commonly called "frames", or "fields" in the case of interlaced video signals), with each element (in such non-limiting example case typically referred to as "pixel") being characterized by a set of color settings in a suitable color space (e.g., YUV, RGB, HSV, etc.). Different color planes (e.g., the luminance-Y plane and the two chrominance—U and V—planes) are often encoded separately, and often with different resolutions (due to the lower sensitivity of the human eye to chrominance information).

In other cases we will represent the signal to which auxiliary information is associated as a sequence of N-dimensional samples, and refer to the fact that the full representation of the signal is an (N+1)-dimensional signal (e.g., if one of the dimensions is time, this corresponds to representing a sequence of spatial renditions with a single time-space rendition). These are to be considered non-limiting examples of the possible kinds of signals that can be processed using innovative methods described herein.

For signals other than videos, people skilled in the art can easily apply methods described herein by suitably adapting the approaches described for the use case of video signal. In a non-limiting example, samples can also be hyperplanes of elements with a different number of dimensions other than two (e.g., one-dimensional samples, three-dimensional samples, etc.) and/or it is possible to apply to dimensions different than time approaches that correspond to the ones described herein for the time dimension. People skilled in the art can also easily apply methods described herein for motion zones and motion information also to other types of auxiliary information (such as, by way of non-limiting examples, depth information, color class information, tissue class information, etc.).

Every sample in time of a signal is represented with a hyperplane (or more simply "plane", intended in its broadest meaning as "set of elements organized as an array with one or more dimensions"): for example a 2D HD video frame, or a 3D volumetric medical image are both represented with arrays of plane elements (specifically, a 2D plane of elements for the HD video frame and a three-dimensional hyperplane of elements for the volumetric medical image).

Methods and embodiments illustrated herein can be used in conjunction with one another and/or with other methods. Many of the preferred embodiments illustrated herein describe techniques and algorithms with the goal of achieving compression, i.e., encoding a suitable rendition of the signal with a minimum quantity of bits. This also is a non-limiting example: other non-limiting embodiments achieve different purposes, such as robust and efficient filtering, image denoising, signal supersampling, machine vision, etc.

FIG. 1 is an example diagram illustrating a system for signal encoding and decoding, according to non-limiting embodiments illustrated herein.

An original signal 100—including a plurality of images 100-1, 100-2, . . . , 100-n—is processed by encoder 110. Encoder 110 generates datastream 120, which is received and processed by decoder 130. Decoder 130 processes datastream 120, reconstructing signal 140, wherein each reconstructed image 140-i of reconstructed signal 140 corresponds to image 100-i of original signal 100. Reconstructed signal 140 can be an exact replica of original signal 100 or a substantially similar rendition of original signal 100.

Figure 2A:
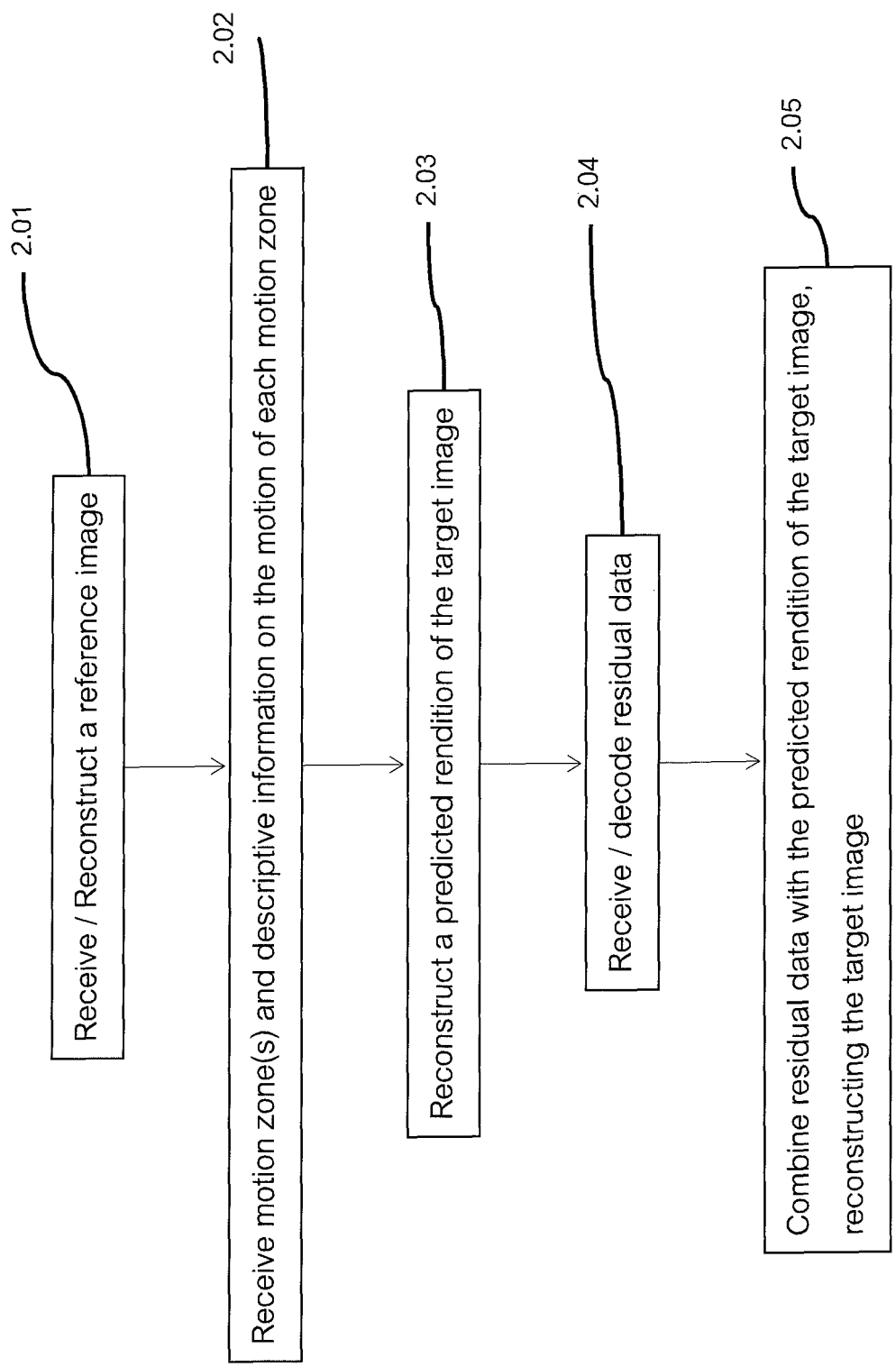
FIGS. 2A and 2B show high-level flow charts according to embodiments herein.

FIG. 2A shows a high-level flow chart of a non-limiting embodiment of decoding based on motion zones according to embodiments herein.

In order to reconstruct a target image, in step 2.01 a decoder 130 receives a reference image (if necessary decoding it and reconstructing it according to suitable operations).

Then in step 2.02 the decoder 130 receives motion zones—i.e., information indicating what elements of the target image belong to what motion zone—and descriptive information on the motion of each motion zone. Each zone can represent one or more entities such as one or more moving objects.

In this non-limiting embodiment, motion zones may include a "residual motion zone", i.e., a zone indicating the elements that cannot be reconstructed based on the reference image (e.g., because they belong to objects that are present in the target image but not in the reference image); a residual motion zone is characterized by specific values assigned to its descriptive information on motion. In other non-limiting embodiments, a residual motion zone can be characterized by its relative position in the sequence of motion zones.

In step 2.03, based at least in part on the reference image, on motion zones and on descriptive information on motion, the decoder 130 generates a predicted rendition of the target image. Such predicted rendition is generated by motion compensating the reference image based on motion zone information. As its name suggests, the predicted rendition can be a preliminary rendition of a respective signal being reproduced.

Each given element of each given motion zone corresponds—according to descriptive information on the motion of the given motion zone—to a location of the reference image: for each element of the target image the decoder 130 calculates the corresponding location of the reference image and—based on the values of the elements of the reference image—generates a motion-compensated value for the element.

For elements belonging to a residual motion zone (if any), the decoder sets a default motion-compensated value ("Not available" value).

In step 2.04, the decoder 130 receives and decodes residual data, aimed at adjusting the predicted rendition of the target image. The residual data specifies how to refine the preliminary rendition of the signal such that the overall produced signal is substantially similar or identical to the original signal.

In step 2.05, the decoder 130 combines the predicted rendition of the target image with residual data, reconstructing the target image.

Note that one or more of the high-level steps indicated above can occur concurrently (as is the case for all of the high-level flow charts illustrated in this application), without being strictly sequential.

Figure 2B:
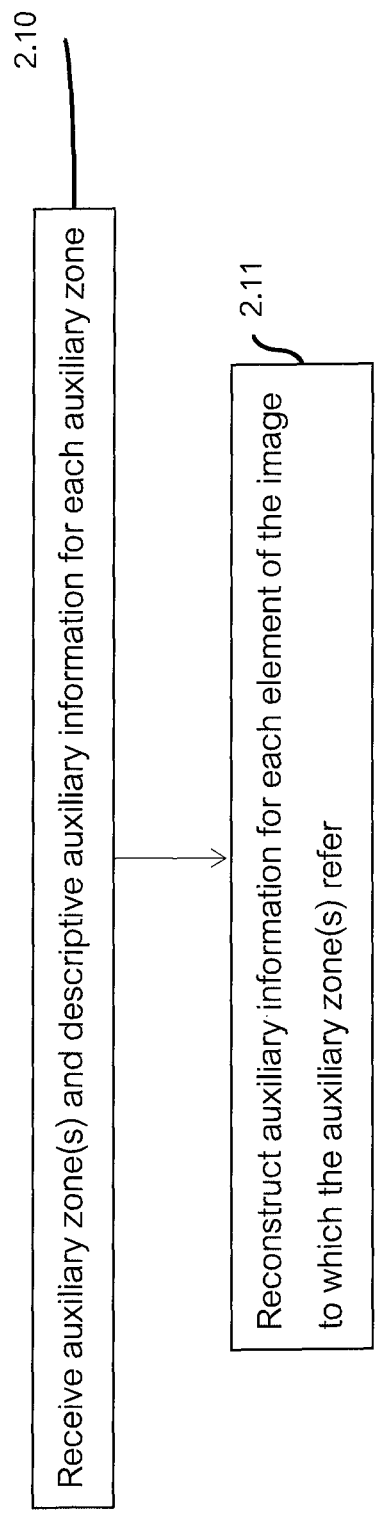

FIG. 2B shows a high-level flow chart of a non-limiting embodiment of decoding auxiliary information based on auxiliary zones (i.e., efficiently generating auxiliary information for each element of a signal without having to receive specific auxiliary information for each element) according to embodiments herein.

In step 2.11, the decoder 130 receives auxiliary zones and descriptive auxiliary information for each auxiliary zone. Auxiliary zones and auxiliary information refer to a specific signal that the decoder 130 is processing.

In step 2.12, based at least in part on the received auxiliary zones and on the descriptive auxiliary information for each auxiliary zone, the decoder 130 generates auxiliary information for each element of the signal to which auxiliary zones refer.

FIG. 3A shows two sample images that are object of motion estimation and motion compensation, together with the corresponding information generated at encoding by encoder 100 according to embodiments herein.

In particular, the diagram illustrates two images 100-1 and 100-2 that are correlated with respect to each other. A same set of coordinates is used to define objects in each of the images, although the images represent different image planes. Without limitation, the image 100-2 may be part of a sequence of multiple images following image 100-1, i.e., the two images may be captured close in time. Combined, the images 100 can be video data displayed on a display screen, to be played back, one after another, on a display screen. Alternatively, according to methods described in other applications of the same authors, image 100-1 may even be an image that was specifically generated in order to serve as a predictor for a plurality of images, including 100-2.

Regardless of the reason why the images 100-1 and 100-2 are significantly correlated, their correlation can be enhanced even further by means of motion compensation. For example, the background slightly rotates counter-clockwise; an object 301-1 in image 100-1 moves to become object 301-2 in image 100-2 (wherein the movement involves both translation toward the lower right and de-zoom, i.e., the object 301 is becoming smaller from one image to the next). As further shown, an object 302-2, not visible in image 100-1, becomes visible in image 100-2 and was not present in image 100-1.

The method according to embodiments herein can include computer processor hardware that, by starting from the images 100-1 (reference image) and 100-2 (target image), encodes/decodes a target image by using motion zones having arbitrary shapes (e.g., contiguous or even non-contiguous), wherein the shapes are chosen on the basis of images 100-1 and 100-2.

Note that the shape of each motion zone can be arbitrary, and is not limited to rectangular blocks like in state-of-the-art methods. In some situations this may allow to increase the efficiency and the effectiveness of motion compensation, more closely following the borders of objects (e.g., avoiding to "drag" elements that are close to the borders of a moving object) and more efficiently transmitting motion information for each given element of an image. In other words, objects in real-life, as captured by images, are ill-represented by rectangular blocks, and generally are not restricted to only one specific shape.

More specifically, by processing images 100-1 and 100-2, an encoder 100 identifies motion zone 311-2 (representing the portion of the background of image 100-2 that can be efficiently predicted by motion-compensating elements of reference image 100-1), motion zone 312-2 (representing object 301-2 of image 100-2, which can be efficiently predicted by motion-compensating object 301-1 in image 100-1) and a non-contiguous residual motion zone made of 313-2, 314-2 and 315-2 (representing the elements of image 100-2 that were not visible in image 100-1, and consequently cannot be predicted by motion-compensating elements of image 100-1).

In accordance with further embodiments, encoder 100 also generates descriptive information 320-2 associated to motion zones. In a non-limiting embodiment, such information comprises a ZRO (Zoom, Rotation and Offset) motion matrix for each motion zone, and a default parameter for the residual motion zone ("N/A motion"—different from no motion, which would mean that the motion zone was still—meaning that the elements of the residual motion zone cannot be suitably predicted through motion compensation).

As a more specific example, descriptive information on the motion of motion zone 312-2 can be computed by trying to transform object 301-1 into object 301-2 through a finite set of transformations, i.e. translation, rotation, zoom, etc. In this particular example, object 301-1 can be multiplied by a scale factor, s, in order to make it of the same size of object 301-2; the center of the object 301 is to be translated along the axes X and Y by quantities tx and ty respectively in order to obtain a suitable prediction of object 301-2. In other words, in addition to becoming smaller in the image 100-2, the object 301 moves from one location in image 100-1 to a new location in image 100-2. Therefore, the descriptive information on motion assigned to motion zone 312-2 comprises a translation parameter along the X axis TX representing the quantity tx, a translation parameter along Y axis TY representing the quantity ty, a scale factor S representing the zoom scale factor s, and a rotation parameter R (not relevant in this example, e.g., equal to zero or substantially because there is no rotation in this example). Without limitation, such information can be summarized with the following parameters: (TX, TY, S, R). For more general Zoom-Rotation-Offset motions, motion information can be summarized with the six parameters of the following Affine transform matrix applied to a vector (x, y, 1) in homogenous coordinates—i.e., (x, y, w) with w normalized to 1:

$$M = \begin{bmatrix} a & b & 0 \\ c & d & 0 \\ TX & TY & 1 \end{bmatrix}$$

More broadly, the above affine matrix M can represent scaling (including anisotropic scaling), rotation, offset and shearing.

In yet other non-limiting embodiments, an even more general motion transformation can be expressed by using a projective transform, i.e., a 3×3 matrix with 8 relevant coefficients, and the $9^{th}$ coefficient normalized to 1, describing with a single transform scaling, rotation, offset, shearing and perspective change. Since some of such transforms require a division operation for each transform, a non-limiting embodiment uses approximate division operations (e.g., by way of non-limiting examples, using only 16 bits, or using some of the algorithms commonly used for shaders).

The detection of motion zones and the generation of descriptive information associated to motion zones can be performed according to suitable motion zone detection methods. In general, motion zones can be identified via analysis of images and identification of representative objects that move from one location to another over a time sequence.

Lastly, encoder 100 generates residual data 330-2 to adjust the prediction of the target image 100-2 obtained by means of motion-zone-based motion compensation of reference image 100-1. When combined with a predicted rendition of an image obtained by motion compensation (such as a motion compensated image), application of residual data allows full reconstruction of a rendition of target image 100-2.

Motion zones can be described in several different ways. Some non-limiting embodiments describe motion zones by means of a class map (i.e., image with a discrete set of colors) wherein each class value identifies a motion zone. Other non-limiting embodiments represent motion zones by means of vector graphics, using geometrical primitives based on mathematical expressions in order to describe motion zones (allowing efficient encoding and decoding of circles, ellipses, polygonal shapes, etc.).

A method for decoding images encoded by using the above-described encoding method comprises the following phases:

a. providing at least one motion zone and one set of descriptive information on motion;
b. providing a first (reference) image;
c. computing a prediction for the second (target) image by using the first image received during phase b, the motion zones and the descriptive information on motion received during phase a;
d. receiving and decoding residual data (if any);
e. combining the prediction for the second image with residual data (if any), obtaining a rendition of the second (target) image.

Also in this case, one or more of the phases can occur concurrently, without being strictly sequential.

In other non-limiting embodiments, information on motion comprises parameters corresponding to a projective transform matrix. In yet other non-limiting embodiments, information on motion comprises parameters of a geometric algebra transform (thus representing even more complex types of motion). In yet other non-limiting embodiments, aside from information on motion of each motion zone, encoder 100 also generates other meta-information or auxiliary information associated to each motion zone, such as—without limitation—a confidence level (or precision of the prediction generated through motion compensation), noise parameters associated to the motion zone, parameters indicating operations to use to reconstruct higher levels of quality of elements belonging to the motion zone, priority of the motion zone (e.g., to drive bitrate optimization heuristics), color information, lighting information (e.g., indicating one or more parameters to use in order to adjust the values of motion-compensated elements), etc.

In a non-limiting embodiment, meta-information associated with one or more motion zones can include a depth map, which influences the way in which descriptive information on the motion of the motion zone is leveraged in order to generate the motion of each element of the motion zone.

A further non-limiting embodiment generates only one motion zone comprising the whole image (which is thus not transmitted to the decoder), and only one set of descriptive information on motion: in such embodiment, motion compensation is achieved by applying a same transform matrix (e.g., representing zoom, rotation and offset) to the whole image.

Another non-limiting embodiment generates only one motion zone (with corresponding descriptive information on motion) and a residual motion zone indicating the elements not suitably predicted via motion compensation.

Other non-limiting embodiments apply the encoding method according to the embodiments herein on images having more than two dimensions (X,Y).

Figure 3B:
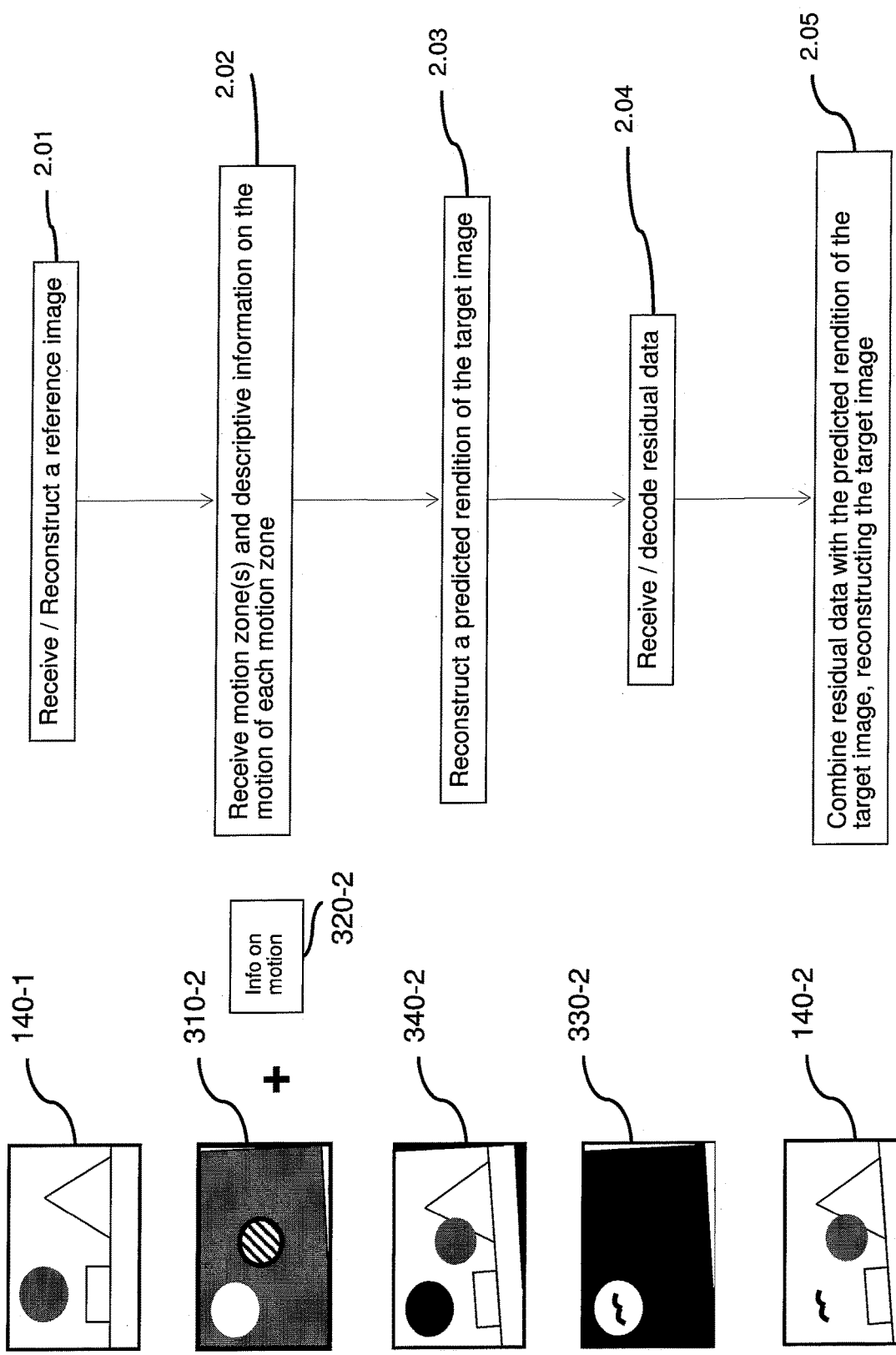
FIG. 3B shows a high-level flow chart of a non-limiting embodiment illustrated herein applied to the two images of FIG. 3A, illustrating the information generated by a decoder during the various steps according to embodiments herein.

FIG. 3B shows a high-level flow chart of a non-limiting embodiment of a decoder 130 receiving the information generated in FIG. 3A and reconstructing image 100-2 based on reference image 140-1 (corresponding to original image 100-1) according to embodiments herein. FIG. 3B also illustrates on the left the information generated by the decoder during the various steps of the process according to embodiments herein. First, in step 2.01 decoder 130 receives data to reproduce reference image 140-1, i.e., the decoded rendition corresponding to original reference image 100-1.

In step 2.02, decoder 130 then receives information defining motion zones 310-2 (allowing the decoder to precisely identify which element of the target image belongs to which motion zone) and descriptive information 320-2 on the motion of each motion zone.

In step 2.03, decoder 130 generates a predicted rendition 340-2 of the target image, by applying motion-compensation to selected portions of reference image 140-1, as indicated by motion zones 310-2 and descriptive information 320-2. In this example embodiment, elements belonging to the residual motion zone are left black, since no prediction is possible based on reference image 140-1.

In step 2.04, decoder 130 decodes residual data. In this non-limiting example, residual data is different from zero only for elements belonging to the residual motion zone (i.e., motion-compensation provided correct predictions). This must be considered just as a simplified example, since in other cases also a plurality of elements predicted based on motion compensation might have to be adjusted via residual data.

In step 2.05, decoder 130 combines residual data 330-2 with predicted rendition 340-2, generating the target image 140-2 (corresponding to original image 100-2).

Also in this case, one or more steps can occur concurrently, without being strictly sequential.

Figure 4A:
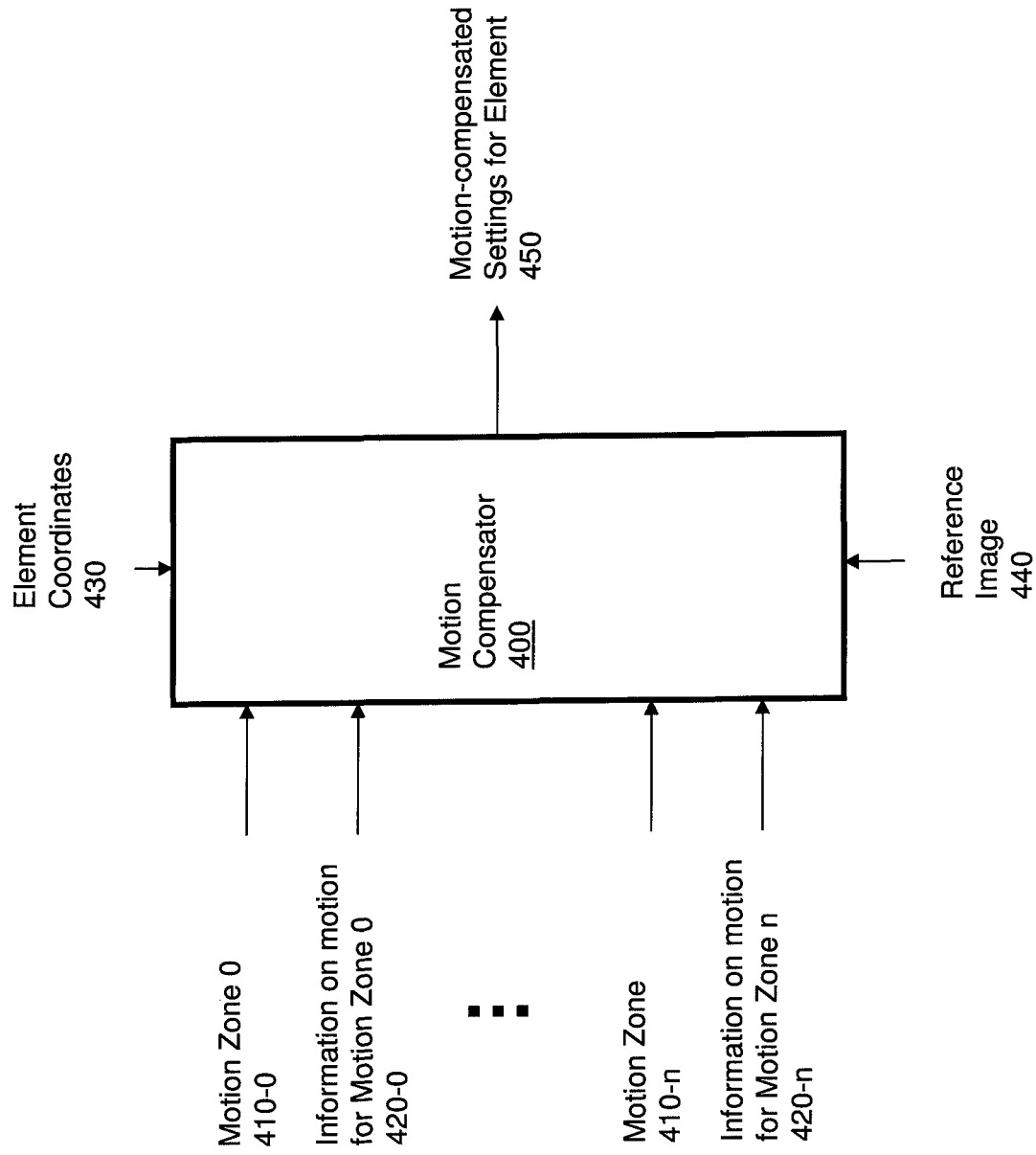
FIGS. 4A and 4B show two block diagrams that implement motion compensation according to non-limiting embodiments illustrated herein.
Figure 4B:
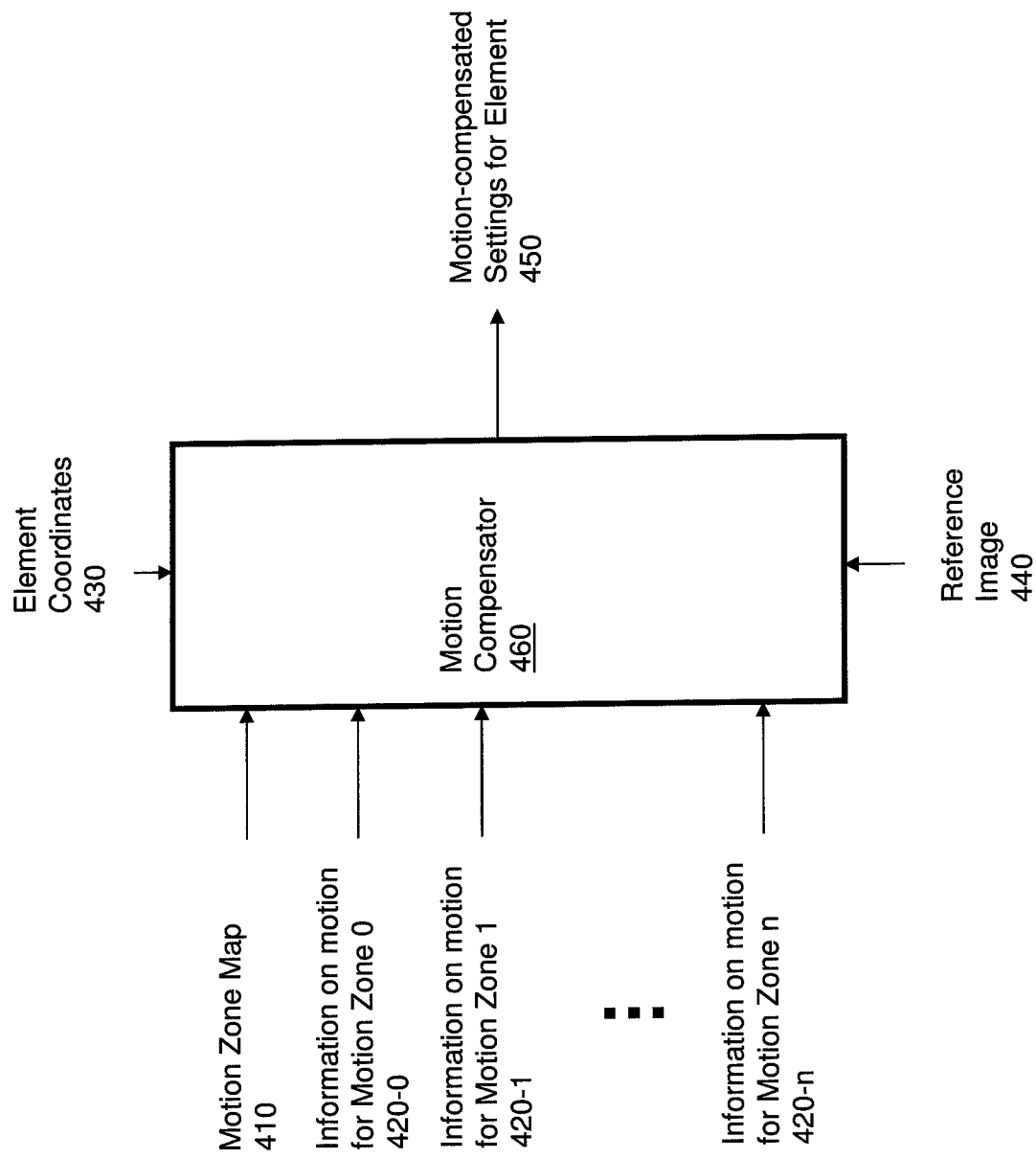

FIGS. 4A and 4B show two block diagrams that implement motion compensation according to non-limiting embodiments illustrated herein.

FIG. 4A, shows motion compensator 400 implementing the above described method for generating a prediction of the target image (i.e., a motion-compensated image) by means of motion compensation according to embodiments herein.

Block 400 receives information comprising a first set of input 410-0, ..., 410-n, and 420-0, ..., 420-n for motion zones and descriptive information on motion, a second input 430 for element coordinates (i.e., identifying the specific element to predict, according to the sample grid of the motion-compensated image), a third input 440 for the reference image, and an output 450 for the motion compensated element. Based on element coordinates (x, y) 430, Motion Compensator 400 identifies the motion zone(s) to which the element belongs, and—based at least in part on the corresponding descriptive information on motion and on element coordinates 430—generates the location $(x^1, y^1)$ in reference image 440 that corresponds to element coordinates (x, y) 430 in the motion-compensated image. Lastly, based on reference image 440 and on the generated location $(x^1, y^1)$, motion compensator 400 calculates the motion-compensated settings 450 (i.e., the prediction) for the specific element at coordinates (x, y) in the motion-compensated image.

FIG. 4B shows a different non-limiting embodiment of motion compensation. Instead of receiving separate sets of data 410-0, ..., 410-n indicating the size and shape of each motion zone, Motion Compensator 460 receives as input a Motion Zone Map 410, comprising indication of the motion zone to which each given element of the motion-compensated image belongs.

For each set of coordinates (x, y) 430 of a given element of the motion-compensated image, Motion Zone Map 410 provides class information on the motion zone(s) to which the given element belongs. Similar to what is illustrated in FIG. 4A, Motion Compensator 460 calculates the location $(x^1, y^1)$ in Reference Image 440 corresponding to element coordinates (x, y) 430 in the motion-compensated image, and consequently generates motion-compensated settings 450 (i.e., the values to assign to the element located in coordinates (x, y) 430 of the motion-compensated image).

In some non-limiting embodiments, the location $(x^1, y^1)$ in Reference Image 440 corresponding to element coordinates (x, y) in the motion-compensated image is indicated with fractional coordinates (e.g., subscriber-pixel level) with respect to the coordinate system of Reference Image 440 (i.e., independently of the sample grid of Reference Image 440). Motion-compensated settings 450 can be calculated by means of on-the-fly resampling, effectively implementing motion compensation of any arbitrary point $(x^1, y^1)$ of Reference Image 440, regardless of the actual resolution of the reference image. Such novel method of motion compensation with continuous coordinates is detailed in a separate patent application filed by the same authors. In some non-limiting embodiments, Motion Zone Map 410 is decoded with a tier-based hierarchical method leveraging inheritance, according to methods further described in other applications of the same authors included herein as reference, wherein the method comprises: decoding a rendition of the motion zone map at a first level of quality; based at least in part on said motion zone map at a first level of quality, producing a preliminary rendition of the motion zone map at a second level of quality, the second level of quality being higher than the first level of quality; decoding a set of adjustment values; and combining said preliminary rendition of the motion zone map at the second level of quality with said adjustment values, producing a rendition of the motion zone map at the second level of quality.

In other non-limiting embodiments, Motion Zone Map 410 is decoded with a tier-based hierarchical method leveraging inheritance, according to methods further described in other applications of the same authors included herein as reference, wherein the method comprises: receiving a motion zone map at a first level of quality, wherein elements of said motion zone map ("parent elements") are assigned either a symbol belonging to a first set of symbols ("finalization symbols") or a symbol belonging to a second set of symbols ("non-finalized symbols"); generating a motion zone map at a second (higher) level of quality, wherein sub-elements at the second level of quality corresponding to a same parent element at the first level of quality are assigned ("inherit") the same symbol (i.e., the same motion zone information) as the parent element; only for sub-elements which were assigned a non-finalized symbol, modifying the assigned symbol based on adjustment data ("residual data"), adjusting the motion zone assigned to one or more of said sub-elements.

Figure 5A:
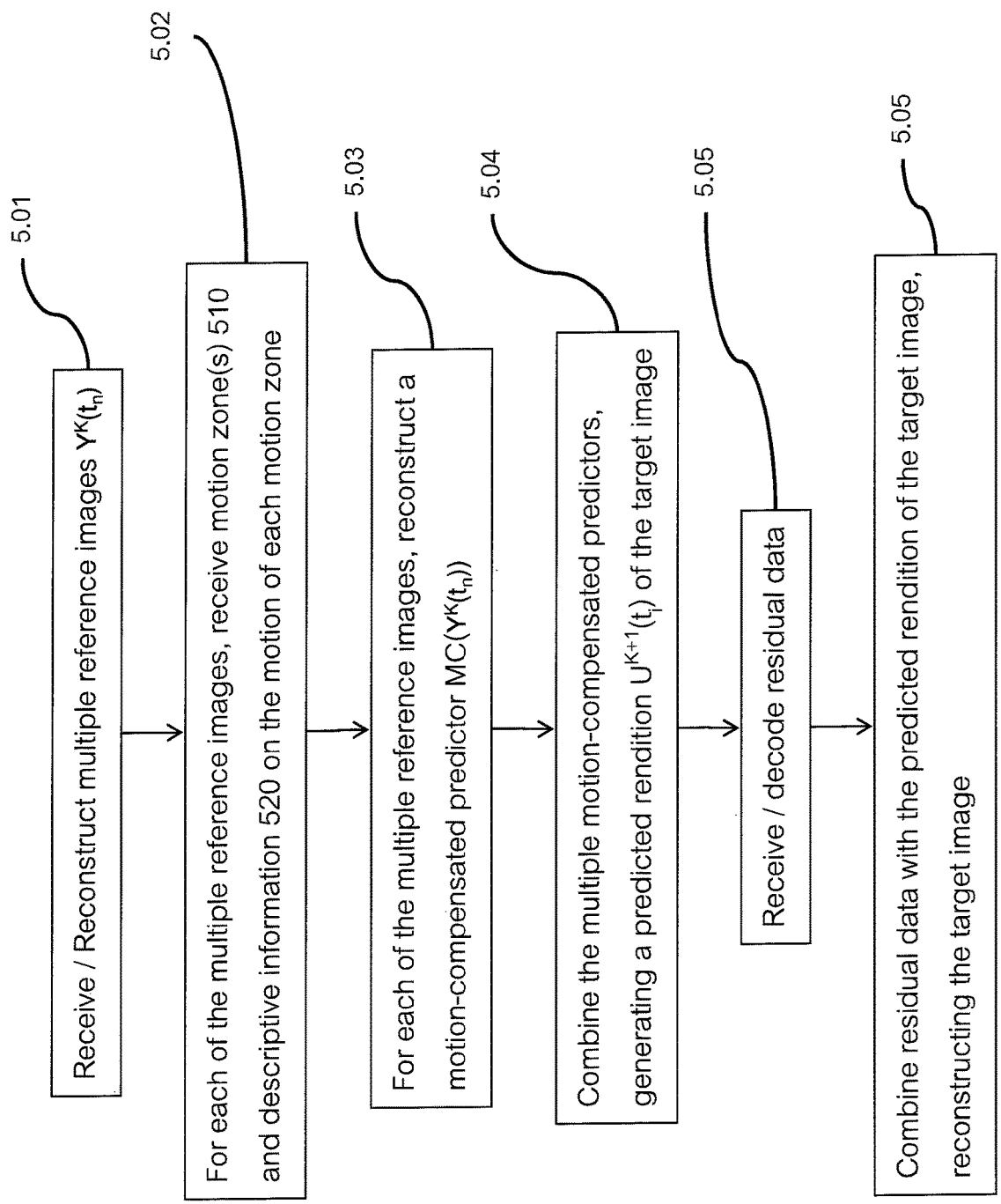
FIGS. 5A and 5B show a high-level flow chart and a block diagram of non-limiting embodiments illustrated herein.
Figure 5B:
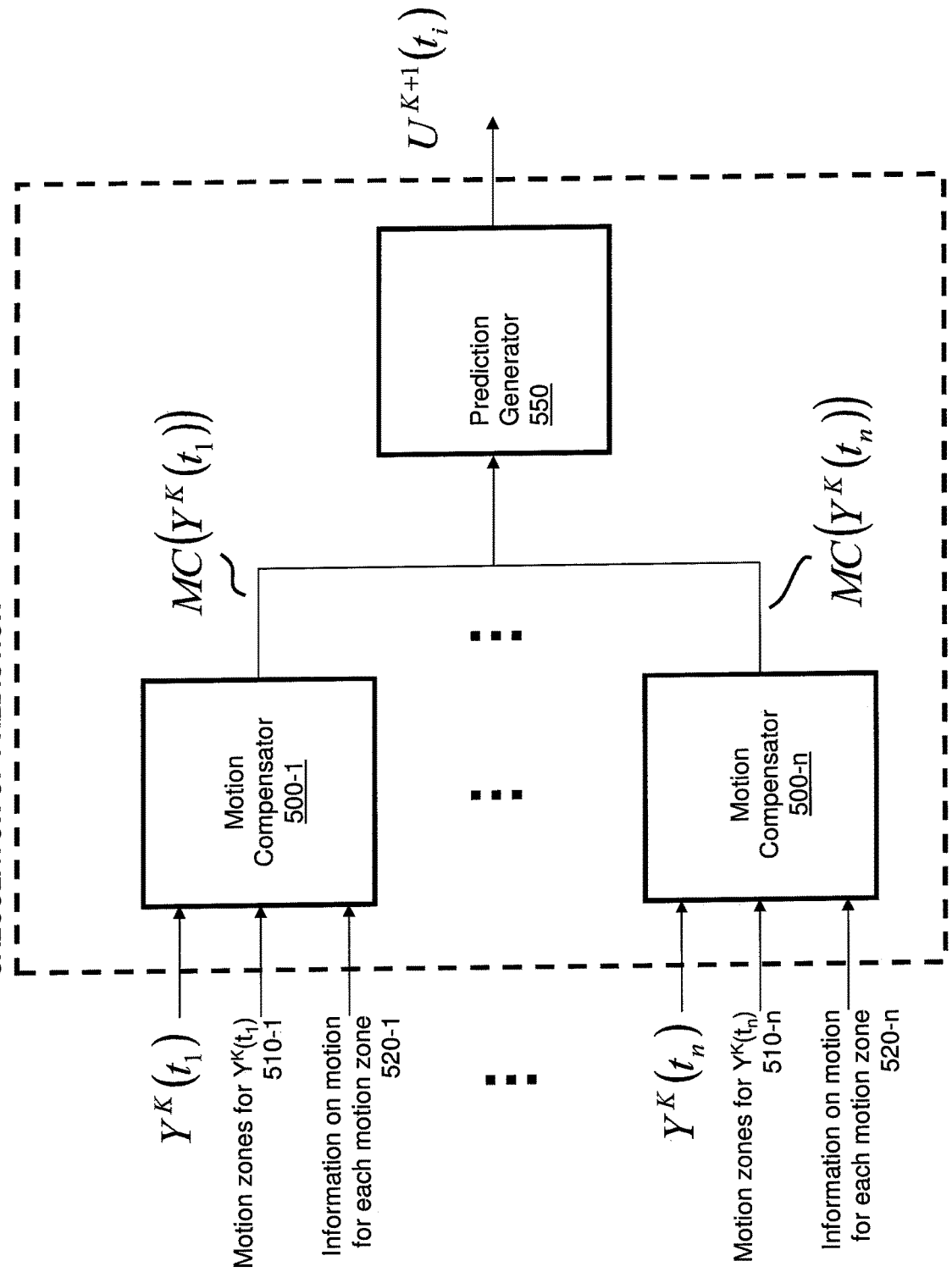

FIGS. 5A and 5B show a high-level flow chart and a block diagram of non-limiting embodiments implementing prediction of a target images based on multiple motion-compensated reference images. Such embodiments are particularly useful for signals where multiple sequential images show correlation with one another, and when the signal is encoded according to a tiered temporal hierarchy (i.e., a set of methods developed by the same authors of this application and not described herein).

More specifically, FIG. 5A shows a high-level flow chart of the method implemented in a signal processor configured as a decoder (as well as within the encoder, in order to simulate the computations performed at the decoding side and generate the appropriate reconstruction data to include in data stream 120) according to embodiments herein.

In step 5.01, decoder 130 receives multiple reference images $Y^K(t_n)$, where K indicates the tier (e.g., the level of temporal aggregation, wherein a lower level indicates that the image refers to a longer temporal span) and $t_n$ indicates the sampling position (which is not necessarily located at the center of the temporal span to which the image refers).

In step 5.02, for each of the multiple reference images, decoder 130 receives motion zone information and descriptive information on the motion of each motion zone. Such information—all relative to the motion between the sampling position of each reference image and sampling position $t_i$ of the target image—will efficiently allow decoder 130 to perform motion compensation on each of the reference images $Y^K(t_n)$.

In step 5.03, for each of the multiple reference images, decoder 130 generates according to embodiments herein—i.e., based at least in part on motion zones, on descriptive information on the motion of each motion zones and on the reference image—a motion-compensated predictor image $MC(Y^K(t_n))$.

FIG. 5B shows a non-limiting embodiment wherein this is performed by means of a Motion Compensator block 500-$i$ per each $MC(Y^K(t_i))$ according to embodiments herein. Other non-limiting embodiment perform some of such operations sequentially rather than in parallel, leveraging a saime Motion Compensator block for a plurality of $MC(Y^K(t_i))$.

In step 5.04, decoder 130 combines (e.g., by way of non-limiting example, with a weighted average) the multiple motion-compensated predictors, generating a predicted rendition $U^{K+1}(t_i)$ of the target image. FIG. 5B shows a non-limiting embodiment wherein this is performed by Predictor Generator block 550 according to embodiments herein. In a non-limiting embodiment, Predictor Generator 550 receives the specific weights to apply to the weighted average of predictors.

In step 5.05, decoder 130 receives and decodes residual data (if any).

In step 5.06, decoder 130 combines residual data with predicted rendition $U^{K+1}(t_i)$, generating the target image.

Also in this case, note that one or more steps can occur concurrently, without being strictly sequential.

In other non-limiting embodiments, a similar method is used to generate predicted images $U^{K-1}(t_i)$, i.e., at a lower level rather than a higher level of reference images $Y^K$.

In yet other non-limiting embodiments, the resolution of predicted images is different (either higher or lower) from the resolution of reference images. In some of such non-limiting embodiments, upsampling and/or downsampling operations are performed jointly with motion compensation operations, so that Prediction Generator 550 combines upsampled motion-compensated renditions at level K+1 (or downsampled motion-compensated renditions at level K−1).

In yet other non-limiting embodiments, renditions of predictor spans $Y^K(t_i)$, . . . , $Y^K(t_n)$ are upsampled or downsampled along spatial dimensions before being motion compensated.

Figure 6A:
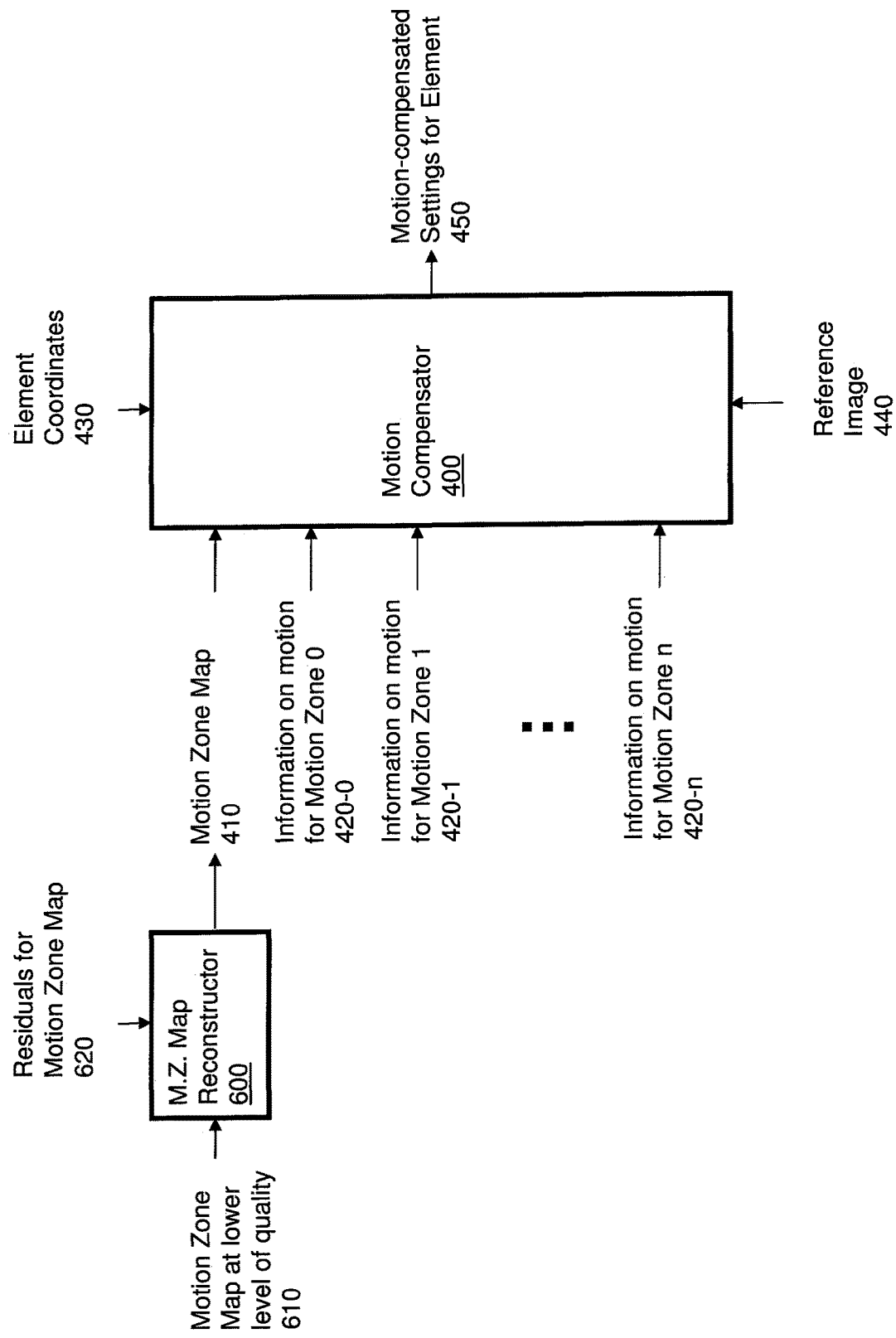
FIGS. 6A, 6B and 6C illustrate non-limiting embodiments of usage of motion zones encoded in a tiered hierarchy, according to non-limiting embodiments illustrated herein.
Figure 6B:
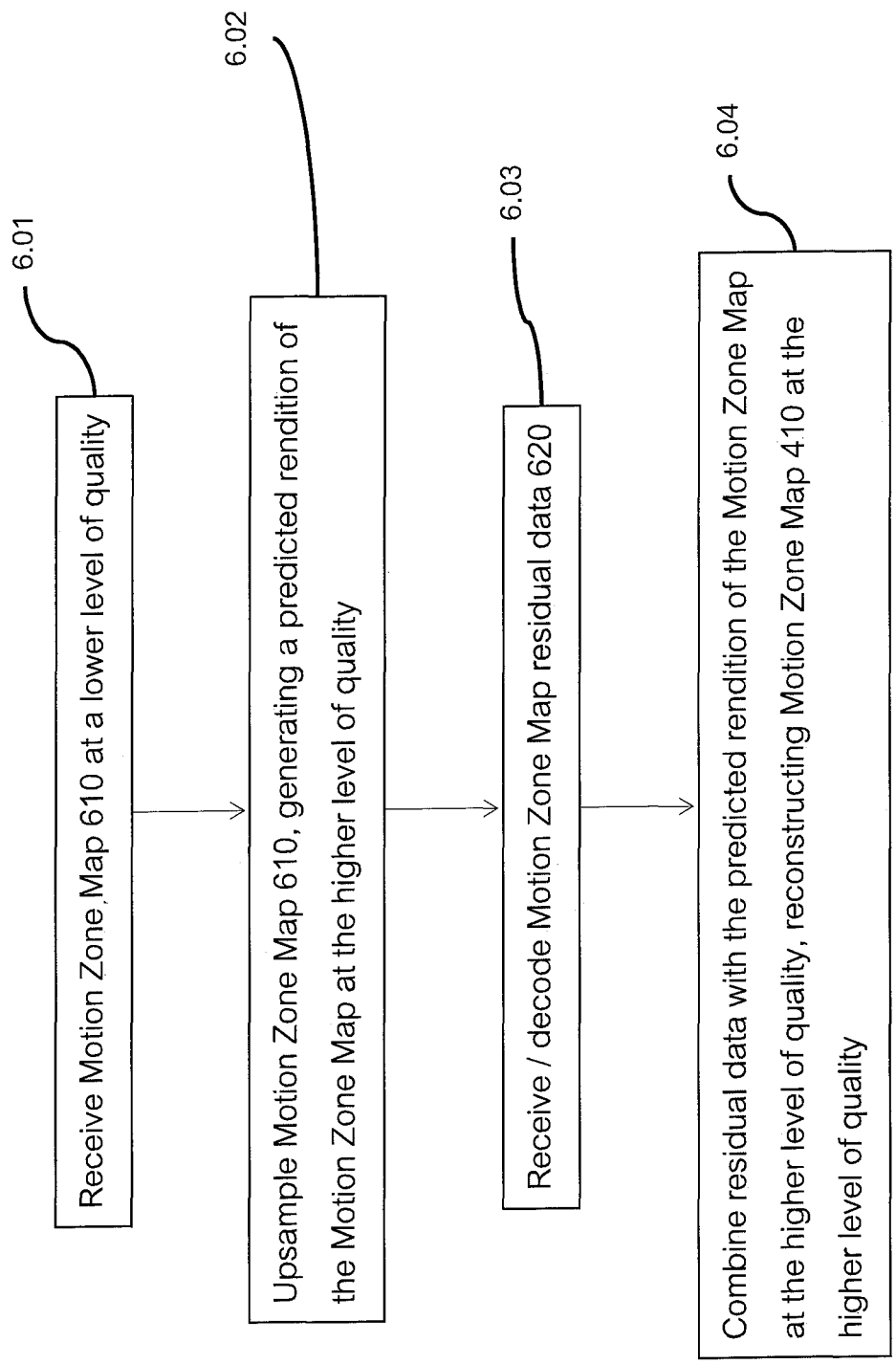
Figure 6C:
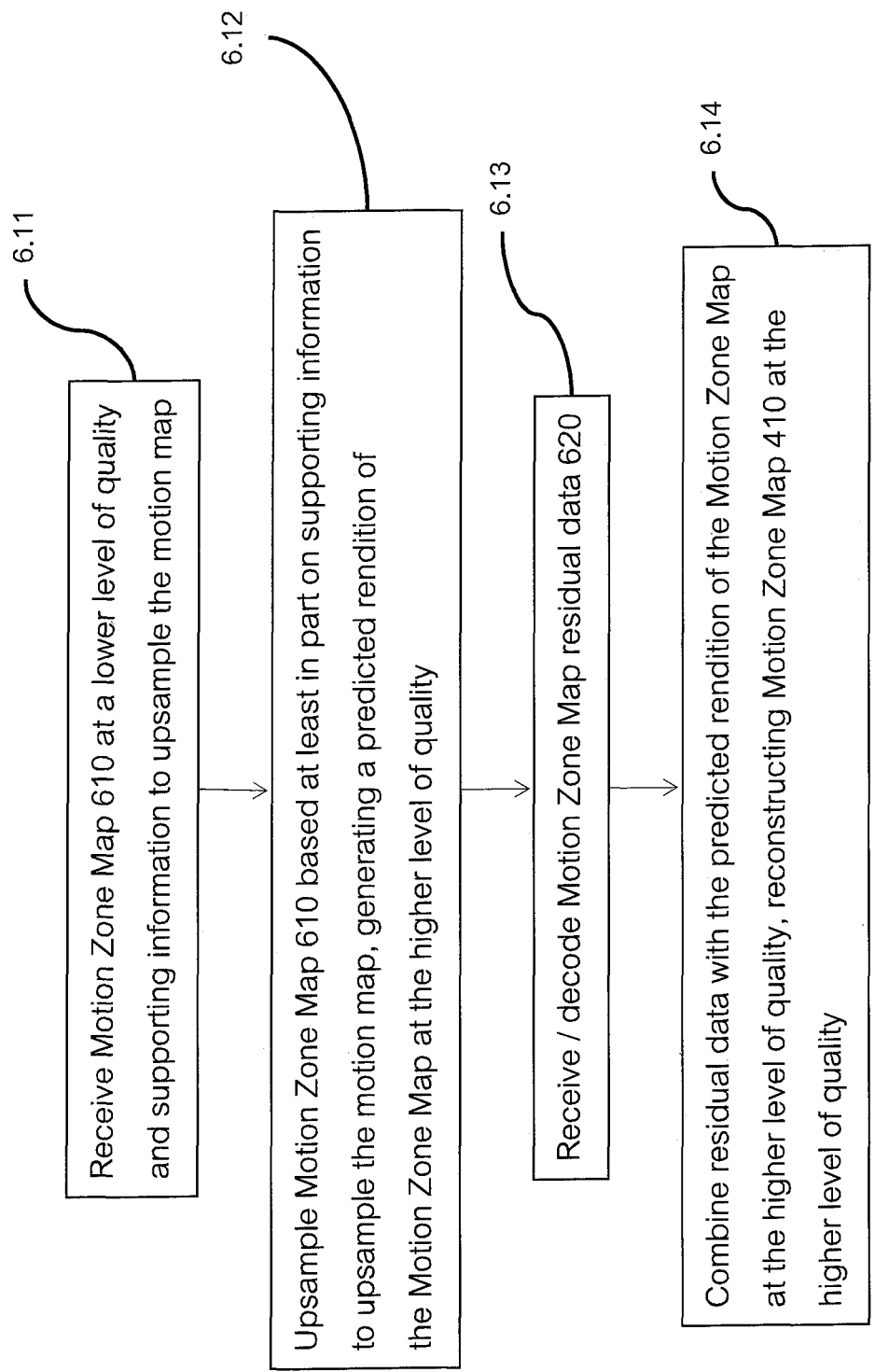

FIGS. 6A, 6B and 6C illustrate non-limiting embodiments of usage of motion zones encoded in a tiered hierarchy (e.g., particularly useful if also the signal is encoded in a tiered hierarchy) according to embodiments herein.

Decoder 130 receives Motion Zone Map 610 at a lower level of quality. By means of Motion Zone Map Reconstructor 600, decoder 130 upsamples Motion Zone Map 610 through suitable upsampling operations, generating a predicted rendition of the Motion Zone Map at a higher level of quality. Motion Zone Map Reconstructor 600 then combines said predicted rendition with residual data corresponding to Residuals 620, thus generating Motion Zone Map 410. The method then proceeds similar to what is illustrated in FIGS. 4A and 4B.

FIG. 6C illustrates the high-level flow chart of a non-limiting embodiment wherein the upsampling of Motion Zone Map 610 is performed by leveraging on additional supporting information received by Motion Zone Map Reconstructor 600. In some non-limiting embodiments, said supporting information comprises parameters indicating the upsampling operations to perform.

In a non-limiting embodiment, said supporting information comprises a reference image at a higher level of quality, and upsampling of Motion Zone Map 610 is based at least in part on said reference image (e.g., without limitation, implementing a bilateral upsampling operation wherein Motion Zones are upsampled by "following the borders" of a luminance image).

In some non-limiting embodiments, Motion Zone Map are encoded in a tiered hierarchy with multiple levels of quality, and upsampling operations leverage on an inheritance method, according to methods described in U.S. patent application Ser. No. 13/188,188 of the same authors.

For example, a Motion Zone Map at a first (lower) level in the hierarchy includes a symbol specifying an attribute setting of a parent element (e.g., by way of non-limiting example, a suitable value indicating that the parent element belongs to a given motion zone and that this will remain true for all of the sub-elements of that parent element, at any higher level of quality). Motion Zone Map Reconstructor 600 divides the parent element into multiple sub-elements to reconstruct the Motion Map at a second, higher level of quality. When doing so, reconstructor 600 utilizes the attribute setting of the parent element as specified by the symbol (at the first level of quality) to produce a default attribute setting for one or more respective sub-elements into which the parent element is divided for the same display region (dividing a parent into sub-elements produces higher resolution image elements for the region), without receiving residual information for such sub-elements (i.e., residuals 620 do not comprise residual information for such sub-elements). Due to the inheritance of motion zone information from one level of quality to the next (such as when upsampling from a lower resolution to a higher resolution rendition), this technique can reduce an amount of data needed to define what elements of the motion zone map belong to what zone, efficiently encoding/decoding also very complicated (and/or non-contiguous) surfaces or multidimensional shapes, without having to encode residual information corresponding to each of the elements in the zone map at a given level of quality and without having to reconstruct equations (e.g., spline equations) for any of the borders of the zones.

In a non-limiting embodiment, for some of the highest levels of quality (e.g., without limitation, the last two levels of quality) Motion Zone Map Reconstructor 600 does not receive Residuals 620, and when upsampling Motion Zone Map 610 is configured to smooth the transition between different zones, generating close to the "borders" between different motion zones elements that are assigned for a given percentage to one zone and for a complementary percentage to the other zone (e.g., by way of non-limiting example, assigning to border elements two motion vectors instead of a questionable "intermediate" motion vector).

Figure 7:
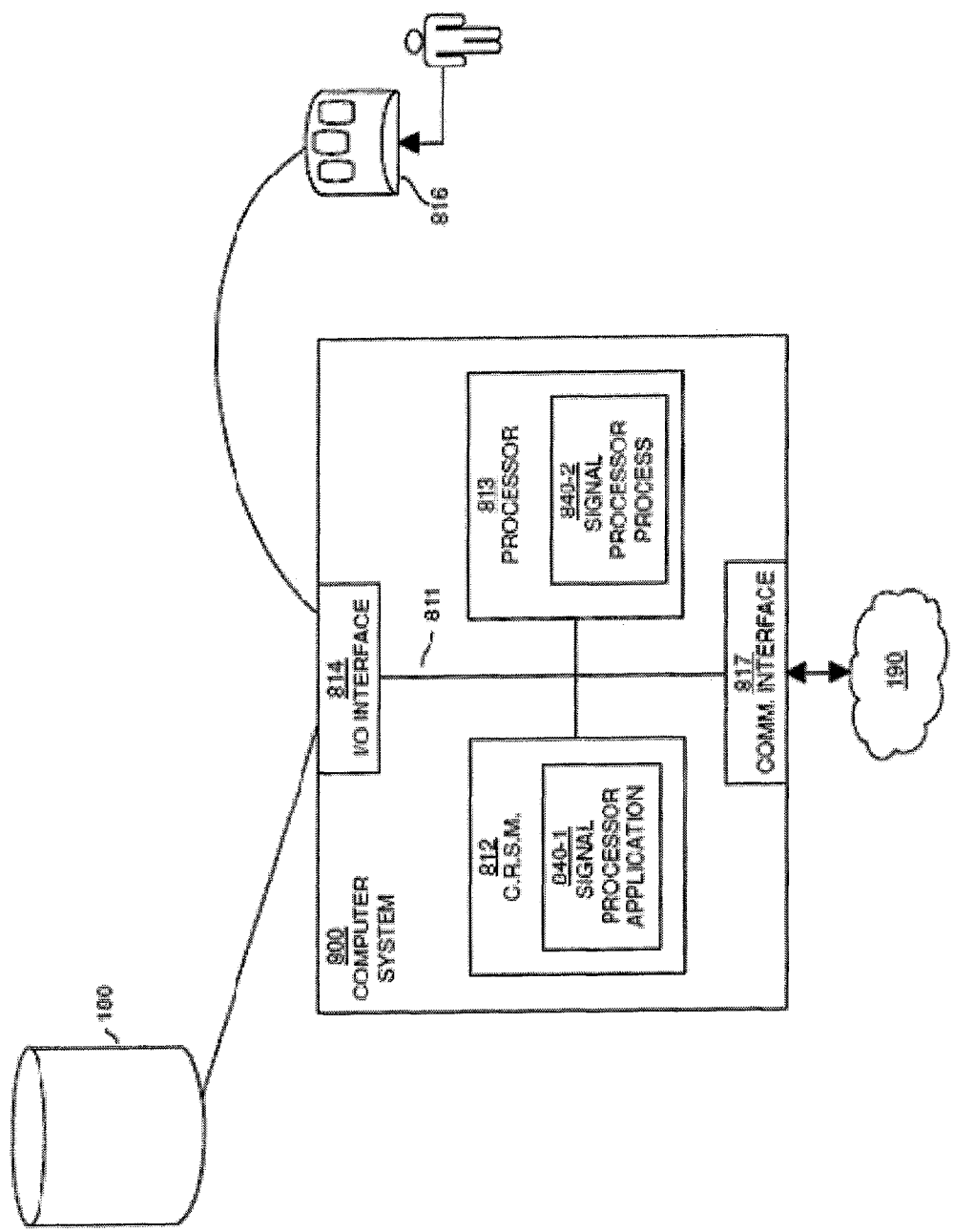
FIG. 7 shows a block diagram of a computer system that provides data processing according to embodiments herein.

FIG. 7 is a block diagram of a computer system 800 that provides computer processing according to embodiments herein.

Computer system 800 can be or at least include a computerized device such as a personal computer, processing circuitry, television, playback device, encoding device, workstation, portable computing device, mobile phone, tablet, console, network terminal, processing device, network device, operating as a switch, router, server, client, etc.

Note that the following discussion provides a basic embodiment indicating how to carry out functionality associated with a signal processor as previously discussed. However, it should be noted that the actual configuration for carrying out the operations as described herein can vary depending on a respective application.

As shown, computer system 800 of the present example comprises a communication bus 811, which provides communication with a computer readable storage media 812 such as a non-transitory computer-readable storage medium, etc., in which digital information can be stored and retrieved.

Computer system 800 can further comprise a processor 813, an I/O interface 814, and a communications interface 817.

In one embodiment, I/O interface 814 provides connectivity to repository 180, and if present, to a screen display, audio speakers, peripheral devices 816 such as a keyboard, a computer mouse, etc.

As briefly mentioned above, the computer readable storage media 812 can be any suitable device and/or hardware such as memory, optical storage, solid state storage, hard drive, floppy disk, etc. In one embodiment, the storage media 812 is a non-transitory storage media (i.e., non-carrier wave media) configured to store instructions associated with a signal processor application 840-1. The instructions are executed by a respective resource such as the processor 813 in order to perform any of the operations as discussed herein.

The communications interface 817 enables computer system 800 to communicate over a network 190 in order to retrieve information from remote sources and communicate with other computers, switches, clients, servers, etc. The I/O interface 814 also enables processor 813 to retrieve or attempt retrieval of stored information from repository 180.

As shown, the computer readable storage media 812 can be encoded with signal processor application 840-1 executed by processor 813 as a process 840-2.

Note that the computer system 800 can be embodied to include a computer readable storage media 812 for storing data and/or logic instructions.

The code associated with the signal processor application 840-1 can implement the functionalities of the signal processors described herein and/or other resources necessary to implement embodiments herein.

During operation of one embodiment, processor 813 accesses computer readable storage media 812 via the communication bus 811 in order to launch, run, execute, interpret or otherwise perform the instructions of signal processor application 840-1 stored in computer readable storage media 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system or other software that controls allocation and use of hardware processing resources to execute signal processor application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, smartphone, tablet, video game console, handheld video game device, a peripheral device such as a switch, modem, router, or, in general, any type of computing or electronic device.

Figure 8:
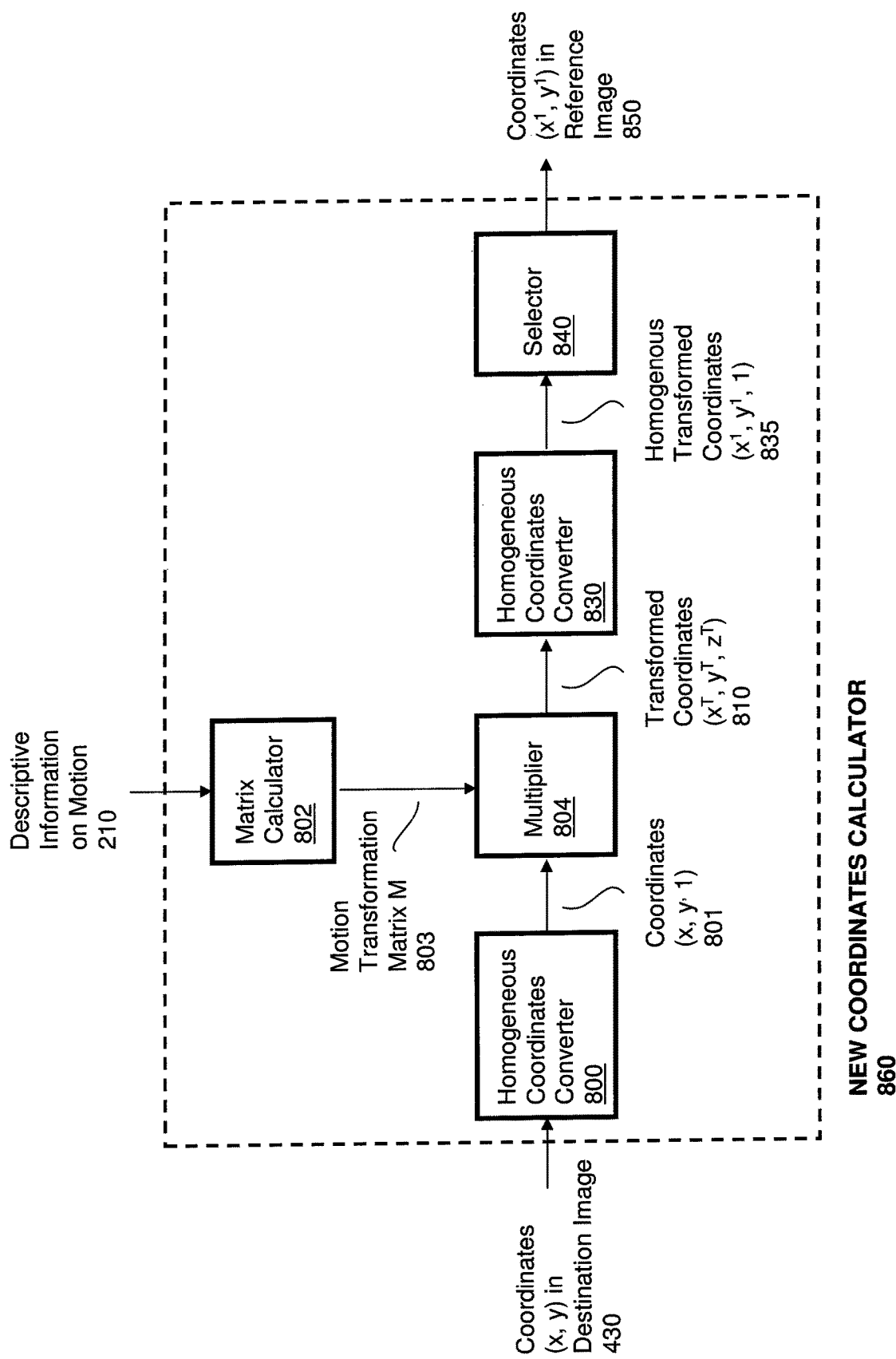
FIG. 8 is an example diagram illustrating generates of coordinates in a reference image based on a coordinates in a motion compensated image according to embodiments herein.

FIG. 8 is an example diagram describing calculation of a reference location in the reference image, illustrating a non-limiting embodiment of New Coordinate Calculator 860 according to embodiments herein.

Homogenous Coordinate Converter 800 receives coordinates (x, y) 430 of the element in the Destination Image and converts them into homogenous coordinates (x, y, 1) 801. The value 1 represents the z coordinate, which is only one deep because the image is a 2-dimensional image. Matrix Calculator 802 receives Descriptive Information on Motion 210 (such as motion information) and converts it into Motion Matrix M 803 (e.g., motion information describing motion attributes of the zone with respect to a reference image).

Multiplier 804 receives homogenous coordinates 801 and motion matrix 803, and calculates Transformed Coordinates 810. If Motion Matrix M 803 was an Affine transform, the third coordinate of Transformed Coordinates 810 would already be equal to one, due to the nature of the coefficients of an Affine transform matrix; otherwise (e.g., if matrix M was a projective matrix) it is necessary to normalize coordinates 810. Homogenous Coordinates Converter 830 performs such normalization (if necessary), generating homogenous coordinates $(x^1, y^1, 1)$ 835. Lastly, Selector 840 generates Coordinates $(x^1, y^1)$ 850 in the Reference Image.

Coordinates (x, y) of the element in the Destination Image describe an element of the sample grid of the Destination Image (i.e., they describe integer positions of the sample grid), while Coordinates $(x^1, y^1)$—expressed with fractional numbers—may describe any arbitrary off-grid (e.g., location of ade that does not fall within the respective grid lines) location of the Reference Image (comprising, without limitation, locations outside of the boundaries of the sample grid of the Reference Image). Coefficients of Matrix M 803 may be fractional numbers, and calculations performed within New Coordinate Calculator 860 comprise calculations with fractional numbers (e.g., without limitation, floating point operations, or operations with high-precision fixed point numbers).

As discussed herein, coordinates calculator 860 produces a coordinate value in the reference image for each element in a respective zone of an image being reconstructed.

Figure 9:
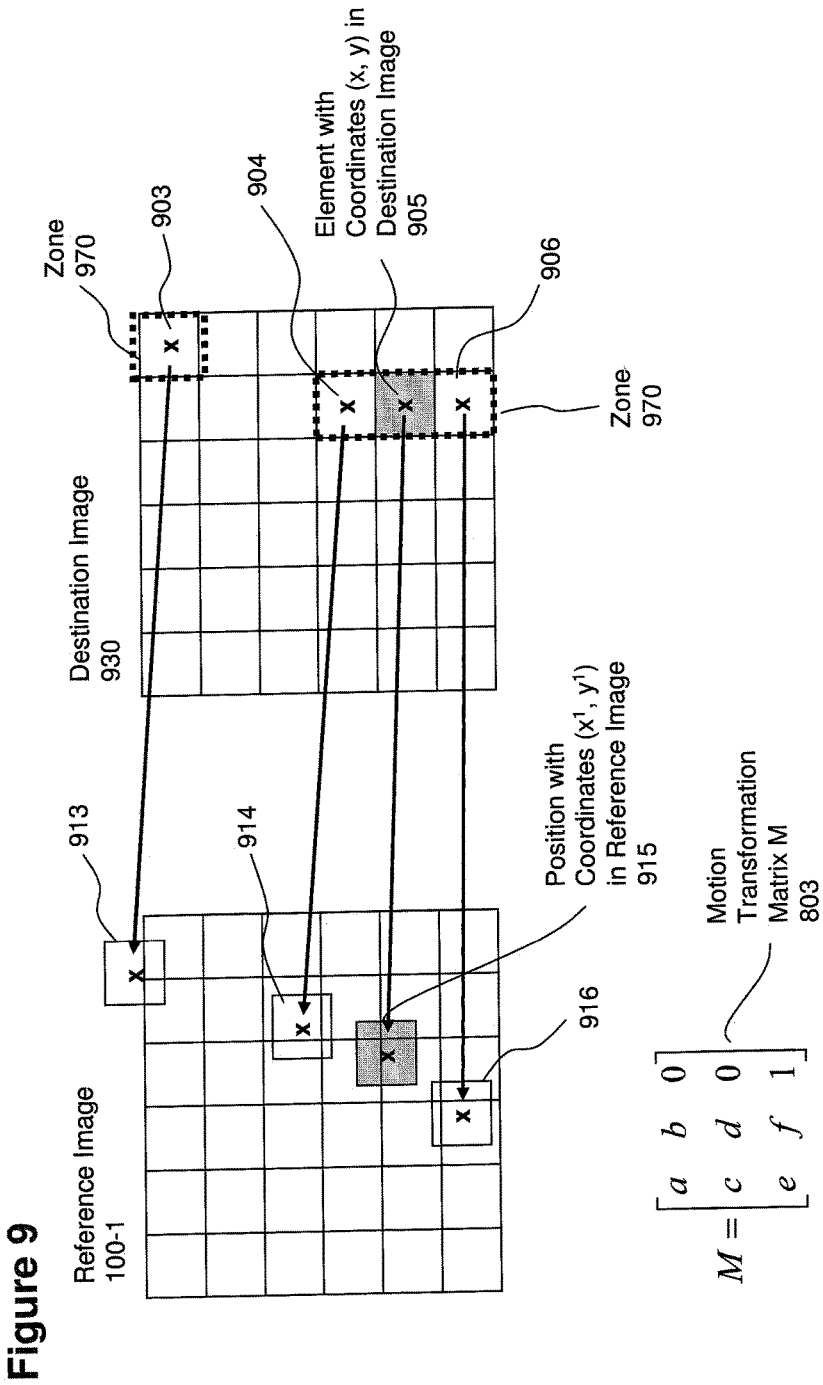
FIG. 9 is an example diagram illustrating generation of coordinates in a reference image for each of multiple elements in a zone according to embodiments herein.

FIG. 9 illustrates a non-limiting example embodiment of the computations described in FIG. 4A. The non-limiting example shows a case in which Motion Matrix M 803 corresponds to an affine transform, so that the multiplication of (x, y, 1) times Matrix M generates a set of coordinates ($x^1$, $y^1$, 1) that is already normalized.

In a non-limiting embodiment, when coordinates 430 of element 905 and matrix 803 are such that coordinates 850 of location 915 are outside of the reference image beyond a threshold (e.g., without limitation, outside of the sampling grid of the reference image by an amount higher than the distance between two neighbouring elements), element 905 is assigned a default value (e.g., "N/A" value). This is not the case shown in the figure, though, since element 915 is located inside the reference image.

As shown in FIG. 9, the elements 903, 904, 905, and 906 are all members of zone 970. These display elements represent an object captured in reference image 100-1. In this example, the object represented by the display elements 903, 904, 905, and 906 is a smaller rendition of the object captured by reference image 100-1. Thus, generated coordinates 913, 914, 915, and 916 appear spread out with respect to each other compared to a closeness of display elements 903, 904, 905, and 906 with respect to each other.

Via matrix 803, the computer processor hardware identifies location coordinates 914, 915, and 916 associated with display elements 904, 905, and 906. In this example, the computer processor hardware generates coordinates 914 for display element 904; the computer processor hardware generates coordinates 915 for display element 905; the computer processor hardware generates coordinates 916 for display element 906. Via the same matrix 803, the computer processor hardware also identifies location coordinates 913 associated with display element 903, generating coordinates 913 for display element 903. In other words, elements belonging to a same motion zone leverage a same motion matrix in order to generate coordinates for their corresponding location in the reference image.

Figure 10:
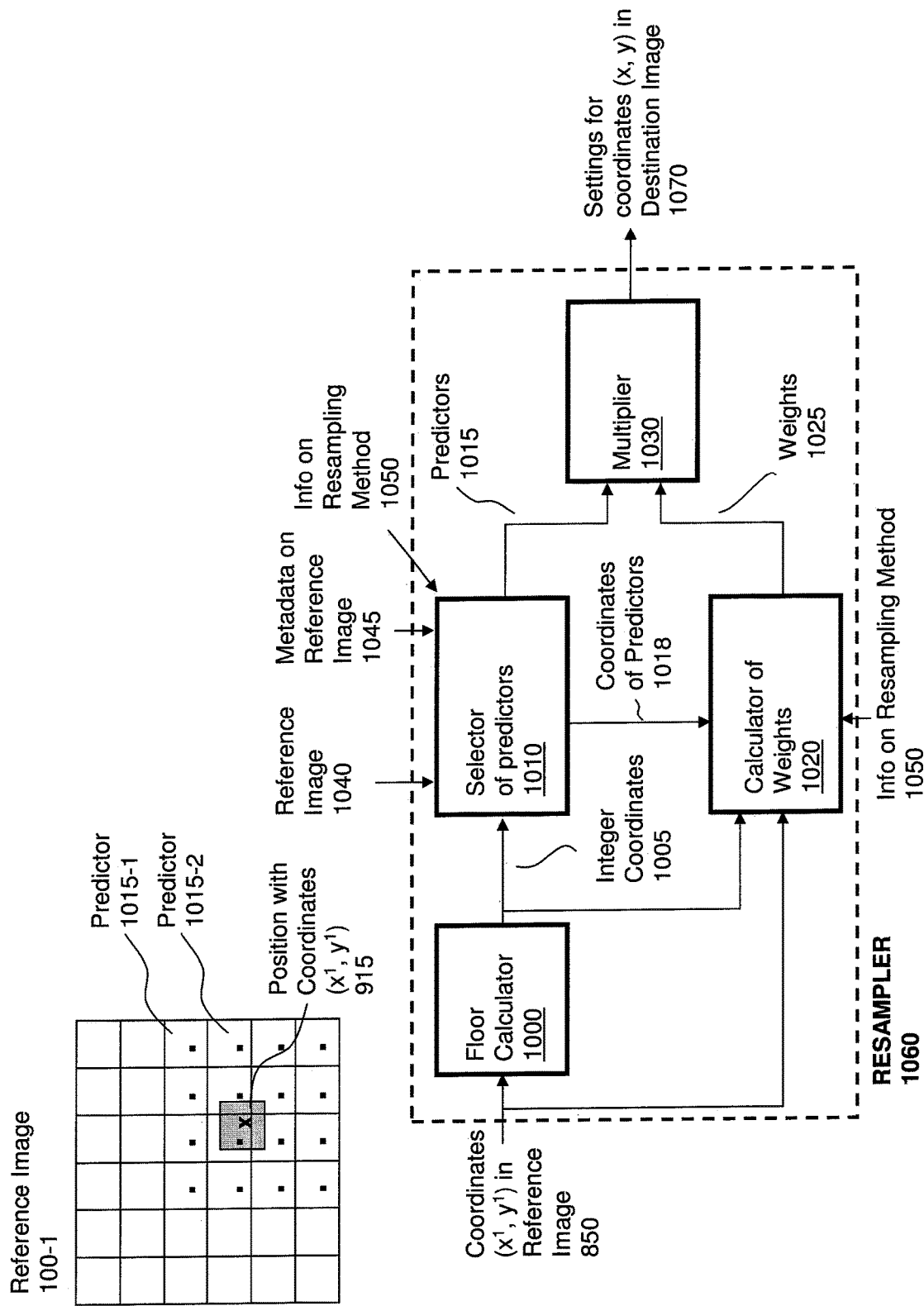
FIG. 10 is an example diagram illustrating generation of settings for multiple elements in a motion compensated image according to embodiments herein.

FIG. 10 is an example diagram describing on-the-fly resampling operations according to a non-limiting embodiment.

Position 915 with coordinates ($x^1$, $y^1$) is not described by any element of the sample grid of Reference Image 100-1. As a consequence, no value is readily available for the corresponding motion-compensated element of Destination Image 930. However, it is possible to calculate such a value on the fly, by selecting a suitable set of elements ("predictors") close to coordinates ($x^1$, $y^1$) and by performing a weighted average of their values according to suitable weights (e.g., a suitable filtering kernel). FIG. 10 illustrates a non-limiting example where a bicubic filter kernel is used, and consequently the value of Reference Image 100-1 in position ($x^1$, $y^1$) is calculated by performing a weighted average of 16 predictor elements.

In order to perform the resampling, Resampler 1060 must identify the 16 predictors to leverage for the weighted average (i.e., where to "position the filter") and must compute the specific weights to be used. The integer component of the ($x^1$, $y^1$) coordinates indicate where to position the filter, and the fractional component of the coordinates indicate what coefficients to use in the filter.

Floor Calculator 1000 receives Coordinates ($x^1$, $y^1$) 850, calculating the integer components 1005 of coordinates ($x^1$, $y^1$). In the non-limiting example of coordinates based on an origin at the top left of the reference image, the Integer Coordinates 1005 identify the closest element of the sample grid at the top left of coordinates ($x^1$, $y^1$). Selector of Predictors 1010, which receives Reference Image 1040, Metadata on Reference Image 1045 (if any) and Info on Resampling Method 1050 (if any), is thus able to select the 16 predictors, by selecting the 4×4 block of elements of the reference image that has the element with coordinates 1005 as the second element in the diagonal from the top left of the block. If some of the 16 predictors are assigned "N/A" (not available value, e.g., because they are outside of the boundaries of the reference image), they are taken out of the set of predictors, and only the predictors with a value are kept.

Calculator of Weights 1020 receives coordinates ($x^1$, $y^1$) and the coordinates of the predictors. Based on the chosen resampling method (e.g., in this non-limiting example, bicubic filtering) and on the fractional component of coordinates ($x^1$, $y^1$)—i.e., on the distance between position ($x^1$, $y^1$) and the element with integer coordinates 1005—Calculator of Weights 1020 calculates the weights to apply to each predictor. If less than 16 predictors have been selected, Calculator of Weights 1020 generates the suitable bicubic weights for the ideal 4×4 kernel, then selects only the coefficients corresponding to the predictors that were selected and normalizes the coefficients so that their sum is equal to 1.

Finally, Multiplier 1030 receives both the predictors and the weight to apply to each predictor, consequently calculating the resampled value of Reference Image in position ($x^1$, $y^1$), i.e., Settings 1070 for coordinates (x, y) in the destination image.

In a non-limiting embodiment, in order to avoid the need to generate in real time the precise coefficients of the filter based on the specific ($x^1$, $y^1$) coordinates, the signal processor implementing Calculator of Weights 1020 is configured so as to access suitable lookup tables with a given number of pre-calculated sets of coefficients (e.g., in a non-limiting example, 128 sets of coefficients), and then to interpolate the coefficients of the two sets of coefficients that are closest to the fractional components of the specific ($x^1$, $y^1$) coordinates.

In a non-limiting embodiment, metadata 1045 on reference image contains information on modifications to apply to Reference Image 100-1 before motion compensation (e.g., without limitation, a scale parameter to apply to values of the image, so as to account for changes in lighting).

Figure 11:
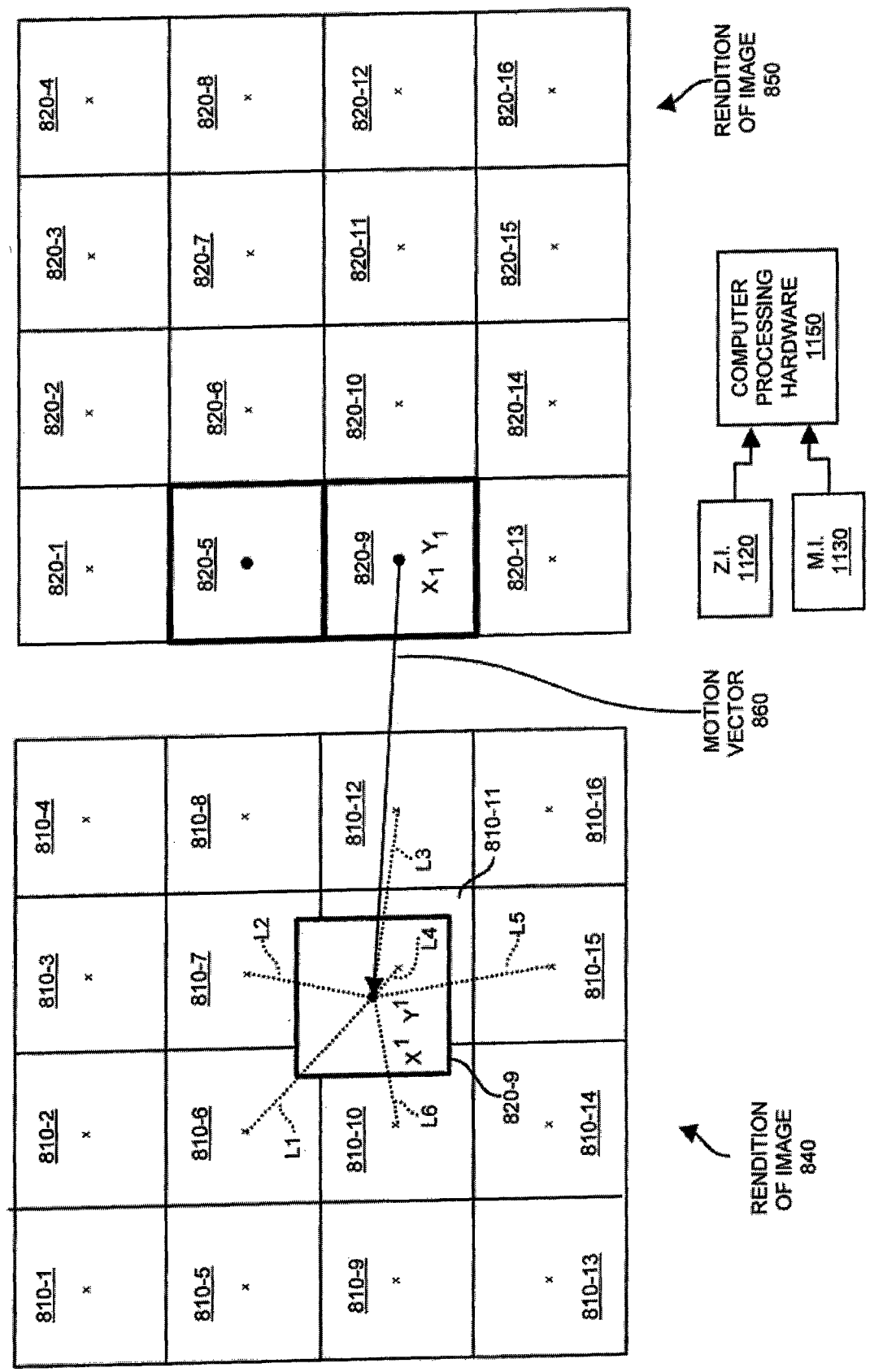
FIG. 11 is an example diagram illustrating motion compensation of a first display element in a zone according to embodiments herein.

FIG. 11 is an example diagram illustrating use of a reference image to derive settings for each of multiple image elements in a compensated image according to embodiments herein.

More specifically, as shown, computer processor hardware such as a decoder receives settings information specifying settings of display elements 810 (e.g., display elements 810-1, 810-2, 810-3, . . . , 810-16) in rendition of image 840 (such as a reference image). Note that the renditions can include any number elements. The settings of the elements can indicate any suitable parameter such as color, chrominance, luminance, etc.

One or more of the display elements in the rendition of image 840 can represent at least a portion of an object captured in the reference image. The rendition of image 850 can represent another image in a sequence that includes a portion of the object captured in the reference image. As discussed herein, the reference image (rendition of image 840) can be used as a basis to reconstruct another image such as rendition of image 850. Using settings of a previous image in a sequence of video frames or planes to produce a rendition of the object in the later video frame reduces an amount of data needed to capture and reconstruct an original signal.

In this non-limiting example embodiment, the rendition of image 850 such as a motion compensated image includes multiple display elements 820 (e.g., display element 820-1, display element 820-2, display element 820-3, . . . , 820-16). As previously discussed, the rendition of image 850 can be generated based at least in part on a rendition of an object captured by settings of display elements in the reference image.

Note that the resolution of the rendition of the signal 850 can be substantially the same as a resolution of the reference signal (rendition of image 840). In accordance with further embodiments, the resolution of the rendition of the signal 850 can be substantially different than a resolution of the rendition of image 840.

In this example embodiment, assume that respective zone information 1120 indicates that display element 820-5 and display element 820-9 represent a motion zone. An image can include multiple zones. Each zone can include any number of display elements.

Any suitable manner can be used to specify which of multiple display elements are to be included in a zone. For example, in one embodiment, the zone information 1120 can individually specify the display elements in the rendition of image 850 that are to be used in the zone. In accordance with another embodiment, the zone information 1120 includes geometric parameters defining a shape of the zone. Based on a defined shaped of the zone in the rendition of image 850, the computer processor hardware is able to identify members of the zone. Use of geometric parameters to define a zone may be useful to reduce an amount of data required to delineate or define a respective zone as the zone information 1120 and the motion information 1130 represent encoded data received by the computer processor hardware to reproduce the rendition of image 850.

In one embodiment, the rendition of image 850 is a motion compensated image. The region represented by the zone of display elements 820 is substantially rectangular. However, as discussed above, a zone can be of any size and shape. In one embodiment, a region of the motion compensated image as represented by the zone of elements in rendition of image 850 is a non-rectangular shape.

In accordance with further embodiments, a zone in the motion compensated image can include multiple contiguous regions or islands of display elements that do not touch. For example, a zone as specified by zone information 1120 can include and specify a first region of display elements in rendition of image 850 and a second region of display elements in rendition of image 850. The first region of display elements can be non-contiguous (non-touching) with respect to the second region of display elements even though the multiple regions of display elements represent a same zone.

As mentioned, the rendition of signal being reconstructed can include multiple zones. In one embodiment, first zone information defines display elements in the rendition of signal 850 that are members of a first zone. The first zone information can indicate that a given element such as display element 820-9 resides in the first zone. The computer processor hardware can be configured to receive second zone information associated with the rendition of image 850. The second zone information can information indicates that the given display element 820-9 resides in a second zone. Accordingly, a single display element can be members o none, one, or more motion zones.

Assume in this example that the motion zone (i.e., display elements 820-5 and 820-9) as specified by zone information 1120 has been assigned motion information 1130. Motion information 1130 includes information indicating how to derive location information for each element in the zone. For example, in one embodiment, to reproduce a rendition of a respective signal such as rendition of image 850, computer processor hardware, receives zone information 1120. The zone information 1120 in this example specifies multiple display elements of the rendition of the signal 850 that belong to a zone. As mentioned, in this example, the zone includes 820-5 and display element 820-9.

The computer processor hardware also receives motion information 1130 associated with the zone. By way of a non-limiting example, the motion information is encoded to indicate to which corresponding location and/or elements in reference signal (such as rendition of image 840) each of the multiple elements in the zone pertains.

For each respective display element in the zone, the computer processor hardware utilizes the motion information 1130 as a basis to derive a corresponding location value in the rendition of image 840 (e.g., reference signal). The corresponding location value indicates a location in the reference signal to which the respective element pertains. Accordingly, the motion information 1130 enables the computer processor hardware to map each display element in the zone to a corresponding location in the reference image.

In this example, motion information 1130 includes a set of coefficients for the zone. The computer processor hardware utilizes the motion information 1130 to generate coefficients a, b, c, d, e, and f for matrix M (803) in FIG. 9. The values $X_1$ and $Y_1$ (values 430 in FIG. 8) represent the coordinates of the display element 820-9 in rendition of image 850. To produce a precise location (in rendition of image 840) to which the display element 820-9 pertains, the computer processor hardware multiplies the coordinate [$X_1$ $Y_1$ 1] by matrix M to produce $x^1$ and $y^1$. [$X_1$ $Y_1$ 1] represents the coordinate location of display element 820-9 in rendition of image 850. The location in rendition of image 840 (or reference image 110-1) associated with the display element 820-9 is represented by values $x^1$, $y^1$. As shown in FIG. 11, the display element 820-9 falls at an off-grid location with respect to the grid of elements in the reference image.

Figure 12:
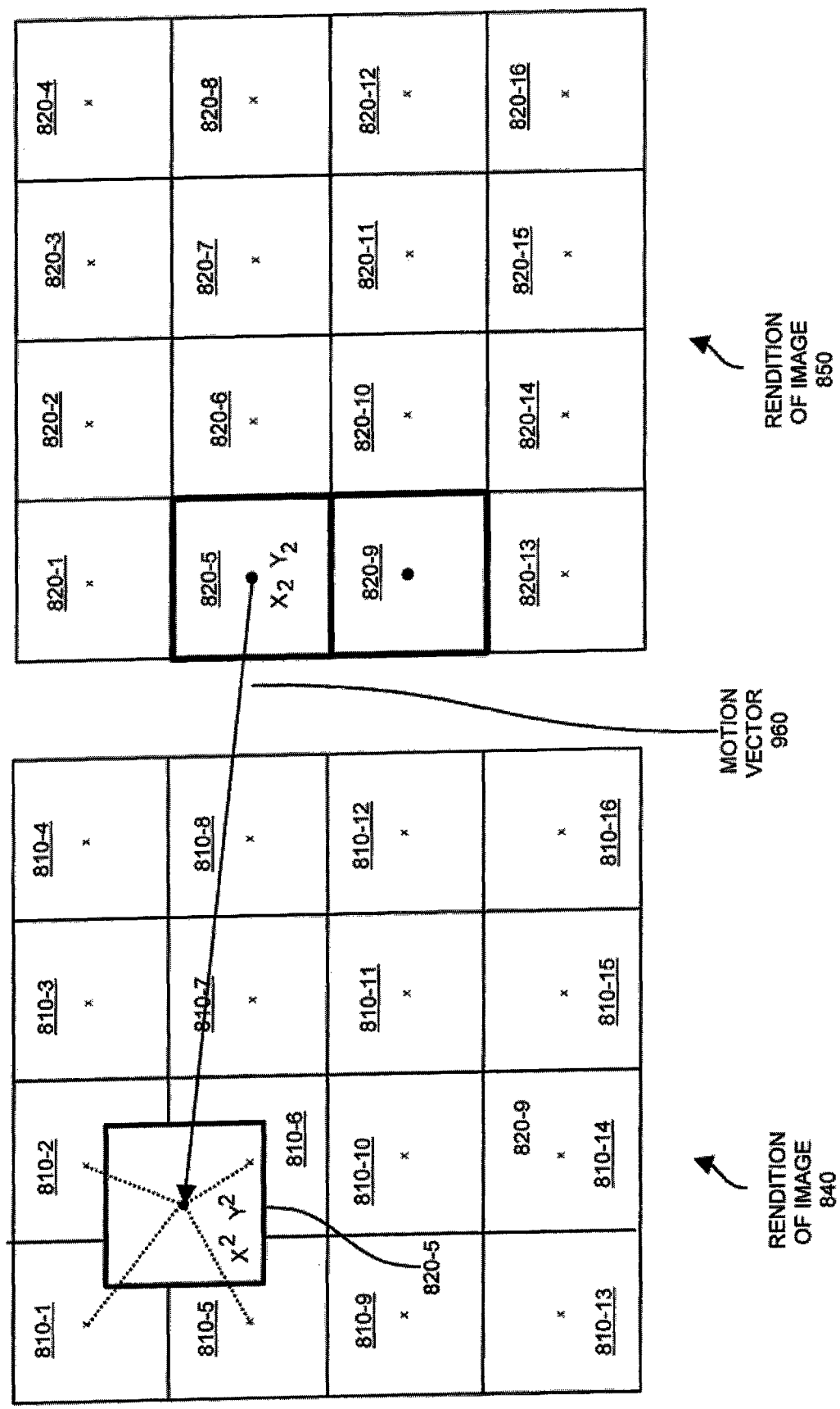
FIG. 12 is an example diagram illustrating motion compensation of a second display element in a zone according to embodiments herein.

FIG. 12 is an example diagram illustrating mapping of display element 820-5 in a zone to a corresponding location in a reference image (rendition of image 840). In this example, as mentioned above, the computer processor hardware already generated coefficients a, b, c, d, e, and f for matrix M (803). The values $X_2$ and $Y_2$ (430) represent the coordinates of the display element 820-5 in rendition of image 850. To produce a precise location (in rendition of image 840) to which the display element 820-5 pertains, the computer processor hardware multiplies the coordinate [$X_2 Y_2$ 1] by matrix M to produce $x^2$ and $y^2$. [$X_2$ $Y_2$ 1] represents the coordinate location of display element 820-5 in rendition of image 850. The location in rendition of image 840 (or reference image 110-1) associated with the display element 820-9 is represented by values $x^2$, $y^2$. As shown in FIG. 12, the display element 820-5 falls at an off-grid location with respect to the grid of elements in the reference image.

Accordingly, utilizing the motion information 1120 to derive a corresponding location value for a respective display element includes: obtaining coordinates (x and y) for the respective element in rendition of image 850, the coordinates specifying a location of the respective element in the rendition of image 850 (signal); and via the motion information 1130, performing one or more linear combinations of the coordinates of the respective element with the coefficient values to produce the corresponding location information in rendition of image 840. As mentioned, the corresponding location information such as [$x^1$, $y^1$], [$x^2$, $y^2$], etc., specifies coordinates in the reference signal to which the respective element (in rendition of image 850) pertains.

In one embodiment, the computer processor hardware generates the location values to have sufficiently high resolution in order to be able to specify sub-element accuracy in the reference signal. In this examples shown FIG. 11 and FIG. 12, the location information [$x^1$, $y^1$], [$x^2$, $y^2$] illustrates subscriber-pixel resolution. In other words, the display elements 820-9 and 820-5 do not fall directly over a respective display element in the rendition of image 840 but are instead offset by a fractional amount.

In accordance with further embodiments, for each respective element in the zone, the computer processor hardware utilizes the location value such as [$x^1$, $y^1$], [$x^2$, $y^2$] for the respective element 820-9, 820-5 to select a corresponding group of elements in the rendition of image 840 (i.e., reference signal). As shown in FIG. 11, the computer processor hardware selects display elements 810-6, 810-7, 810-10, 810-11, 810-12, and 810-15 as a grouping associated with display element 820-9. As shown in FIG. 12, the computer processor hardware selects display elements 810-1, 810-2, 810-5, and 810-611 as a grouping associated with display element 820-5.

The computer processor hardware can select a respective grouping based on any suitable criteria. For example, in one embodiment, the computer processor hardware selects the grouping of display elements in rendition of image 840 associated with display element 820-9 based on a closeness of the corresponding display elements in the rendition of image 840 to the location [$x^1$, $y^1$]. The computer processor hardware selects the grouping of display elements in rendition of image 840 associated with display element 820-5 based on a closeness of the corresponding display elements in the rendition of image 840 to the location [$x^2$, $y^2$].

The motion information 1130 can include further information indicating criteria or rules to be used to identify which display elements in the rendition of image are to be used to generate a setting for a display element in the zone. Thus, by way of a non-limiting example, the motion information 1130 can effectively specify, for each display element in the zone, a group of display elements in the reference image to be used to reproduce settings for display elements in the zone.

In one embodiment, the computer processor hardware calculates a setting for each respective display element 820 in the zone based on settings of elements in the corresponding group. For example, in furtherance of generating a setting for display element 820-9, the computer processor hardware obtains settings of display elements 810-6, 810-7, 810-10, 810-11, 810-12, and 810-15. The computer processor hardware then calculates a setting for the display element 820-9 in the zone based on the settings of these display elements.

In furtherance of generating a setting for display element 820-5, the computer processor hardware obtains settings of display elements 810-1, 810-2, 810-5, and 810-6. The computer processor hardware then calculates a setting for the display element 820-5 in the zone based on the settings of these display elements.

In one embodiment, the display elements in the zone of the rendition of image 850 (e.g., a secondary image with respect to the reference image) represents a rendition of an object. The group of display elements in the reference image represents a rendition of the object. The motion information 1130 captures motion of the object from a location in the reference image to a location in the secondary image (e.g., image being reproduced based at least in part on the reference image).

Note that the motion information 1130 or set of coefficients as discussed herein corresponds to motion parameters associated with movement of the object. For example, the motion information 1130 can include a translation parameter capturing translation of the rendition of the object in the secondary image (rendition of image 850) with respect to the rendition of the object in the reference image (rendition of image 840); the motion information 1130 can include a rotation parameter capturing rotation of the rendition of the object in the secondary image with respect to the rendition of the object in the reference image; the motion information 1130 can include one or more scaling parameters (for zooming in and out) capturing scaling of the rendition of the object in the secondary image with respect to the rendition of the object in the reference image; the motion information 1130 can include a shearing parameter capturing shearing of the rendition of the object in the secondary image with respect to the rendition of the object in the reference image; the motion information 1130 can include a perspective parameter capturing a perspective transform of the rendition of the object in the secondary image with respect to the rendition of the object in the reference image; and so on. Any of one or more of these parameters can be used to describe motion associated with object from one plane to another.

In one embodiment, the motion information 1130 includes offset adjustment information representing a translation of an object from one location in one plane of elements to another location in a subsequent plane in which the object appear to move laterally across a display screen. As mentioned, the computer processor hardware utilizes the motion information 1130 to derive a corresponding location value for the respective elements in a zone. Generating the location information for the display elements can include first obtaining coordinates for a respective element. As mentioned, the coordinates of the display element in the zone can specify a location of the respective element in rendition of the signal 850. The computer processor hardware applies the offset adjustment information (as encoded by coefficient a and coefficient d in the set of coefficients of matrix 803) to the display element coordinates to produce the corresponding location information for the respective element in rendition of image 840. In one embodiment, the corresponding location information (or generated coordinates) indicate a location that is offset with respect to the coordinates by an amount as specified by the offset adjustment information. Thus, the zone information 1120 can capture movement of an object from one location in a first plane to a second location in a second plane as displayed on a display screen.

The motion information 1130 can include rotation adjustment information. For example the motion information 1130 includes image rotation information representing a rotation of an object from one location in a first plane to another location in a second plane. In one embodiment, the computer processor hardware utilizes the motion information to derive a corresponding location value for each respective element in a zone. Generating the rotation information for the display elements can include first obtaining coordinates for the respective element; the coordinates specify a location of the respective element in rendition of the signal. The computer processor hardware applies the rotation adjustment information (as encoded by the set of coefficients in matrix 803) to the coordinates to produce the corresponding location information for the respective elements. The corresponding location information captures a rotation of the coordinates by an amount as specified by the rotation adjustment information.

In accordance with further embodiments, the motion information 1130 indicates how the multiple elements in the zone of the rendition of the signal can be scaled (to support zooming such that the object appears larger or smaller from one image to the next) from a corresponding grouping of display elements in the reference signal.

In certain instances, display elements in the rendition of image 850 may not fall within a motion zone representing a moving object. The location value for such display elements can be assigned a default value when motion information indicates a corresponding element located outside of the reference signal or when motion information is assigned a default value.

In this example, the motion vector 860 specifies a precise location in the rendition of image 840 to which the display element 820-9 pertains. According to embodiments herein, as an alternative to upsampling the rendition of image 840 into a super high resolution image (as in conventional methods) to accommodate sub-element or fractional element motion compensation for a block of elements, embodiments herein include deriving a setting for display element 820-9 based on a relatively low level of quality or low resolution rendition of image 840.

As a specific example, the computer processor hardware receives motion compensation information and/or other metadata or reconstruction data for display element 820-9 in rendition of image 850. Rendition of image 850 represents an image being created based at least in part on settings of display elements in rendition of image 840 (reference image). Received motion compensation information indicates a coordinate location within a display element 810-11 in the rendition of image 840 to which the display element 820-9 pertains. The received reconstruction data to reconstruct the settings for display element 820-9 can specify which of one or more reference images as well as one or more locations within each reference image are to be used as a basis to reconstruct a respective setting for the display element. In a simple example embodiment, motion compensation information indicates a location within a single reference image to use as a basis to determine settings for the display element 820-9.

In one embodiment, computer processor hardware converts the received compensation information into motion vector 860 (assigned to display element 820-9) specifying an off-grid location in rendition of image 840 (grid) to which the element 820-9 pertains. The location of display element 820-9 is off-grid in rendition of image 840 because it does not fall directly over only a single display element in rendition of image 840. In this example embodiment, the location of image element 820-9 as specified by the motion vector 860 at least partially overlaps multiple display elements 810-6, 810-7, 810-10, and 810-11 in rendition of image 840.

The computer processor hardware utilizes the coordinate location as specified by the motion vector 860 as a basis from which to select a grouping of multiple display elements in the rendition of image 840. For example, in this example embodiment, due to proximity or other suitable parameter, assume that the computer processor hardware selects display elements 810-6, 810-7, 810-10, 810-11, 810-12, and 810-15 as suitable nearby elements from which to generate one or more settings for display element 820-9. Based on such settings of selected display elements 810-6, 810-7, 810-10, 810-11, 810-12, and 810-15, the computer processor hardware generates settings for display element 820-9.

In one embodiment, the computer processor hardware calculates setting information for display element 820-9 based on rendition of image 840 as if display element 820-9 were located in the fractionally offset location as specified by the motion vector 860. For example, the centroid of display element 820-9 as specified by the motion vector 860 does not align exactly over the centroid of display element 810-11. Embodiments herein include generating a setting for the display element 820-9 in the second image based on settings of the multiple display elements 810-6, 810-7, 810-10, 810-11, 810-12, and 810-15 in the selected grouping.

Note that any suitable algorithm amongst multiple algorithms can be used to derive the setting for the display element 820-9 based on the selected grouping of display elements. For example, assume in this example that received reconstruction information associated with display element 820-9 indicates to the computer processor hardware to use a particular algorithm to generate the grouping to include display elements 810-6, 810-7, 810-10, 810-11, 810-12, and 810-15 as mentioned above.

In accordance with a specified algorithm, the computer processor hardware calculates the setting for the display element 820-9 based at least in part on distances of the multiple display elements in the grouping with respect to the coordinate location (of the centroid of display element 820-9 as specified by the motion vector 860) in the particular display element 810-11.

For example, the length of line L1 represents a distance between centroid (i.e., center) of display element 810-6 (as depicted by respective symbol x in center of display element 810-6) and a centroid of display element 820-9 (as specified by the motion vector 860 and as depicted by a dot in display element 820-9); the length of line L2 represents a distance between centroid of display element 810-7 (as depicted by respective symbol x in center of display element 810-7) and a centroid of display element 820-9 (as specified by the motion vector 860 and as depicted by a dot in display element 820-9); the length of line L3 represents a distance between centroid of display element 810-12 (as depicted by respective symbol x in center of display element 810-12) and a centroid of display element 820-9; the length of line L4 represents a distance between centroid of display element 810-11 (as depicted by respective symbol x in center of display element 810-11) and a centroid of display element 820-9; the length of line L5 represents a distance between centroid of display element 810-15 (as depicted by respective symbol x in center of display element 810-15) and a centroid of display element 820-9; the length of line L6 represents a distance between centroid of display element 810-10 (as depicted by respective symbol x in center of display element 810-10) and a centroid of display element 820-9.

As mentioned, computer processor hardware can be configured to generate a value such as a display setting in any suitable manner. For example, the algorithm can be configured to generate the setting for display element 820-9 based on calculating an average of settings associated with nearby display elements 810-6, 810-7, 810-10, 810-11, 810-12, and 810-15. For example, assume that display element 810-6 is set to a value of 24; display element 810-7 is set to a value of 60; display element 810-10 is set to a value of 228;

display element 810-11 is set to a value of −123; display element 810-12 is set to a value of −41; and display element 810-15 is set to a value of 2. The average of these values is 25. Accordingly, in this instance, the algorithm assigns the display element 820-9 a value of 25.

In accordance with further embodiments, the algorithm can be configured to generate weights for each of the display elements in the selected grouping. For example, the selected algorithm to generate settings for display element 820-9 can be configured to calculate a length of each of the lines L1, L2, L3, L4, L5, and L6 and generate a corresponding weight for a respective display element depending on a length of a line. The shorter the line, the higher the magnitude of the respective weight such that the setting calculated for the display element 820-9 is more heavily weighted based on the setting of nearer elements than farther elements. As a specific example, the length of line L1 can be 7 units; the length of line L2 can be 5 units; the length of line L3 can be 6 units; the length of line L4 can be 1 unit; the length of line L5 can be 6 units; the length of line L7 can be 4 units. Based on lengths, the algorithm sets W1 for line L1 to be 0.053; the algorithm sets W2 for line L2 to be 0.157; the algorithm sets W3 for line L3 to be 0.105; the algorithm sets W4 for line L4 to be 0.368; the algorithm sets W5 for line L5 to be 0.105; the algorithm sets W6 for line L6 to be 0.21. The sum of weights can equal one. To calculate the setting for display element 820-9 based on weights, the algorithm generates the value of display element 820-9 as follows:

Value=(W1×S1)+(W2×S2)+(W3×S3)+(W4×S4)+(W5×S5)+(W6×S6);

where S1=the setting of display element 810-6=24;
S2=the setting of display element 810-7=60;
S3=the setting of display element 810-10=228;
S4=the setting of display element 810-11=−123;
S5=the setting of display element 810-12=−41;
S6=the setting of display element 810-15=2.

Value=(0.053×24)+(0.157×60)+(0.105×228)+(0.368×(−123))+(0.105×(−41))+(0.21×2)=−14.2;

In this example instance, the algorithm assigns the setting of display element 820-9 to a value of −14.2.

In other non-limiting embodiments, weight values are selected based on suitable resampling kernels (e.g., without limitation, bilinear kernel, bicubic kernel, Lanczos kernel, etc.), based on the distance of the location from the weighed elements of the grouping.

Accordingly, embodiments herein can include selecting a first element such as display element 820-9 in the zone; utilizing the motion information 1130 to calculate a location in the reference signal (rendition of signal 850) for the first display element 820-9; utilizing the location $x^1$, $y^1$ as a basis to identify a first set of elements (e.g., display elements 810-6, 810-7, 810-10, 810-11, 810-12, and 810-15) in the reference signal; processing the reference signal to obtain settings (e.g., corresponding values S1, S2, S3, S4, S5, and S6) of the elements in the first set; generating weighted values (e.g., corresponding values W1, W2, W3, W4, W5, and W6); applying the weighted values to the settings of elements in the first set, magnitudes of the weighted values depending on a proximity of the elements in the first set to the location in the reference signal for the first element; and calculating a setting for the display element 820-9 in the zone based on summing the weighted settings (e.g., W1×S1, W2×S2, W3×S3, W4×S4, W5×S5, and W6×S6) of the display elements 810-6, 810-7, 810-10, 810-11, 810-12, and 810-15.

In a similar manner, the computer processor hardware generates a value for each member in the zone.

Subsequent to producing rendition of image 850, the computer processor hardware can apply residual data to refine the rendition of image 850 into a more accurate representation of the original signal. For example, in one embodiment, the computer processor hardware reproduces the rendition of the signal 850 based at least in part on the reference signal (e.g., rendition of image 840) in a manner as specified by the zone information 1120 and the motion information 1130. The computer processor hardware receives reconstruction data (such as residual data) specifying adjustments to be applied to the display elements in the reproduced rendition of the original signal. The computer processor hardware applies the adjustments (as specified by the residual data) to the one or more of the display elements in the reproduced rendition of the signal as specified by the reconstruction data to refine the reproduced rendition of the signal. As an example, the computer processor hardware can receive reconstruction data indicating to modify the setting derived for display element 820-9 by +5 units. As discussed above, the computer processor hardware may generate an initial value for display element 820-9 such as −14.2. In this example, the computer processor hardware adds +5 units of to the −14.2 to produce a value of −9.2 for the display element 820-9. In this manner, the computer processor hardware can make refinements to any of the display elements in rendition of image 850.

Accordingly, embodiments herein can include producing weighted values that vary depending on a respective distance between the centroid of the given display element as specified by the motion vector 860 and a respective centroid of an element in the grouping in the reference image; and applying the weighted values to settings of the display elements in the grouping to produce the setting for the display element 820-9. Thus, assuming an unlimited or substantially high precision of the motion vector, embodiments herein are able to reconstruct images based on fractional movements of objects from one image plane to the next. In other words, a reference image in a sequence of multiple video frames may include a representation of an object. The reference image (at lower or modest resolution) can be used as a basis to produce a fractionally displaced representation of the moving object in a next frame. In other words, a subsequent frame can include a rendition of the moving object in the reference frame as being moved from one frame to the next by less than a full pixel or at a sub-pixel level.

As discussed above, the motion vector 860 can specify a coordinate location other than a center of the display element 810-11 in the rendition of image 840. The motion vector 860 can be of any suitable resolution enabling the corresponding display element 820-9 to refer to any location within the rendition of image 840. Thus, the motion vector 860 can be an offset value or vector pointing to any location within a respective element or cell in the rendition of image 840 such as a reference image.

In one embodiment, the specific coordinate location (such as a location of centroid of display element 820-9) in rendition of image 840 as specified by the motion vector 860 can be offset with respect to a centroid of the display element 810-11 by a fractional value of a display element or pixel, such as a fractional value greater than zero but less than 1. As mentioned, the rendition of image 850 can include a representation of the object in reference image, but displaced by less than a full pixel with respect to the reference image.

As shown, the resolution of the rendition of image 840 such as a reference image can be substantially equal to a resolution of the rendition of image 850 (e.g., image being rendered based at least in part on the reference image).

Note that, in accordance with further embodiments, the resolution of the rendition of image 840 can be different than the resolution of the rendition of image 850. For example, in one embodiment, the resolution of the rendition of the first image 840 can be substantially different than a resolution of the rendition of second image 850.

Accordingly, the coordinate location as specified by the motion vector 860 can be used as a basis from which to select a grouping of multiple display elements in a first image such as rendition of image 840. As mentioned, the computer processor hardware can be configured to create a grouping of multiple display elements to include display element 810-11 and one or more other display elements in the rendition of image 840, the one or more other display elements located in a vicinity of the particular display element 810-11.

In one non-limiting example embodiment, the computer processor hardware interpolates the setting of the display element 820-9 based at least in part on: i) a proximity of the coordinate location (as specified by motion vector 860) with respect to a centroid of the particular display element 810-11 and a centroid of at least one other display element such as the display element 810-7 in the vicinity of the particular display element 810-11, ii) a setting of the particular display element 810-11, and iii) a setting of the display element 810-7 located in the vicinity of the particular display element 810-11.

Note that the process of motion compensation can be applied to each of multiple elements in a compensated image to derive a rendition of image 850 based on rendition of image 850. For example, embodiments herein include generating a respective motion vector for each of multiple display elements in the rendition of image 850. In a manner as previously discussed, the computer processor hardware reproducing the rendition of image 850 utilizes the respective motion vector associated with a corresponding display element in the rendition of image 850 to identify a specific location in the rendition of image 840 to which the corresponding display element pertains. The computer processor hardware then uses the specific location as specified by the motion vector 860 as a basis in which to identify neighboring display elements in the reference image and generate a setting for the corresponding display element.

In accordance with further embodiments, the rendition of the signal 840 can be an image from which the rendition of image 850 is at least partially derived. The zone information 1120 can be first zone information. The motion information 1130 can be first motion information. The computer processor hardware can be configured to receive second zone information and second motion information specifying how to reproduce a second image based on a second reference image. In accordance with the second zone information and second motion information, the computer processor hardware reproduces a rendition of the second image based at least in part on the second reference image. The computer processor hardware then generates a rendition of a third image using the first image and the second image as reference images. Accordingly, a set of any number of images can be derived from one or more reference images; additional one or more images can be derived from one or more images in the set.

In certain instances, a given display element can be included in multiple zones. For example, zone information can indicate that a given element resides in both a first zone and a second zone. The first zone can represent an object such as a window moving in one direction from one image to the next while a reflection in the window can represent an object moving in a different direction from one image to the next. Accordingly, embodiments herein can include receiving first zone information indicating that one or more elements resides in a first zone; and receiving second zone information indicating that the one or more elements resides in a second zone.

Functionality supported by the different resources will now be discussed via flowcharts in FIGS. 13-14. Note that the steps in the flowcharts below can be executed in any suitable order.

FIG. 13 is a flowchart 1300 illustrating an example method according to embodiments. Note that there will be some overlap with respect to concepts as discussed above.

In processing block 1310, computer processor hardware (such as decoder processing hardware or any other suitable resource) receives at least one auxiliary zone, said auxiliary zone indicating a subset of elements of said set of elements, said subset of elements belonging to said auxiliary zone, and at least one set of descriptive auxiliary information, each of said set(s) of descriptive auxiliary information corresponding to an auxiliary zone.

Figure 14:
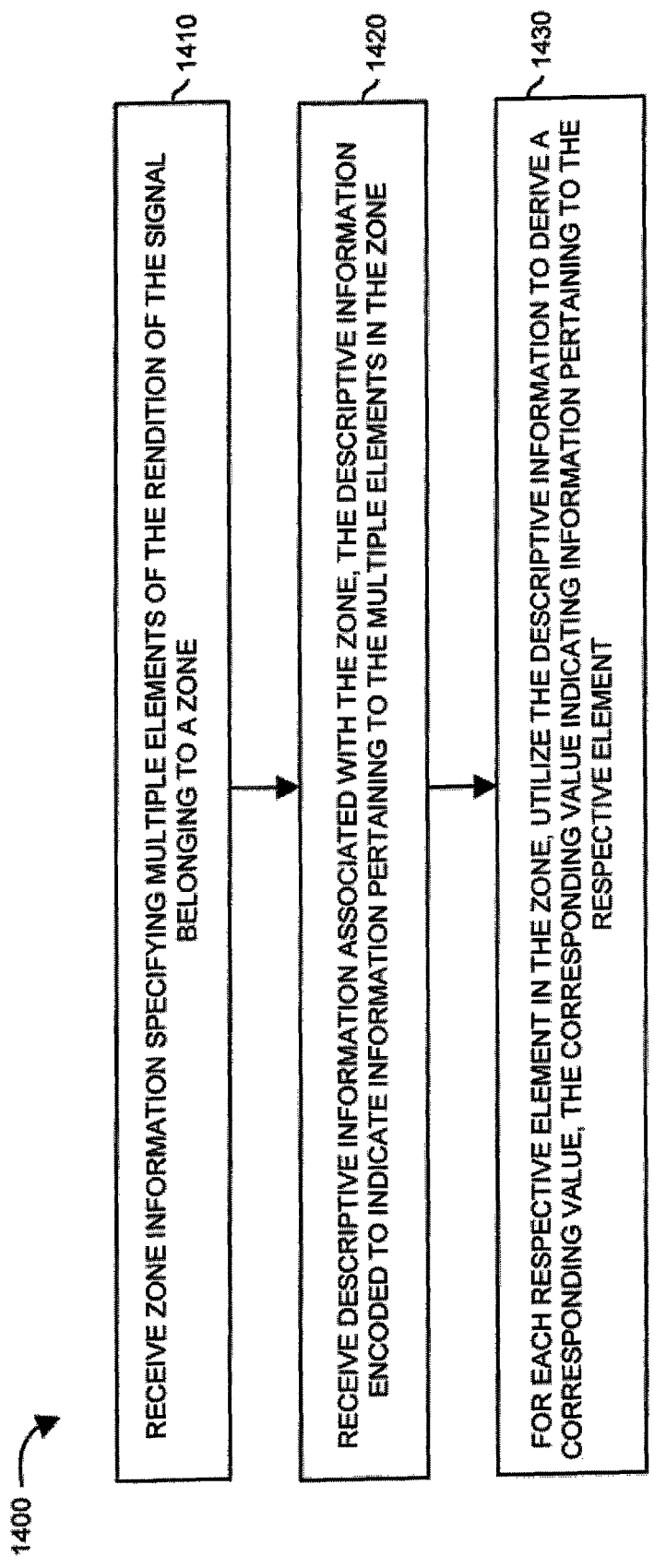
FIG. 14 is an example diagram illustrating a method according to embodiments herein.

In processing block 1310, based at least in part on auxiliary zone information and on the descriptive auxiliary information corresponding to auxiliary zones, computer processor hardware computes auxiliary information for each element of the given sample FIG. 14 is a flowchart 1400 illustrating an example method according to embodiments. Note that there will be some overlap with respect to concepts as discussed above.

In processing block 1410, computer processor hardware (or any other suitable resource) receives zone information specifying multiple elements of the rendition of the signal belonging to a zone.

In processing block 1420, computer processor hardware receives descriptive information associated with the zone, the descriptive information encoded to indicate information pertaining to the multiple elements in the zone.

In processing block 1430, for each respective element in the zone, the computer processor hardware utilizes the descriptive information to derive a corresponding value, the corresponding value indicating information pertaining to the respective element.

Figure 15:
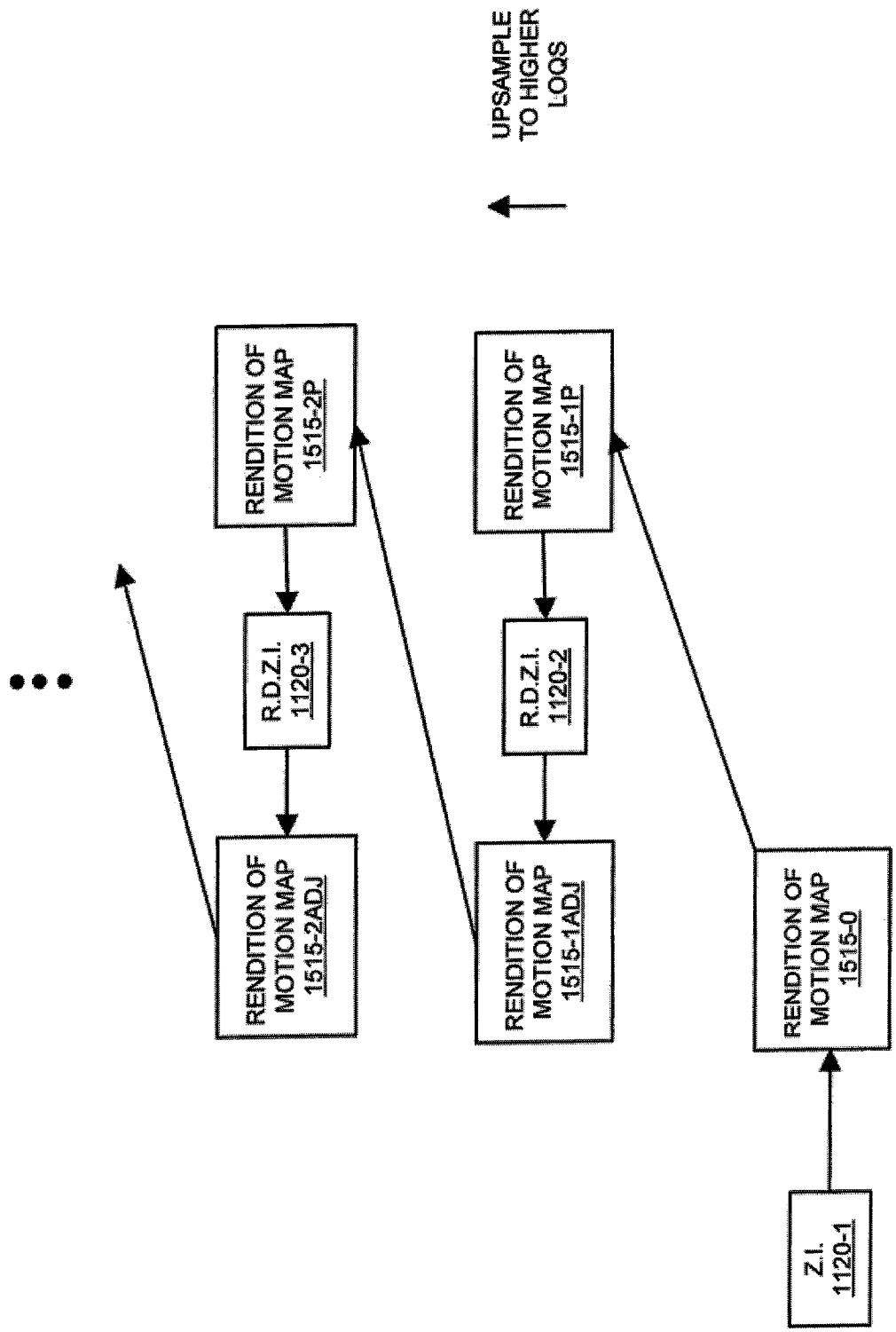
FIG. 15 is an example diagram illustrating generation of motion mesh access points according to embodiments herein.

FIG. 15 is an example diagram illustrating generation of motion maps according to embodiments herein.

In one embodiment, the computer processor hardware initially receives zone information 1120-1. The computer processor hardware uses the zone information 1120-1 to produce a rendition of motion map 1515 at a first level of quality (such as at a first resolution). As mentioned, the rendition of motion map 1515-0 can specify which corresponding elements in an image to be reproduced belong to a respective motion zone.

In this example embodiment, the computer processor hardware upsamples the rendition of motion map 1515-0 into a preliminary rendition of motion map 1515-1P at a next higher level of quality (such as a higher resolution). Computer processor hardware applies residual data zone information 1120-2 (e.g., adjustment data) to rendition of motion map 1515-1P to produce adjusted rendition of motion map 1515-1ADJ. The rendition of motion map 1515-1ADJ specifies which elements in the rendition of signal belong to which respective zone for that level of quality.

The computer processor hardware upsamples the rendition of motion map 1515-1ADJ into preliminary rendition of motion map 1515-2P at a next higher level of quality (such as a higher resolution). Computer processor hardware applies residual data zone information 1120-3 (e.g., adjustment data) to rendition of motion map 1515-2P to produce adjusted rendition of motion map 1515-2ADJ. The rendition of motion map 1515-2ADJ specifies which elements in the rendition of signal belong to which respective zone.

The computer processor hardware can be configured to repeat this process to create motion maps at multiple levels of quality.

Figure 16:
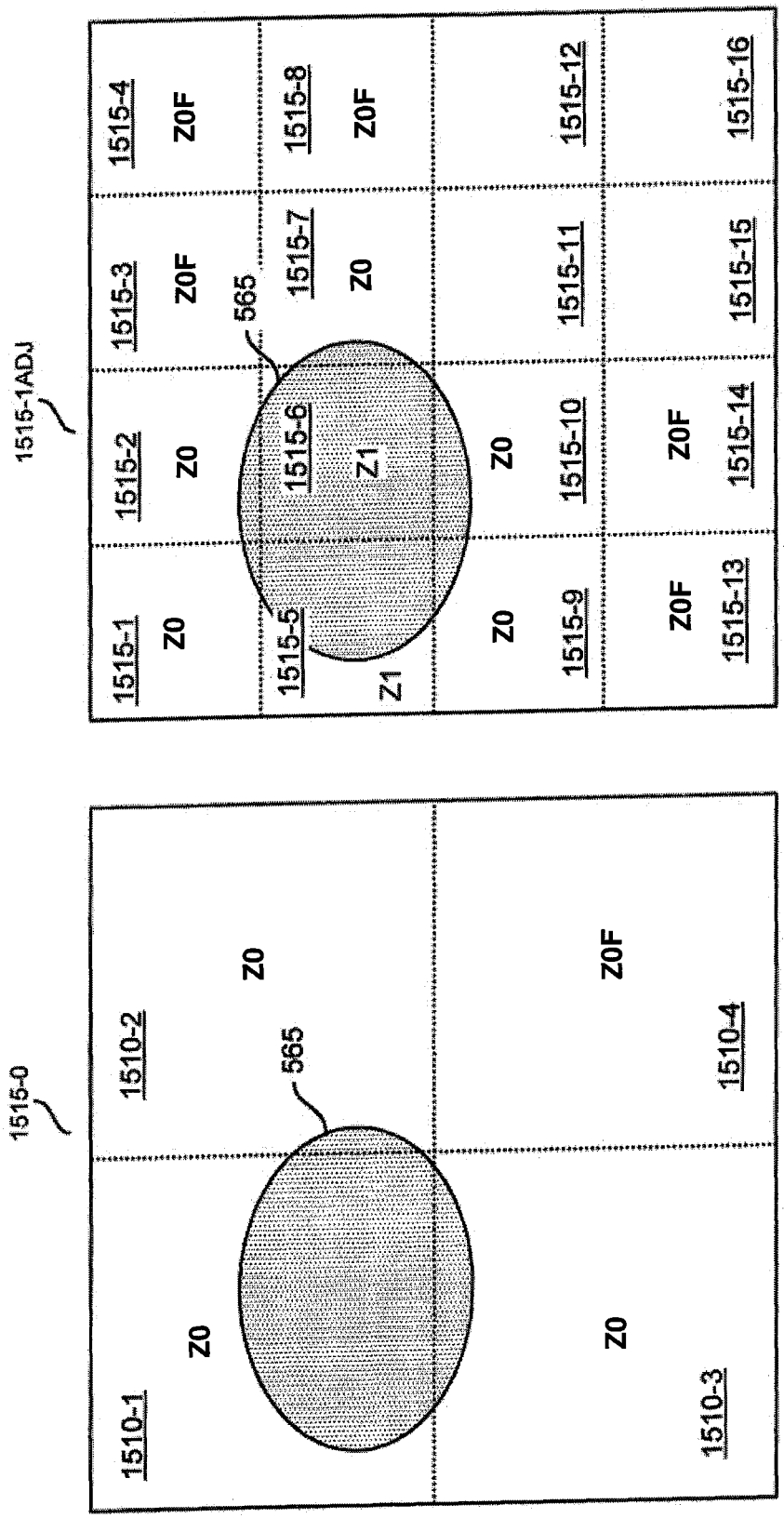
FIG. 16 is an example diagram illustrating upsampling of a motion map from a lower level of quality to a higher level of quality according to embodiments herein.

FIG. 16 is an example diagram illustrating upsampling of a motion map from a lower level of quality to a higher level of quality according to embodiments herein.

As shown, motion map 1515 includes setting indicating that the elements 1510-1, 1510-2, and 1510-3 all belong to zone Z0 because—despite the display elements capture settings associated with a portion of the object 565 (such as a moving object)—the majority of the display elements is associated with Zone 0 (such as a still white background). Element 1510-4 belongs to zone Z0 and is assigned a final symbol (such as "Z0F") in order to indicate that all sub-elements ("child elements") of element 1510-4 at any level of quality will automatically be assigned to zone Z0. In certain instances as shown, a respective display element may be assigned a final symbol value (such as Z0F) if it is known that every child element (at a corresponding higher resolution) derived from a parent element is also assigned to the same zone as its parent element. In such an instance, the final symbol zone Z0F indicates to the decoder reproducing a respective image that that every corresponding element and sub-element in the signal is assigned to the zone Z0. Use of final symbols along with non-final symbols reduces the amount of data needed to reproduce zone information at higher levels of quality because when a final symbol is received, it is known that all child elements, sub-child elements, etc., belong to the given zone, without any need for additional residual data pertaining to that portion of the motion zone map when reconstructing the motion zone map at subsequently higher level of quality. A non-final symbol (such as Z0) indicates that not every child elements, sub-child elements, etc., of a respective parent element will be included in the zone.

When upsampling to the next higher level of quality, the computer processor hardware initially assigns each child element the same value as the parent element. For example, the computer processor hardware produces the preliminary rendition of motion map 1515-1P to indicate that child display elements 1515-1, 1515-2, 1515-5, and 1515-6 derived from parent display element 1510-1 are all assigned an appropriate symbol to indicate that they reside in zone Z0. The computer processor hardware produces the preliminary rendition of motion map 1515-1P to indicate that child display elements 1515-3, 1515-4, 1515-7, and 1515-8 derived from display element 1510-2 are all assigned an appropriate symbol to indicate that they reside in zone Z0. The computer processor hardware produces the preliminary rendition of motion map 1515-1P to indicate that child display elements 1515-9, 1515-10, 1515-13, and 1515-14 derived from display element 1510-3 are all assigned an appropriate symbol to indicate that they reside in zone Z0. The computer processor hardware produces the preliminary rendition of motion map 1515-1P to indicate that child display elements 1515-11, 1515-12, 1515-15, and 1515-16 derived from display element 1510-4 are all assigned an appropriate symbol ("final symbol") to indicate that they reside in zone Z0 and that all of their child display elements will reside in zone Z0.

In a manner as previously discussed, the computer processor hardware applies residual data zone information 1120-2 to the rendition of motion map 1515-1P to produce rendition of motion map 1515-1ADJ as shown in FIG. 16. In this example embodiment, the residual data zone information 1120-2 adjusts the zone information in motion map 1515-1ADJ such that display elements 1515-5 and 1515-6 do not belong to the zone Z0, but do instead belong to the zone Z1, since the majority of display elements 1515-5 and 1515-6 is co-located with the moving object 565. The residual data zone information 1120-2 also adjusts the zone information in motion 1515-1ADJ so that display elements 1515-3, 1515-4, 1515-8, 1515-13 and 1515-14 are assigned a final symbol ("Z0F"), in order to indicate that not only themselves, but also all of their child elements belong to zone Z0.

Figure 17:
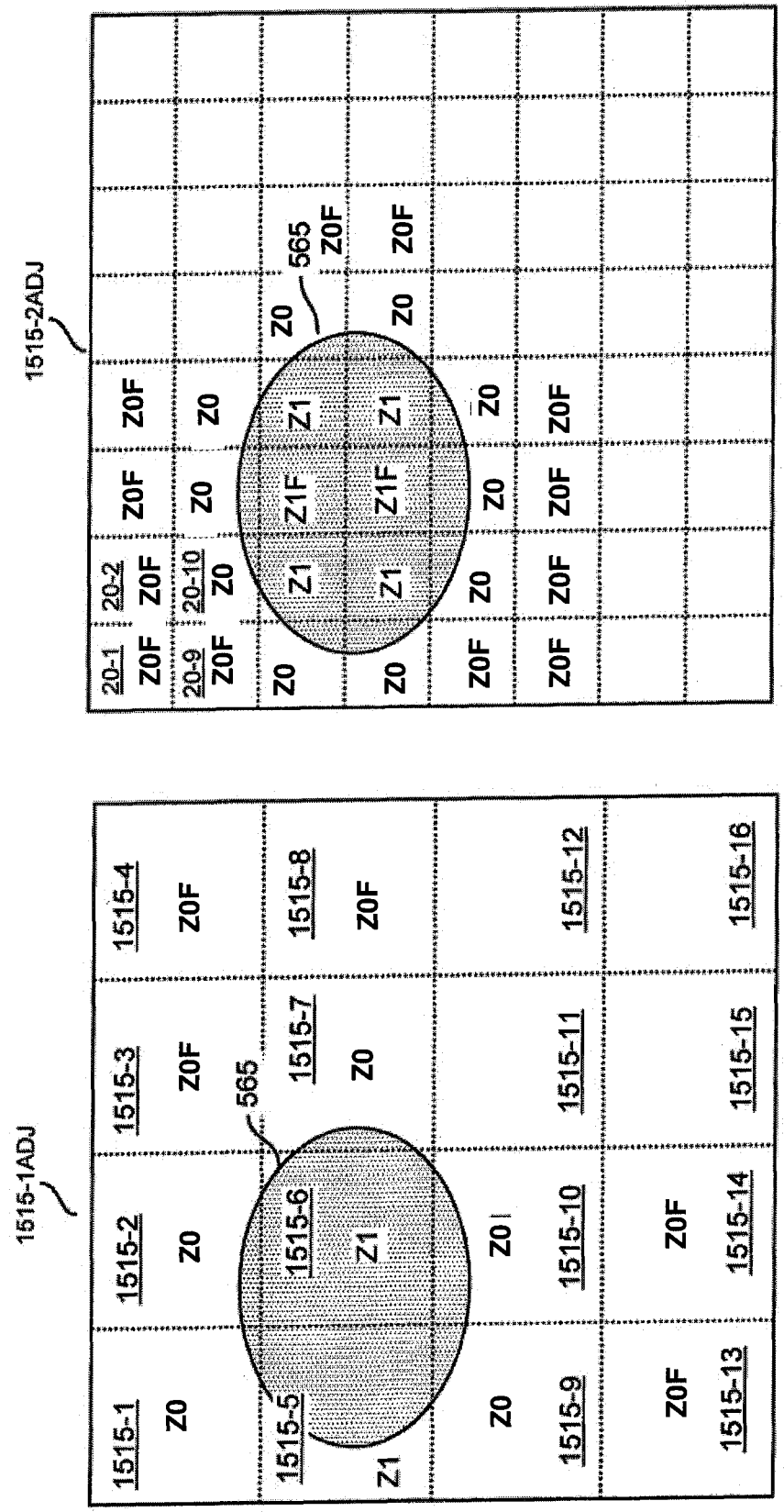
FIG. 17 is an example diagram illustrating upsampling of a motion map from a lower level of quality to a higher level of quality according to embodiments herein.

FIG. 17 is an example diagram illustrating upsampling of a motion map from a lower level of quality to a higher level of quality according to embodiments herein.

In a similar manner as previously discussed, the computer processor hardware upsamples the rendition of motion map 1515-1ADJ into rendition of motion map 1515-2P. Thereafter, the computer processor hardware applies residual data zone information 1120-3 to rendition of motion map 1515-2P to produce rendition of motion map 1515-2ADJ. In certain instances as shown, respective display elements are assigned a final symbol value (such as either Z0F or Z1F) if it is known that every child element (at a corresponding higher resolution) derived from a parent element is also assigned to the same zone as the parent element.

Accordingly, embodiments herein can include receiving a plane of elements representing a motion zone map. The elements in the plane specify attributes associated with corresponding elements in the rendition of a signal. A respective setting of each of the elements in the plane can include zone data (such as symbol Z0, Z0F, Z1, Z1F, etc.) specifying whether a corresponding display element in the rendition of the signal is included in a respective zone or not included in any zone.

Embodiments herein can further include producing the plane of elements (such as motion zone map) in accordance with a tier-based hierarchical decoding method, wherein the tier-based hierarchical decoding method can include: decoding received zone information to produce a rendition of the plane (motion zone map) at a first level of quality. Based at least in part on the rendition of the plane (motion zone map) of elements at the first level of quality, the computer processor hardware derives a preliminary rendition of the plane of elements (motion zone map) at a second level of quality, the second level of quality having a higher resolution than the first level of quality.

The computer processor hardware can be configured to obtain a set of adjustment values such as residual data zone information 1120-2 associated with the preliminary rendition of the plane (motion zone map) of elements at the second level of quality. The computer processor hardware applies the adjustment values (residual data zone information 1120-2) to the preliminary rendition of the plane (motion map 1515-1P) of elements at the second level of quality to produce an adjusted rendition of the plane (motion zone map 1515-1ADJ) of elements at the second level of quality. The computer processor hardware utilizes the adjusted rendition of the plane of elements at the second level of quality to identify the multiple elements of the rendition of the signal that belong to a zone.

Recall that, via motion zone maps, the computer processor hardware identifies which zone each of the display elements reside. Based on which zone a display element resides, the computer processor hardware obtains a corresponding set of descriptive information on motion specifying operations to apply to the coordinates of the display element in order to identify a location in a corresponding reference image that will be used at least in part to generate the setting for that display element.

In one embodiment, certain values in the rendition of motion zone map 1515-1P (such as final symbol values) may not be modified when producing the adjusted rendition of the motion map for the corresponding level of quality. For example, the adjustment values in residual data zone information 1120-2 can be applied to less than all elements in the preliminary rendition of the motion map at the corresponding level of quality to produce the adjusted rendition of the motion map 1515-1ADJ.

In one embodiment, the computer processor hardware produces a plane of elements (motion zone map) at a first level of quality. The zone information can indicate that each element that resides in a first portion of the plane is assigned a final symbol such as Z0F. The zone information can indicate that each element that resides in a second portion of the plane (motion map) is assigned a non-final symbol such as the value Z0. The assignment of the final symbol Z0F indicates that every child element derived from a respective parent element (which is assigned the final symbol) in the first portion inherits same zone settings as the respective parent element. Thus, if the parent element is assigned Z0F, each child element derived from the parent element resides in zone Z0, and is assigned final symbol value Z0F to indicate that also all of its sub-child elements reside in zone Z0.

Accordingly, embodiments herein can include: producing the plane of elements at a first level of quality; assigning each element that resides in a first portion of the plane a final symbol; assigning each element that resides in a second portion of the plane a non-final symbol; wherein assignment of the final symbol indicates that every child element derived from a respective parent element in the first portion inherits same zone settings as the respective parent element, with no need for any adjustment values; and wherein assignment of the non-final symbol indicates that every child element derived from a respective parent element in the second portion inherits same zone settings as the respective parent element, but such preliminary (inherited) settings will be adjusted by means of suitable adjustment values.

Figure 18:
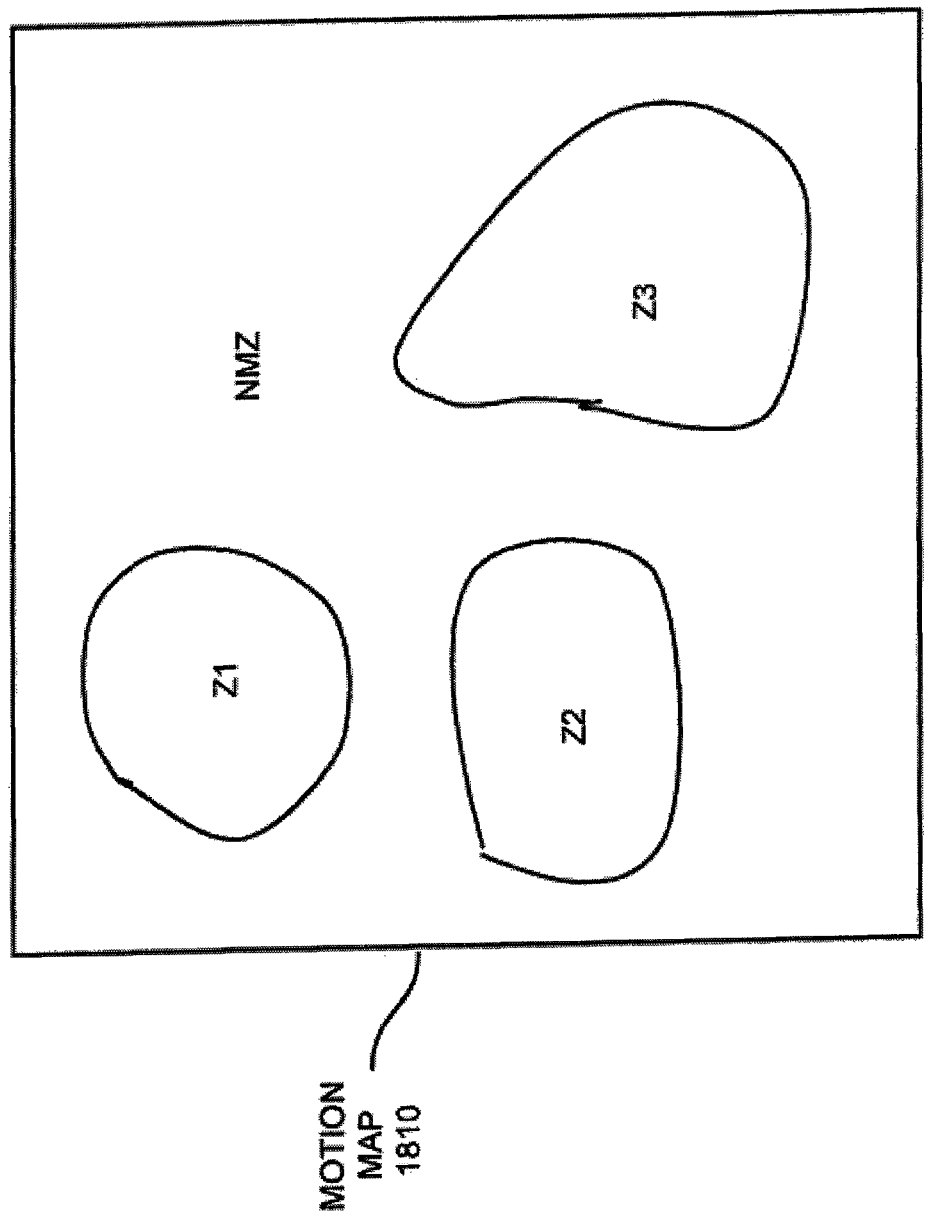
FIG. 18 is an example diagram illustrating different motion zones according to embodiments herein.

FIG. 18 is an example diagram illustrating different motion zones according to embodiments herein.

As shown, motion zone map 1810 indicates a portion (region) of elements that reside in motion zone Z1. Motion map 1810 indicates a portion (region) of elements that reside in motion zone Z2. Motion map 1810 indicates a portion (region) of elements that reside in motion zone Z3. Those elements residing outside of the zone regions are considered to reside in a non-motion zone NMZ (also previously defined as "residual motion zone", meaning that it represents what's left outside of the motion zones, and cannot be suitably predicted by means of motion compensation). In one embodiment, the one or more elements outside of a zone are assigned a value to indicate that such elements in the NMZ region, during generation of a respective image (signal), are not reproduced based on settings of a group of elements in a reference signal serving as reference for elements in the motion zones.

FURTHER EMBODIMENTS

As previously discussed, computer processor hardware can be configured to execute any of the methods as described herein. In view of the above specification further embodiments herein include:

Embodiment 1 including a method for decoding auxiliary information for each element of a given set of elements, said set of elements corresponding to a sample of a signal with one or more dimensions, the method comprising: a. receiving at least one auxiliary zone, said auxiliary zone indicating a subset of elements of said set of elements, said subset of elements belonging to said auxiliary zone, and at least one set of descriptive auxiliary information, each of said set(s) of descriptive auxiliary information corresponding to an auxiliary zone, b. based at least in part on auxiliary zone information and on the descriptive auxiliary information corresponding to auxiliary zones, computing auxiliary information for each element of the given sample.

Embodiment 2 includes the method according to embodiment 1, wherein descriptive auxiliary information corresponds to information on motion of auxiliary zones and auxiliary information is processed in order to generate a motion-compensated image, the method comprising: a. receiving at least one motion zone, said motion zone indicating a subset of elements of a motion-compensated image, said subset of elements belonging to said motion zone, and at least one set of descriptive information on motion, b. receiving at least a first reference image, c. computing a second image, in particular a motion-compensated image, by using the first image received during phase (b), the motion zones received during phase (a) and the descriptive information on motion received during phase (a).

Embodiment 3 includes the method according to embodiment 2, wherein a first motion zone corresponds to a subset of elements characterized by a number of elements that is different from the number of elements corresponding to a second motion zone, and at least one of the motion zones comprises elements that correspond to non-rectangular and/or non-contiguous portions of the signal.

Embodiment 4 includes the method according to embodiment 2, wherein the motion of a motion zone comprises a translation, and wherein the descriptive information on the motion of said motion zone comprises parameters corresponding to an offset, said offset indicating adjustments to apply to each coordinate, to apply to elements corresponding to said motion zone during phase (c).

Embodiment 5 includes the method according to embodiment 2, wherein the motion of a motion zone comprises a rotation, and wherein the descriptive information on the motion of said motion zone comprises one or more parameters corresponding to a rotation, defining direction and magnitude of the rotation to apply to said motion zone during phase (c).

Embodiment 6 includes the method according to embodiment 2, wherein the motion of a motion zone comprises a scaling (i.e., zoom or de-zoom), and wherein the descriptive information on the motion of said motion zone comprises one or more parameters corresponding to a scaling, defining the magnitude of the scaling to apply to said motion zone during phase (c).

Embodiment 7 includes the method according to embodiment 2, wherein the descriptive information corresponding to a motion zone comprises further parameters contributing to determine the calculation during phase (c) of elements of the motion-compensated image corresponding to said motion zone.

Embodiment 8 includes the method according to embodiment 2, wherein the motion-compensated image has a different resolution than said reference image.

Embodiment 9 includes the method according to embodiment 2, wherein one or more elements of the motion-compensated image are assigned a default value if they correspond to a portion of the reference image that is assigned a default value or if they correspond to an area outside of the reference image.

Embodiment 10 includes the method according to embodiment 2, wherein, during the phase (c), the computation of the motion-compensated image comprises calculations with fractional numbers (e.g., without limitation, floating point calculations or calculations with high-precision fixed point numbers), in order to describe movements with arbitrary precision and access substantially any location of the reference image independently of the actual resolution of the reference image.

Embodiment 11 includes the method according to embodiment 10, wherein the value of at least a given element of the motion-compensated image is calculated by performing a weighted average of a subset of elements of the reference image, wherein the weights of the weighted average depend on the coordinates of the given element in the motion-compensated image and on descriptive information of the motion of the one or more motion zone(s) to which the given element belongs.

Embodiment 12 includes the method according to embodiment 2, wherein elements of the motion-compensated image corresponding to at least one motion zone are assigned values that are not based on values of elements of the reference image.

Embodiment 13 includes the method according to embodiments 2, wherein motion zones are encoded as a single auxiliary image corresponding to the given motion-compensated image to compute, wherein the values assigned to elements of the auxiliary image correspond to the motion zone associated to corresponding elements of the given motion-compensated image.

Embodiment 14 includes the method according to embodiment 13, wherein said single auxiliary image is decoded with a tier-based hierarchical method, the method comprising: decoding a rendition of the single auxiliary image at a first level of quality; based at least in part on said single auxiliary image at a first level of quality, producing a preliminary rendition of the single auxiliary image at a second level of quality, the second level of quality being higher than the first level of quality; decoding a set of adjustment values; combining said preliminary rendition of the single auxiliary image at the second level of quality with said adjustment values, producing a rendition of the single auxiliary image at the second level of quality.

Embodiment 15 includes the method according to embodiment 14, wherein adjustment values are specified only for a subset of the elements of the preliminary rendition of the single auxiliary image at the second level of quality, the method comprising: decoding a single auxiliary image at a first level of quality, wherein elements of said single auxiliary image at a first level of quality are assigned either a symbol belonging to a first set of symbols ("finalization symbols") or a symbol belonging to a second set of symbols ("non-finalized symbols"); generating a preliminary rendition of the single auxiliary image at a second (higher) level of quality, wherein elements of said preliminary rendition at the second level of quality corresponding to a same element of the single auxiliary image at the first level of quality are assigned the same symbol as said element of the single auxiliary image at the first level of quality; only for elements of the preliminary rendition of the single auxiliary image at the second level of quality that were assigned a symbol belonging to the second set of symbols, modifying the assigned symbol based on received adjustment data.

Embodiment 16 includes the method according to embodiment 2, wherein at least one motion zone is defined by means of one or more parameters corresponding to a geometric shape.

Embodiment 17 includes the method according to embodiment 2, wherein the reconstructed motion-compensated image is combined with received residual data, generating a target image.

Embodiment 18 includes the method according to embodiment 2, wherein multiple motion-compensated images, each of said multiple motion-compensated image being based on a different reference image, are combined, generating a single predicted image.

Embodiment 19 includes the method according to embodiment 2, wherein at least one element of the motion-compensated image is assigned to more than one motion zone.

Embodiment 22 includes a method to reproduce a rendition of a signal, the method comprising:

via computer processor hardware:

receiving zone information specifying multiple elements of the rendition of the signal belonging to a zone; receiving motion information associated with the zone, the motion information encoded to indicate to which corresponding element in a reference signal each of the multiple elements in the zone pertains; and for each respective element in the zone, utilizing the motion information to derive a corresponding location value in the reference signal, the corresponding location value indicating a location in the reference signal to which the respective element pertains.

Embodiment 23 includes the method as in embodiment 22 further comprising: for each respective element in the zone: utilizing the location value for the respective element to select a corresponding group of elements in the reference signal; and calculating a setting for the respective element, the setting for the respective element derived based on settings of elements in the corresponding group.

Embodiment 24 includes the method as in embodiment 23, wherein the motion information includes a set of coefficient values; and wherein utilizing the motion information to derive a corresponding location value includes:

obtaining coordinates for the respective element, the coordinates specifying a location of the respective element in rendition of the signal; and performing linear combinations of the coordinates of the respective element with the coefficient values to produce the corresponding location information.

Embodiment 25 includes the method as in embodiment 24, wherein the corresponding location information specifies coordinates in the reference signal to which the respective element pertains.

Embodiment 26 includes the method as in embodiment 22 further comprising: selecting a first element in the zone; utilizing the motion information to calculate a first coordinate location in the reference signal; utilizing the first coordinate location as a basis to identify a first set of elements in the reference signal; obtaining settings of elements in the first set; calculating a setting for the first element in the zone based on the settings of the elements in the first set; selecting a second element in the zone; utilizing the motion information to calculate a second coordinate location in the reference signal; utilizing the second coordinate location as a basis to identify a second set of elements in the reference signal; obtaining settings of elements in the second set; and calculating a setting for the second element in the zone based on the settings of the elements in the second set.

Embodiment 27 includes the method as in embodiment 22, wherein the reference signal is a reference image including multiple display elements; and wherein the rendition of the signal is a secondary image, the secondary image including multiple display elements, the motion information specifying a group of display elements in the reference image to be used to reproduce settings for display elements in the zone.

Embodiment 28 includes the method as in embodiment 27, wherein the display elements in the zone of the secondary image represents a rendition of an object captured by the secondary image; wherein the group of display elements in the reference image represents a rendition of the object in the reference image; and wherein the motion information captures motion of the object from a location in the reference image to a location in the secondary image.

Embodiment 29 includes the method as in embodiment 28, wherein the motion information corresponds to motion parameters associated with movement of the object, the parameters selected from a group comprising: i) translation of the rendition of the object in the secondary image with respect to the rendition of the object in the reference image, ii) rotation of the rendition of the object in the secondary image with respect to the rendition of the object in the reference image, and iii) scaling of the rendition of the object in the secondary image with respect to the rendition of the object in the reference image.

Embodiment 30 includes the method as in embodiment 29, wherein the motion information corresponds to motion parameters associated with movement of the object, the parameters selected from a group further comprising: iv) shearing of the rendition of the object in the secondary image with respect to the rendition of the object in the reference image, v) perspective transform of the rendition of the object in the secondary image with respect to the rendition of the object in the reference image.

Embodiment 31 includes the method as in embodiment 22, wherein the rendition of the signal is a motion compensated image; and wherein the zone in the motion compensated image includes multiple contiguous regions of display elements including a first region display elements and a second region of display elements, the first region of display elements being non-contiguous with respect to the second region of display elements.

Embodiment 32 includes the method as in embodiment 22, wherein the rendition of the signal is a motion compensated image; and wherein a region of the motion compensated image as represented by the zone of elements is a non-rectangular shape.

Embodiment 33 includes the method as in embodiment 22, wherein a resolution of the rendition of the signal is substantially different than a resolution of the reference signal.

Embodiment 34 includes the method as in embodiment 22, wherein a resolution of the rendition of the signal is substantially the same such as a resolution of the reference signal.

Embodiment 35 includes the method as in embodiment 22, wherein the motion information includes offset adjustment information; and wherein utilizing the motion information to derive a corresponding location value for the respective element includes: i) obtaining coordinates for the respective element, the coordinates specifying a location of the respective element in rendition of the signal; and ii) applying the offset adjustment information to the coordinates to produce the corresponding location information for the respective element, the corresponding location information indicating a location that is offset with respect to the coordinates by an amount as specified by the offset adjustment information.

Embodiment 36 includes the method as in embodiment 22, wherein the motion information includes rotation adjustment information; and wherein utilizing the motion information to derive a corresponding location value for the respective element includes: i) obtaining coordinates for the respective element, the coordinates specifying a location of the respective element in rendition of the signal; and ii) applying the rotation adjustment information to the coordinates to produce the corresponding location information for the respective element, the corresponding location information capturing a rotation of the coordinates by an amount as specified by the rotation adjustment information.

Embodiment 37 includes the method as in embodiment 22, wherein the motion information indicates how the multiple elements in the zone of the rendition of the signal are scaled from a corresponding grouping of display elements in the reference signal.

Embodiment 38 includes the method as in embodiment 22, wherein the location value is assigned a default value when motion information indicates a corresponding element located outside of the reference signal or when motion information is assigned a default value.

Embodiment 39 includes the method as in embodiment 22, wherein the corresponding location value has a sufficiently high resolution to specify sub-element accuracy in the reference signal.

Embodiment 40 includes the method as in embodiment 22 further comprising: selecting a first element in the zone; utilizing the motion information to calculate a location in the reference signal for the first element; utilizing the location as a basis to identify a first set of elements in the reference signal; processing the reference signal to obtain settings of the elements in the first set; applying weighted values to the settings of elements in the first set, magnitudes of the weighted values depending on a proximity of the elements in the first set to the location in the reference signal for the first element; and calculating a setting for the first element in the zone based on the weighted settings of the elements in the first set.

Embodiment 41 includes the method as in embodiment 22, wherein the zone information includes geometric parameters defining a shape of the zone.

Embodiment 42 includes the method as in embodiment 22 further comprising: reproducing the rendition of the signal based at least in part on the reference signal in a manner as specified by the zone information and the motion information; receiving reconstruction data specifying adjustments to be applied to the reproduced rendition of the signal; and applying the adjustments to display elements in the reproduced rendition of the signal as specified by the reconstruction data to refine the reproduced rendition of the signal.

Embodiment 43 includes the method as in embodiment 22, wherein the rendition of the signal is a first image and wherein the reference signal is a first reference image from which the first image is at least partially derived, wherein the zone information is first zone information, wherein the motion information is first motion information, the method further comprising: receiving second zone information and second motion information specifying how to reproduce a second image based on a second reference image; in accordance with the second zone information and second motion information, reproducing a rendition of the second image based at least in part on the second reference image; and generating a rendition of a third image using the first image and the second image as reference images.

Embodiment 44 includes the method as in embodiment 22, wherein the zone information is first zone information and wherein the zone is a first zone, the first zone information indicating that a given element resides in the first zone, the method further comprising: receiving second zone information associated with the rendition of the signal, the second zone information indicating that the given element resides in a second zone.

Embodiment 45 includes the method as in embodiment 22, wherein the motion information indicates that a particular element in the rendition of the signal belongs to a motion zone, the particular element assigned a value not based on settings of a group of elements in the reference signal.

Embodiment 46 includes the method as in embodiment 22, wherein receiving the zone information includes receiving a plane of elements, the elements in the plane specifying attributes associated with corresponding elements in the rendition of the signal, a respective setting of each of the elements in the plane including zone data specifying whether a corresponding display element in the rendition of the signal is included in the zone.

Embodiment 47 includes the method as in embodiment 46 further comprising: producing the plane of elements in accordance with a tier-based hierarchical decoding method, the tier-based hierarchical decoding method comprising:

decoding a rendition of the plane of elements at a first level of quality;

based at least in part on the rendition of the plane of elements at the first level of quality, deriving a preliminary rendition of the plane of elements at a second level of quality, the second level of quality having a higher resolution than the first level of quality;

obtaining a set of adjustment values associated with the preliminary rendition of the plane of elements at the second level of quality;

applying the adjustment values to the preliminary rendition of the plane of elements at the second level of quality to produce an adjusted rendition of the plane of elements at the second level of quality; and utilizing the adjusted rendition of the plane of elements at the second level of quality to identify the multiple elements of the rendition of the signal that belong to the zone.

Embodiment 48 includes the method as in embodiment 47 further comprising: producing the plane of elements at a first level of quality; assigning each element that resides in a first portion of the plane a final symbol; assigning each element that resides in a second portion of the plane a non-final symbol; and wherein assignment of the final symbol indicates that every child element derived from a respective parent element in the first portion inherits same zone settings as the respective parent element.

Embodiment 49 includes a method to reproduce information for each element of a rendition of a signal, the method comprising:

via computer processor hardware:

receiving zone information specifying multiple elements of the rendition of the signal belonging to a zone; receiving descriptive information associated with the zone, the descriptive information encoded to indicate information pertaining to the multiple elements in the zone; and for each respective element in the zone, utilizing the descriptive information to derive a corresponding value, the corresponding value indicating information pertaining to the respective element.

Note again that techniques herein are well suited for encoding and decoding in hierarchical systems. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While embodiments herein have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

receiving zone information specifying multiple image elements in a rendition of an image being reproduced, the multiple image elements belonging to a zone in the rendition of the image;

receiving motion information associated with the zone, the motion information encoded to indicate corresponding locations in a reference image for each of the multiple image elements in the zone and the motion information comprising a set of coefficients that are used to generate matrix coefficients for a matrix; and mapping each of the multiple image elements in the zone to a corresponding location in the reference image by, for each respective image element in the zone, deriving a corresponding location value in the reference image for the respective image element by utilizing the motion information and the matrix, the corresponding location value indicating a location in the reference image to which the respective image element pertains;

wherein the motion information includes a set of coefficient values; and wherein utilizing the motion information to derive the corresponding location value for the respective image element includes:
i) obtaining coordinates for the respective image element, the coordinates specifying a location of the respective image element in the rendition of the image being reproduced; and
ii) performing linear combinations of the coordinates of the respective image element with the coefficient values to produce the corresponding location value.

2. The method as in claim 1, wherein the motion information is encoded to indicate to which corresponding at least one image element in a reference image the respective image element in the zone pertains.

3. A method comprising:
receiving zone information specifying multiple image elements in a rendition of an image being reproduced, the multiple image elements belonging to a zone in the rendition of the image;
receiving motion information associated with the zone, the motion information encoded to indicate corresponding locations in a reference image for each of the multiple image elements in the zone and the motion information comprising a set of coefficients that are used to generate matrix coefficients for a matrix; and
mapping each of the multiple image elements in the zone to a corresponding location in the reference image by, for each respective image element in the zone, deriving a corresponding location value in the reference image for the respective image element by utilizing the motion information and the matrix, the corresponding location value indicating a location in the reference image to which the respective image element pertains;
selecting a first image element of the multiple image elements in the zone;
utilizing the motion information to calculate a first coordinate location in the reference image;
utilizing the first coordinate location as a basis to identify a first set of image elements in the reference image;
obtaining settings of the image elements in the first set;
calculating a first setting, the first setting calculated based on the settings of the elements in the first set;
assigning the first setting to the first image element in the rendition of the image being reproduced;
selecting a second image element in the zone;
utilizing the motion information to calculate a second coordinate location in the reference image;
utilizing the second coordinate location as a basis to identify a second set of elements in the reference image;
obtaining settings of elements in the second set;
calculating a second setting based on the settings of the elements in the second set; and
assigning the second setting to the second element in the rendition of the image being reproduced.

4. The method as in claim 1, wherein the corresponding location value specifies coordinates in the reference image to which the respective element pertains.

5. The method as in claim 2, wherein the at least one image element includes a group of multiple image elements representing an object in the reference image; and
wherein the motion information captures motion of the object from a location in the reference image to a location in the rendition of the image being reproduced.

6. The method as in claim 1, wherein the rendition of the image being reproduced is a motion compensated image; and
wherein the zone in the motion compensated image includes multiple contiguous regions of image elements including a first region of image elements and a second region of image elements, the first region of image elements being non-contiguous with respect to the second region of image elements.

7. The method as in claim 1, wherein a resolution of the rendition of the image being reproduced is substantially different than a resolution of the reference image.

8. The method as in claim 1, wherein a resolution of the rendition of the image being reproduced is substantially the same as a resolution of the reference image.

9. The method as in claim 1, wherein the motion information includes offset adjustment information; and
wherein utilizing the motion information to derive a corresponding location value for the respective element includes: i) obtaining coordinates for the respective element, the coordinates specifying a location of the respective element in the rendition of the image being reproduced; and ii) applying the offset adjustment information to the coordinates to produce the corresponding location information for the respective element, the corresponding location information indicating a location that is offset with respect to the coordinates by an amount as specified by the offset adjustment information.

10. The method as in claim 1, wherein the motion information includes rotation adjustment information; and
wherein utilizing the motion information to derive a corresponding location value for the respective image element includes:
i) obtaining coordinates for the respective image element, the coordinates specifying a location of the respective image element in the rendition of the image being reproduced; and
ii) applying the rotation adjustment information to the coordinates to produce the corresponding location information for the respective image element, the corresponding location information capturing a rotation of the coordinates by an amount as specified by the rotation adjustment information.

11. The method as in claim 1, wherein the motion information indicates how the multiple image elements in the zone of the rendition of the image are scaled from a corresponding grouping of display elements in the reference image.

12. The method as in claim 1, wherein the corresponding location value has a sufficiently high resolution to specify a fraction of an image element in the reference image.

13. The method as in claim 1, wherein the zone information includes geometric parameters defining a shape of the zone.

14. The method as in claim 1 further comprising:
reproducing the rendition of the image based at least in part on the reference image in a manner as specified by the zone information and the motion information;
receiving reconstruction data specifying adjustments to be applied to the rendition of the image being reproduced; and
applying the adjustments to display elements in the rendition of the image being reproduced as specified by the reconstruction data to refine the reproduced rendition of the image.

15. The method as in claim 1, wherein the rendition of the image is a first image and wherein the reference image is a first reference image from which the first image is at least partially derived, wherein the zone information is first zone information, wherein the motion information is first motion information, the method further comprising:
receiving second zone information and second motion information specifying how to reproduce a second image based on a second reference image;
in accordance with the second zone information and second motion information, reproducing a rendition of the second image based at least in part on the second reference image; and
generating a rendition of a third image using a combination of the first image and the second image as reference images.

16. The method as in claim 1, wherein the zone information is first zone information and wherein the zone is a first zone, the first zone information indicating that a given element resides in the first zone, the method further comprising:
receiving second zone information associated with the rendition of the image, the second zone information indicating that the given element resides in a second zone.

17. The method as in claim 1, wherein the motion information indicates that a particular element in the rendition of the image being reproduced belongs to a motion zone, the particular element assigned a value not based on settings of a group of elements in the reference image.

18. The method as in claim 1, wherein receiving the zone information includes receiving a plane of elements, the elements in the plane specifying attributes associated with corresponding elements in the rendition of the image, a respective setting of each of the elements in the plane including zone data specifying whether a corresponding image element in the rendition of the image is included in the zone.

19. The method as in claim 18 further comprising:
producing the plane of elements in accordance with a tier-based hierarchical decoding method, the tier-based hierarchical decoding method comprising:
decoding a rendition of the plane of elements at a first level of quality;
based at least in part on the rendition of the plane of elements at the first level of quality, deriving a preliminary rendition of the plane of elements at a second level of quality, the second level of quality having a higher resolution than the first level of quality;
obtaining a set of adjustment values associated with the preliminary rendition of the plane of elements at the second level of quality;
applying the adjustment values to the preliminary rendition of the plane of elements at the second level of quality to produce an adjusted rendition of the plane of elements at the second level of quality; and
utilizing the adjusted rendition of the plane of elements at the second level of quality to identify the multiple elements of the rendition of the image that belong to the zone.

20. The method as in claim 19 further comprising:
producing the plane of elements at a first level of quality;
assigning each element that resides in a first portion of the plane a final symbol;
assigning each element that resides in a second portion of the plane a non-final symbol; and
wherein assignment of the final symbol indicates that every child element derived from a respective parent element in the first portion inherits same zone settings as the respective parent element.

21. The method as in claim 1, wherein the corresponding at least one image element of the reference image includes multiple display elements defined by a display grid; and
wherein the corresponding location value for the respective image element in the zone specifies an off-grid image element location with respect to the corresponding at least one image element of the reference image in the display grid.

22. The method as in claim 1, wherein the motion information is obtained from a motion map at a second level of quality, the motion map at the second level of quality upsampled from a motion map at a first level of quality, the second level of quality being higher in quality than first level of quality.

* * * * *